US012689814B2

(12) United States Patent
Oh et al.

(10) Patent No.:  US 12,689,814 B2
(45) Date of Patent:      Jul. 21, 2026

(54) CAMERA APPARATUS AND OPTICAL APPARATUS PERFORMING HANDSHAKING CORRECTION BY MOVING AN IMAGE SENSOR

(71) Applicant: LG INNOTEK CO., LTD., Seoul (KR)

(72) Inventors: Jung Seok Oh, Seoul (KR); Deok Yong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 126 days.

(21) Appl. No.: 18/562,466

(22) PCT Filed: May 19, 2022

(86) PCT No.: PCT/KR2022/007201
§ 371 (c)(1),
(2) Date: Nov. 20, 2023

(87) PCT Pub. No.: WO2022/245166
PCT Pub. Date: Nov. 24, 2022

(65) Prior Publication Data
US 2025/0203185 A1      Jun. 19, 2025

(30) Foreign Application Priority Data

May 21, 2021      (KR) ......................... 10-2021-0065812
Jul. 27, 2021      (KR) ......................... 10-2021-0098852

(51) Int. Cl.
*H04N 23/54*          (2023.01)
*H04N 23/68*          (2023.01)
(52) U.S. Cl.
CPC ........... *H04N 23/54* (2023.01); *H04N 23/687* (2023.01)

(58) Field of Classification Search
CPC .............................. H04N 23/54; H04N 23/687
See application file for complete search history.

(56) References Cited

U.S. PATENT DOCUMENTS 10,175,499 B2      1/2019  Howarth et al.
10,502,924 B2 *  12/2019  Lee ................... H02K 41/0356
(Continued)

FOREIGN PATENT DOCUMENTS

JP          2011-247909 A      12/2011
JP          2020-170170 A      10/2020
(Continued)

OTHER PUBLICATIONS

International Search Report dated Aug. 22, 2022 in International Application No. PCT/KR2022/007201.
(Continued)

*Primary Examiner* — Padma Haliyur
(74) *Attorney, Agent, or Firm* — SALIWANCHIK, LLOYD & EISENSCHENK

(57) ABSTRACT

The present embodiment relates to a camera device comprising: a fixed part comprising a magnet; and a moving part comprising a first substrate comprising a first terminal and a hole, and a coil facing the magnet, wherein the moving part comprises a sensor part coupled to the first substrate, wherein the sensor part comprises a sensor substrate comprising a second terminal connected to the first terminal of the first substrate, an image sensor disposed on the sensor substrate, and a sensor holder disposed on the image sensor, and wherein the sensor holder is inserted into the hole of the first substrate.

20 Claims, 49 Drawing Sheets

(56)                    References Cited

U.S. PATENT DOCUMENTS

| | | | |
|---|---|---|---|
| 12,360,386 B2 * | 7/2025 | Yang | G02B 27/646 |
| 2006/0056839 A1 * | 3/2006 | Abe | G03B 19/12 |
| | | | 396/452 |
| 2009/0160998 A1 * | 6/2009 | Fukamachi | H04N 23/54 |
| | | | 156/60 |
| 2020/0073083 A1 * | 3/2020 | Lee | H04N 23/54 |
| 2020/0150380 A1 | 5/2020 | Lee | |
| 2021/0195073 A1 * | 6/2021 | Saito | H04N 23/60 |
| 2021/0258491 A1 * | 8/2021 | Park | H04N 23/57 |
| 2022/0094853 A1 * | 3/2022 | Xu | H04N 23/54 |
| 2022/0124227 A1 * | 4/2022 | Oh | H05K 1/189 |
| 2022/0190015 A1 * | 6/2022 | Baik | H04N 25/00 |
| 2022/0326047 A1 * | 10/2022 | Ku | G03B 3/10 |
| 2023/0004017 A1 * | 1/2023 | Yang | G03B 5/00 |
| 2023/0164409 A1 * | 5/2023 | Kuo | H04N 23/57 |
| | | | 348/374 |

| | | | |
|---|---|---|---|
| 2025/0106512 A1 * | 3/2025 | Yang | H04N 23/51 |

FOREIGN PATENT DOCUMENTS

| | | | | |
|---|---|---|---|---|
| KR | 10-2019-0097113 A | 8/2019 | | |
| KR | 10-2020-0066571 A | 6/2020 | | |
| KR | 10-2021-0034205 A | 3/2021 | | |
| TW | 202046002 A | 12/2020 | | |
| WO | WO-2020004975 A1 * | 1/2020 | | G02B 27/646 |
| WO | WO-2020050654 A1 * | 3/2020 | | G02B 27/646 |
| WO | WO-2020180078 A1 * | 9/2020 | | H04N 25/00 |
| WO | WO-2020184870 A1 * | 9/2020 | | H05K 1/181 |

OTHER PUBLICATIONS

Office Action dated Dec. 24, 2025 in Taiwanese Application No. 111118979.

* cited by examiner

10

<u>300a</u>

1010

(a)

(b)

(c)

(d)

(a)

(b)

(c)

a

1441 a

1441

2010

CAMERA APPARATUS AND OPTICAL APPARATUS PERFORMING HANDSHAKING CORRECTION BY MOVING AN IMAGE SENSOR

CROSS-REFERENCE TO RELATED APPLICATIONS

This application is the U.S. national stage application of International Patent Application No. PCT/KR2022/007201, filed May 19, 2022, which claims the benefit under 35 U.S.C. § 119 of Korean Application No. 10-2021-0065812, filed May 21, 2021, and Korean Application No. 10-2021-0098852, filed Jul. 27, 2021, the disclosures of each of which are incorporated herein by reference in their entirety.

TECHNICAL FIELD

The present embodiment relates to a camera device and an optical apparatus.

BACKGROUND ART

A camera device is a device that photographs a picture or video of a subject, and is installed in optical apparatuses such as smartphones, drones, and vehicles.

In camera devices, there is a demand for handshake correction, optical image stabilization (OIS), function that corrects image shake caused by user movement to improve image quality, In the camera device, the handshake correction function is performed by moving the lens in a direction perpendicular to the optical axis. However, in accordance with the recent trend of high pixelation, the diameter of the lens increases, and the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that performs a handshake correction function by moving an image sensor.

The present embodiment is intended to provide a camera device that shifts an image sensor in x-axis and y-axis, and rolls in z-axis, that is, driving in three axes.

Technical Solution

The camera device according to the present embodiment comprises: a fixed part comprising a magnet; and a moving part comprising a first substrate comprising a first terminal and a hole, and a coil facing the magnet, wherein the moving part comprises a sensor part being coupled to the first substrate, wherein the sensor part comprises a sensor substrate comprising a second terminal being connected to the first terminal of the first substrate, an image sensor being disposed on the sensor substrate, and a sensor holder being disposed on the image sensor, and wherein the sensor holder may be inserted into the hole of the first substrate.

The camera device according to the present embodiment comprises: a first substrate having a hole formed therein and comprising a first terminal; a coil being disposed on the first substrate; a magnet being disposed on the coil; and a sensor part being coupled to the first substrate, wherein the sensor part comprises a second substrate comprising a second terminal being connected to the first terminal of the first substrate, an image sensor being disposed on the second substrate, and a sensor holder being disposed on the image sensor, and wherein the sensor holder may be inserted into the hole of the first substrate.

The sensor part may comprise a filter being disposed in the sensor holder, and an upper surface of the filter may be disposed higher than an upper surface of the first substrate.

The camera device according to the present embodiment comprises: a fixed part comprising a second substrate; a first moving part being disposed inside the fixed part; a magnet being disposed on the fixed part; a first coil being disposed on the first moving part at a position corresponding to the magnet; a second moving part being disposed between the first moving part and the second substrate; a sensor substrate being coupled to the second moving part; and an image sensor being disposed on the sensor substrate, wherein the second moving part comprises a first substrate and a second coil being disposed on the first substrate at a position corresponding to the magnet, and wherein the first substrate may be electrically connected to the second substrate.

The camera device according to the present embodiment comprises: a fixed part comprising a second substrate; a magnet being disposed on the fixed part; a first substrate being disposed between the magnet and the second substrate and comprising a first terminal; a coil being disposed between the first substrate and the magnet; and a sensor part being coupled to the first substrate, wherein the sensor part may comprise a third substrate comprising a second terminal being connected to the first terminal of the first substrate, and an image sensor being disposed on the third substrate.

The first terminal may be disposed on a lower surface of the first substrate.

The second terminal may comprise a first portion being disposed on a lower surface of the third substrate.

The second terminal may comprise a second portion being connected to the first portion and being disposed on a side surface of the third substrate.

The first substrate may comprise a hole, the sensor part may comprise a sensor holder being disposed on the image sensor, and the sensor holder may be inserted into the hole of the first substrate.

The camera device according to the present embodiment comprises a fixed part comprising a magnet; and a moving part comprising a coil facing the magnet and a first substrate having a first terminal, wherein the moving part comprises a sensor part being coupled to the first substrate, and wherein the sensor part may comprise a sensor substrate comprising a second terminal being connected to the first terminal of the first substrate, and an image sensor being disposed on the sensor substrate.

The first substrate may comprise a hole, the sensor part may comprise a sensor holder being disposed on the image sensor, and the sensor holder may be inserted into the hole of the first substrate.

The sensor part may comprise a filter being disposed in the sensor holder, and an upper surface of the filter may be disposed higher than an upper surface of the first substrate.

It may comprise an AF moving part being disposed inside the fixed part, the fixed part may comprise a second substrate, and the moving part may be disposed between the AF moving part and the second substrate.

The first substrate may be electrically connected to the second substrate.

The first terminal may be disposed on a lower surface of the first substrate.

The second terminal may comprise a first portion being disposed on a lower surface of the sensor substrate.

The second terminal may comprise a second portion being connected to the first portion and being disposed on a side surface of the sensor substrate.

The sensor holder may be overlapped with the first substrate in a direction perpendicular to the optical axis direction.

The filter may be overlapped with the first substrate in a direction perpendicular to the optical axis direction.

The optical apparatus according to the present embodiment comprises a main body; a camera device being disposed on the main body; and a display being disposed on the main body and outputting a video or an image photographed by the camera device.

The camera device according to the present embodiment comprises: a fixed part; a first moving part being disposed within the fixed part and comprising a lens; a second moving part comprising an image sensor being disposed and spaced apart from the lens; a first driving unit for moving the first moving part in an optical axis direction; and a second driving part for moving the second moving part in a direction perpendicular to the optical axis direction, wherein the second moving part comprises a sensor substrate in which a hole is formed, and a plate member being coupled to the sensor substrate, the plate member comprises a protruded part being disposed in the hole, and a groove being formed to be overlapped with the protruded part in the optical axis direction, and wherein the image sensor may be disposed on the protruded part of the plate member.

The plate member may comprise a support region being coupled to the sensor substrate.

The upper surface of the protruded part may be disposed at the same height as the upper surface of the sensor substrate or lower than the upper surface of the sensor substrate.

The thickness of the protruded part may be smaller than the thickness of the sensor substrate.

The size of the hole of the sensor substrate may be larger than the size of the groove of the plate member.

The camera device according to the present embodiment comprises: a fixed part; a first moving part being disposed within the fixed part and comprising a lens; a second moving part comprising an image sensor being disposed below the lens; a first driving unit for moving the first moving part in an optical axis direction; and a second driving unit for moving the second moving part in a direction perpendicular to the optical axis direction, wherein the second moving part comprises a sensor substrate in which a hole is formed, and a plate member being coupled to a lower surface of the sensor substrate, wherein the plate member comprises a protruded part being protruded from an upper surface of the plate member and at least a part of which is disposed in the hole of the sensor substrate, and a groove formed in a lower surface of the plate member, and wherein the image sensor may be disposed on the protruded part of the plate member.

The groove of the plate member may be smaller than the size of the protruded part.

The camera device according to the present embodiment comprises: a plate member; an image sensor being disposed on the plate member; a substrate being disposed on the plate member and having a hole formed therein; and a lens being disposed on the image sensor, wherein the image sensor and the plate member are moved in a direction perpendicular to the optical axis direction, wherein the plate member comprises one surface to which the image sensor is coupled and the other surface opposite to the one surface, wherein a protruded part is formed on the one surface of the plate member, wherein a groove is formed in the other surface of the plate member, and wherein at least a portion of the protruded part of the plate member may be disposed in the hole of the substrate.

The camera device according to the present embodiment comprises: a fixed part; a first moving part being disposed inside the fixed part and comprising a lens; a second moving part comprising an image sensor being disposed below the lens; a first driving unit for moving the first moving part in an optical axis direction; and a second driving unit for moving the second moving part in a direction perpendicular to the optical axis direction, wherein the second moving part comprises a sensor substrate in which a hole is formed, and a plate member being coupled to the sensor substrate, wherein the plate member may comprise a protruded part being disposed in the hole of the sensor substrate, a groove formed to be overlapped in the optical axis direction, and a support region being coupled to the sensor substrate.

The image sensor may be disposed on the protruded part of the plate member.

The thickness between the lower surface and the upper surface of the plate member at the edge of the plate member may be smaller than the thickness between the lower surface and the upper surface of the protruded part.

The plate member may comprise a groove being concavely formed in the lower surface of the plate member at a position corresponding to the protruded part.

The plate member comprises a first portion which is the outer side of the protruded part, a second portion in which the groove is formed, and a third portion connecting the first portion and the second portion, wherein the thickness of the third portion in the optical axis direction may be greater than the thickness of each of the first portion and the second portion.

The thickness of the first portion in the optical axis direction may be the same as the thickness of the second portion.

The thickness of the third portion in the optical axis direction may be 1.8 times to 2.2 times the thickness of the first portion.

The upper end of the second portion may be disposed lower than the center of the sensor substrate in the optical axis direction.

The thickness of the plate member in the optical axis direction may be smaller than the thickness of the sensor substrate.

The image sensor may be electrically connected to the sensor substrate through wire bonding.

The plate member may be formed of a SUS.

The plate member may be formed of a copper alloy.

The protruded part of the plate member may be overlapped with the sensor substrate in the direction perpendicular to the optical axis direction.

It may comprise a connection member for connecting the fixed part and the second moving part.

The fixed part may comprise a first substrate, the second moving part may comprise a second substrate coupled to the upper surface of the sensor substrate, and the connection member may comprise a connection substrate connecting the first substrate and the second substrate.

It comprises an upper elastic member connecting the fixed part and the first moving part, wherein the second moving part comprises a second substrate being coupled to the upper surface of the sensor substrate, a holder being disposed in the second substrate, and a terminal being disposed on the holder, and wherein the connection member may comprise a wire connecting the upper elastic member and the terminal.

An optical apparatus according to the present embodiment comprises a main body; a camera device being disposed on the main body; and a display being disposed on the main body and outputting a video or an image photographed by the camera device.

The camera device according to the present embodiment comprises: a fixed part comprising a first substrate and a base; a first moving part being disposed inside the fixed part and comprising a lens; a second moving part comprising an image sensor being disposed below the lens; a magnet being disposed on the fixed part; a first coil being disposed on the first moving part at a position corresponding to the magnet; and a second coil being disposed in the second moving part at a position corresponding to the magnet, wherein the second moving part comprises a sensor substrate comprising a hole, and a plate member being coupled to a lower surface of the sensor substrate, wherein the plate member comprises a protruded part being protruded from an upper surface of the plate member and at least a part of which is disposed in a hole in the sensor substrate, and wherein the image sensor may be disposed on the protruded part of the plate member.

The plate member may comprise a groove being concavely formed in a lower surface of the plate member at a position corresponding to the protruded part.

The plate member comprises a first portion which is an outer side of the protruded part, a second portion in which the groove is formed, and a third portion connecting the first portion and the second portion, wherein the thickness of the third portion in an optical axis direction may be thicker than the thickness of each of the first portion and the second portion.

The plate member may be formed of SUS, and the image sensor may be electrically connected to the sensor substrate through wire bonding.

The camera device according to the present embodiment comprises: a fixed part; a first moving part being disposed within the fixed part and comprising a lens; a second moving part comprising an image sensor being disposed below the lens; a first driving unit for moving the first moving part in an optical axis direction; and a plate member comprising a second driving unit for moving the second moving part in a direction perpendicular to the optical axis direction, and being coupled to a lower surface of the sensor substrate, wherein the plate member comprises a protruded part being protruded from an upper surface of the plate member, and a groove being formed concavely on a lower surface of the plate member at a position corresponding to the protruded part, wherein the image sensor is disposed on the protruded part of the plate member, wherein the plate member comprises a first portion which is the outer side of the protruded part, a second portion in which the groove is formed, and a third portion connecting the first portion and the second portion, and wherein the thickness of the third portion in an optical axis direction may be greater than the thickness of the first portion.

Advantageous Effects

The handshake correction function can be performed by moving the image sensor through the present embodiment.

In addition, it is possible to simplify the camera assembly process by separating the assembly process of the image sensor and filter from the assembly process of the actuator. Through this, foreign material management may be advantageous.

In addition, after checking the actuator performance, the camera device can be assembled. That is, the performance of the actuator can be checked and the image sensor can be assembled later.

In addition, the height dimension can be reduced through actuator integration. That is, the shoulder height of a camera may be reduced.

In addition, it is intended to provide a structure with excellent heat dissipation performance for the image sensor.

In addition, it is intended to provide a structure with excellent flatness management of the mounting surface of an image sensor. Through this, the resolution performance optimization and tilt of the camera device can be improved.

In addition, it is intended to provide a structure that reduces the weight of the OIS moving part comprising the image sensor. Through this, the size of the driving unit may be reduced, so that the size of the entire camera module may be reduced. Furthermore, warpage can be minimized in spite of weight reduction.

BRIEF DESCRIPTION OF DRAWINGS

FIG. 19 is a diagram for explaining driving in which an image sensor of a camera device is shifted along the x-axis according to a first embodiment of the present invention. FIG. 20 is a diagram for explaining driving in which an image sensor of a camera device is shifted along the y-axis according to a first embodiment of the present invention. FIG. 21 is a diagram for explaining the driving of an image sensor of a camera device according to a first embodiment of the present invention being rolled about the z-axis.

FIG. 28_b_ is a partially enlarged view of FIG. 28_a_.

FIG. 44_b_ is a perspective view illustrating a magnet and a coil of a camera device according to a modified embodiment of a second embodiment of the present invention.

FIG. 46 is a diagram for explaining driving in which an image sensor of a camera device is shifted along the x-axis according to a second embodiment of the present invention.

FIG. 47 is a diagram for explaining driving in which an image sensor of a camera device is shifted along the y-axis according to a second embodiment of the present invention.

FIG. 48 is a diagram for explaining the driving of an image sensor of a camera device according to a second embodiment of the present invention being rolled about the z-axis.

FIG. 68 is a schematic diagram, some shapes may be different from those of a third embodiment of the present invention.

FIG. 72 is a diagram for explaining driving in which an image sensor of a camera device is shifted along the x-axis according to a third embodiment of the present invention. FIG. 73 is a diagram for explaining driving in which an image sensor of a camera device is shifted along the y-axis according to a third embodiment of the present invention. FIG. 74 is a diagram for explaining the driving of an image sensor of a camera device according to a third embodiment of the present invention being rolled about the z-axis.

BEST MODE

Figure 1:
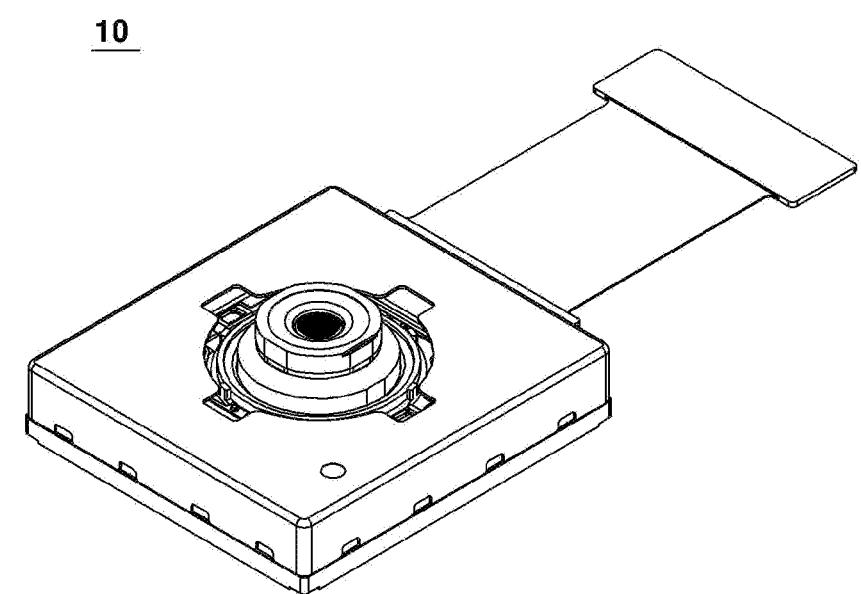
FIG. 1 is a perspective view of a camera device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, any one of "first substrate 110", "second substrate 310", "sensor substrate 320", "sensing substrate 470", and "connection substrate" is referred to as a "first substrate", the other one is referred to as a "second substrate", the other one is referred to as a "third substrate", the other one is referred to as a "fourth substrate", and the other one may be referred to as a "fifth substrate". Similarly, any one of "first substrate 1110", "second substrate 1310", "sensor substrate 1320", "sensing substrate 1470" and "connection substrate 1600" is referred to as a "first substrate", the other one is referred to as a "second substrate", the other one is referred to as a "third substrate", the other one is referred to as a "fourth substrate", and the other one may be referred to as a "fifth substrate".

Hereinafter, any one of the terminal 311 of a second substrate 310 and a terminal 321 of a sensor substrate 320 may be referred to as a "first terminal" and the other one may be referred to as a "second terminal". Similarly, any one of the terminal 1311 of a second substrate 1310 and a terminal 1321 of the sensor substrate 1320 is referred to as a "first terminal", and the other one may be referred to as a "second terminal".

Hereinafter, any one of a "first moving part 200" and a "second moving part 300" may be referred to as a "first moving part" and the other one may be referred to as a "second moving part". In addition, any one of a "first moving part 200" and a "second moving part 300" may be referred to as a "moving part". Or, a "first moving part 200" and a "second moving part 300" may be referred to as a "moving part" together. Similarly, any one of a "first moving part 1200" and a "second moving part 1300" is referred to as a "first moving part" and the other one may be referred to as a "second moving part". In addition, any one of a "first moving part 1200" and a "second moving part 1300" may be referred to as a "moving part". Or, a "first moving part 1200" and a "second moving part 1300" may be referred to as a "moving part" together.

Hereinafter, a camera device according to a first embodiment of the present invention will be described with reference to the drawings.

Figure 2:
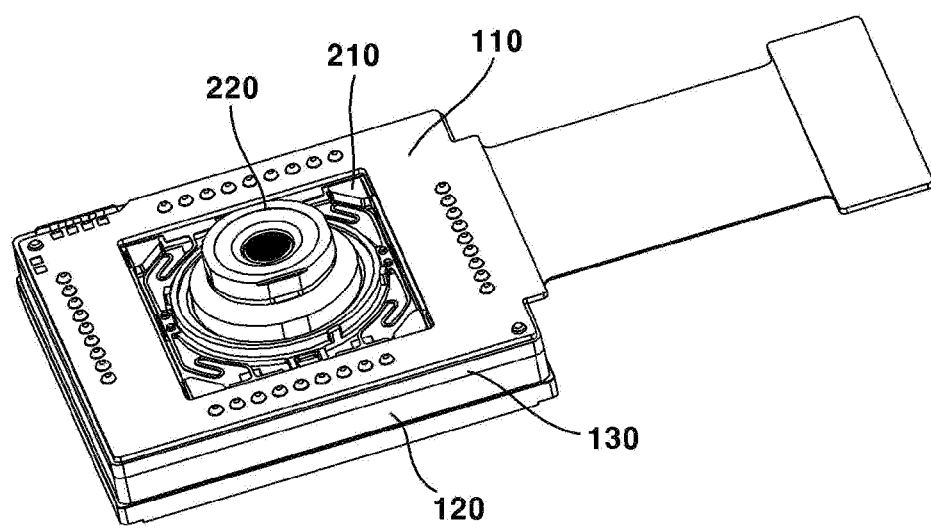
FIG. 2 is a perspective view of a state in which a cover member is omitted from a camera device according to a first embodiment of the present invention.
Figure 3:
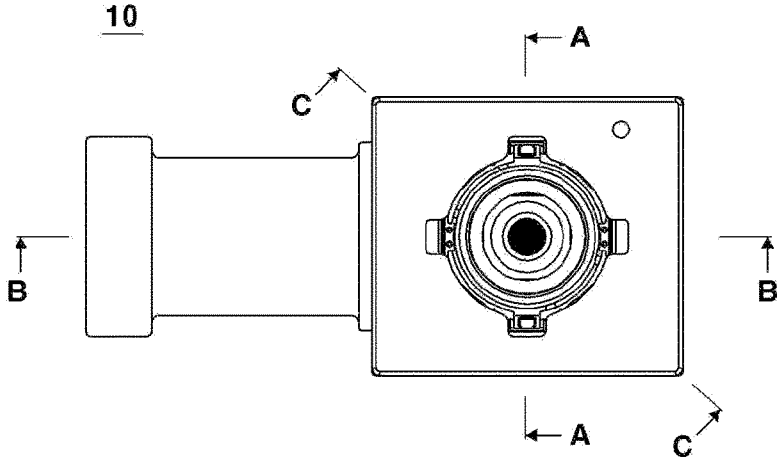
FIG. 3 is a plan view of a camera device according to a first embodiment of the present invention.
Figure 4:
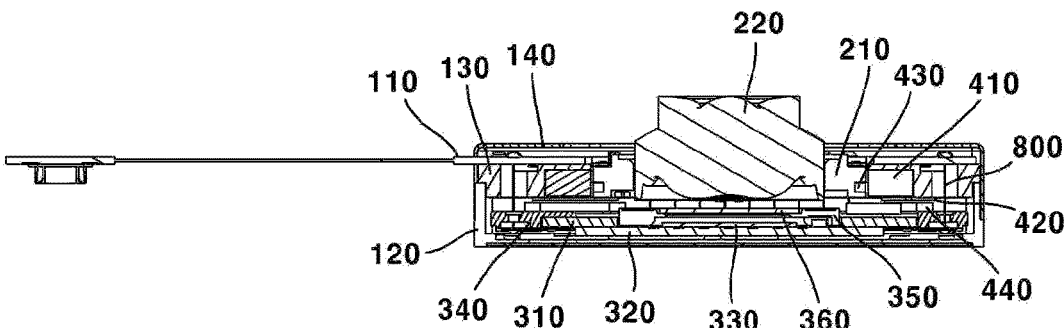
FIG. 4 is a cross-sectional view taken along line A-A of FIG. 3.
Figure 5:
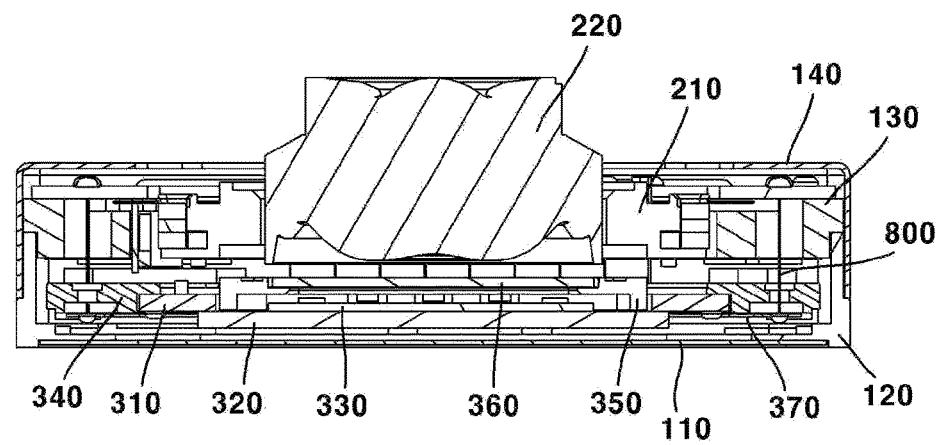
FIG. 5 is a cross-sectional view taken along line B-B of FIG. 3.
Figure 6A:
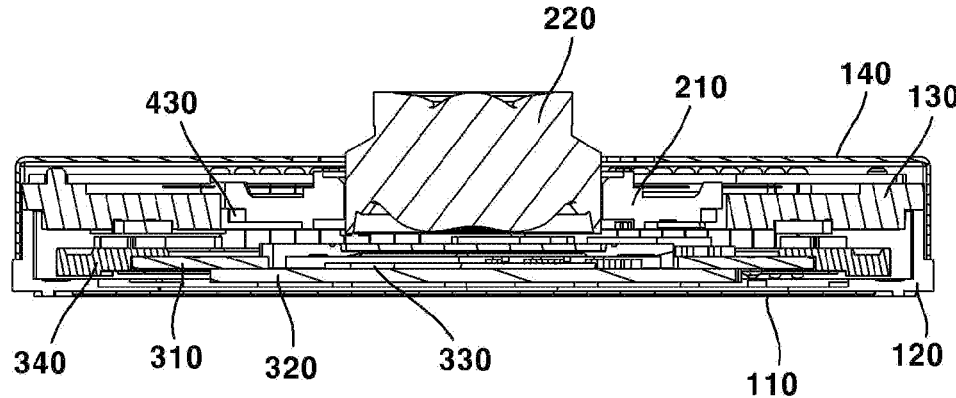
FIG. 6*a* is a cross-sectional view taken along line C-C of FIG. 3.
Figure 6B:
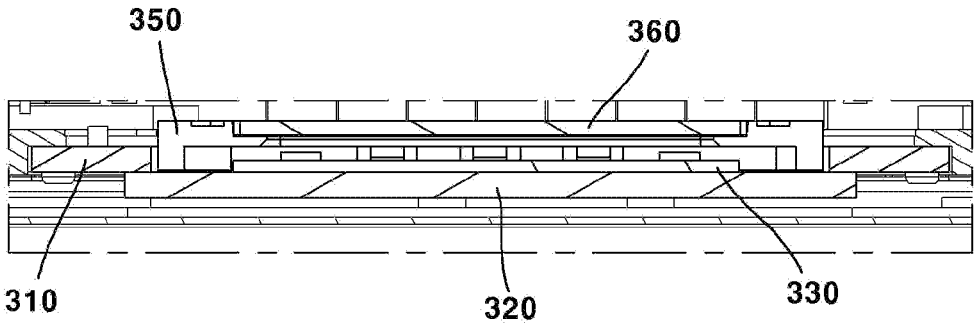
FIG. 6*b* is a partially enlarged view of FIG. 6*a*.
Figure 7:
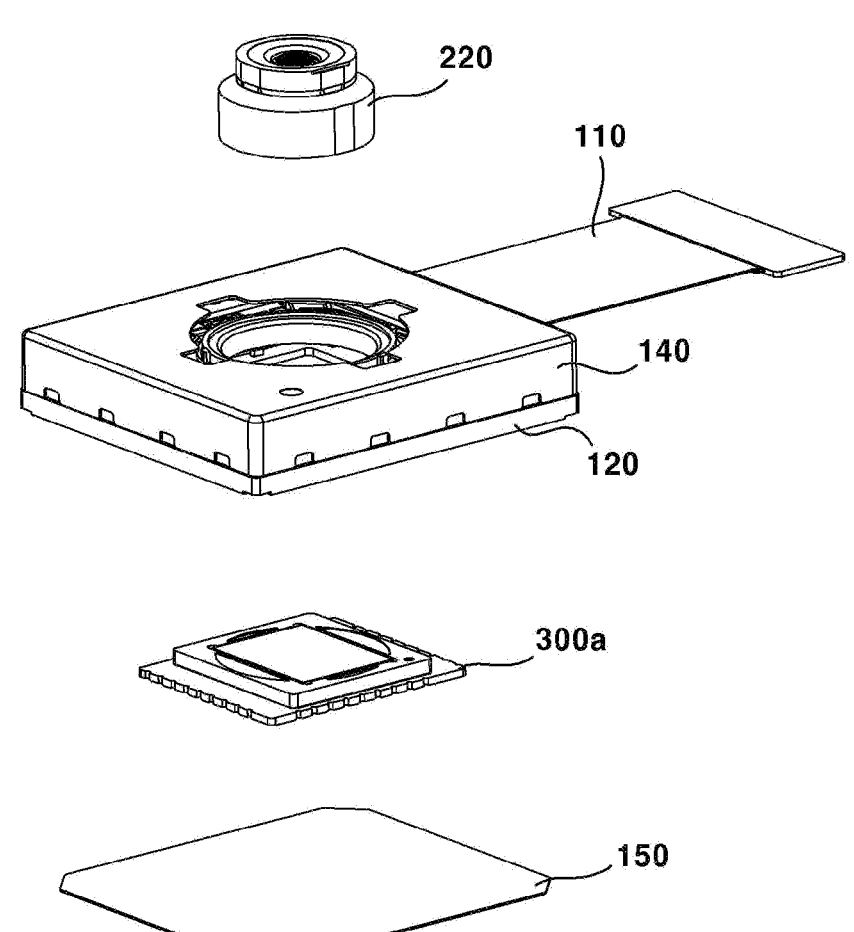
FIG. 7 is an exploded perspective view of a camera device according to a first embodiment of the present invention.
Figure 8:
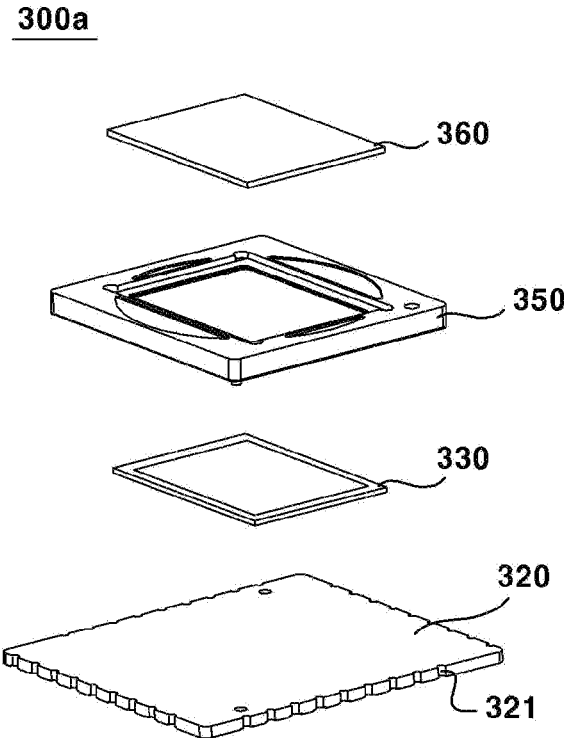
FIG. 8 is an exploded perspective view of a sensor part of a camera device according to a first embodiment of the present invention.
Figure 9:
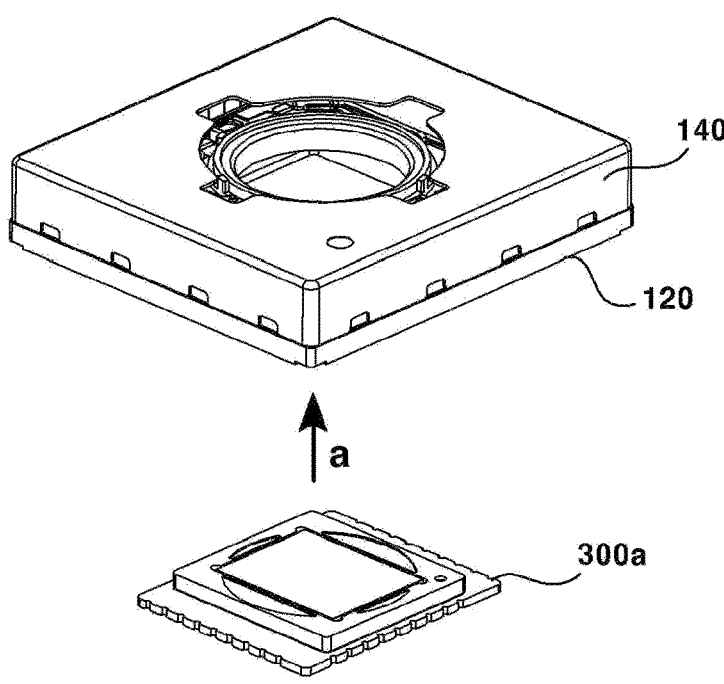
FIG. 9 is a diagram illustrating the assembly direction of a sensor part of a camera device according to a first embodiment of the present invention.
Figure 10:
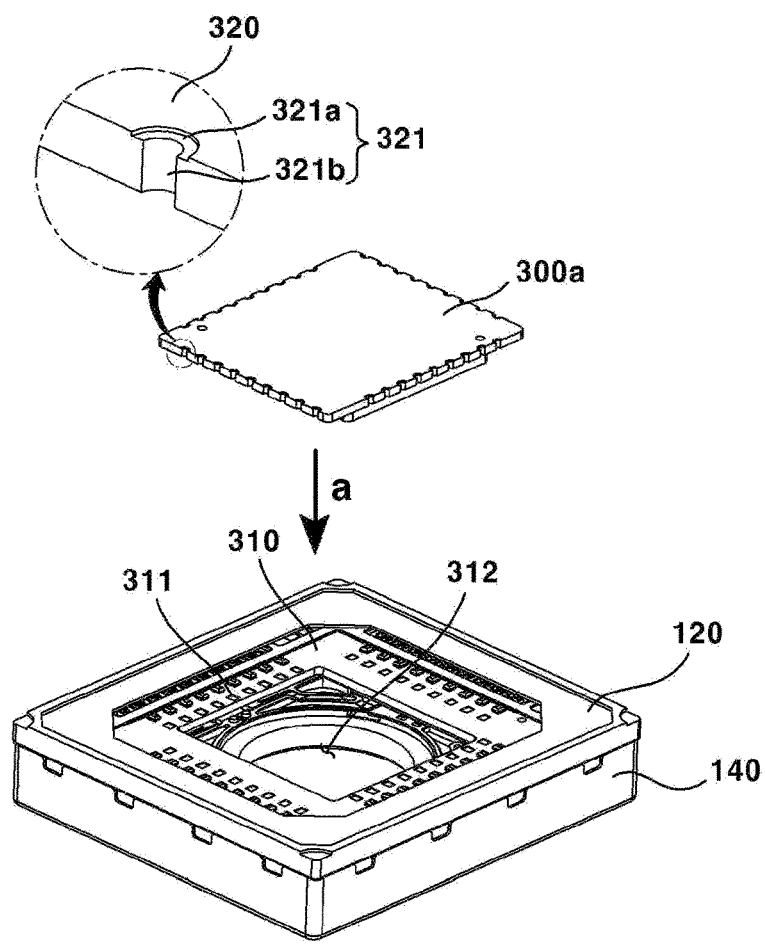
FIG. 10 is a diagram illustrating FIG. 9 from another direction.
Figure 11:
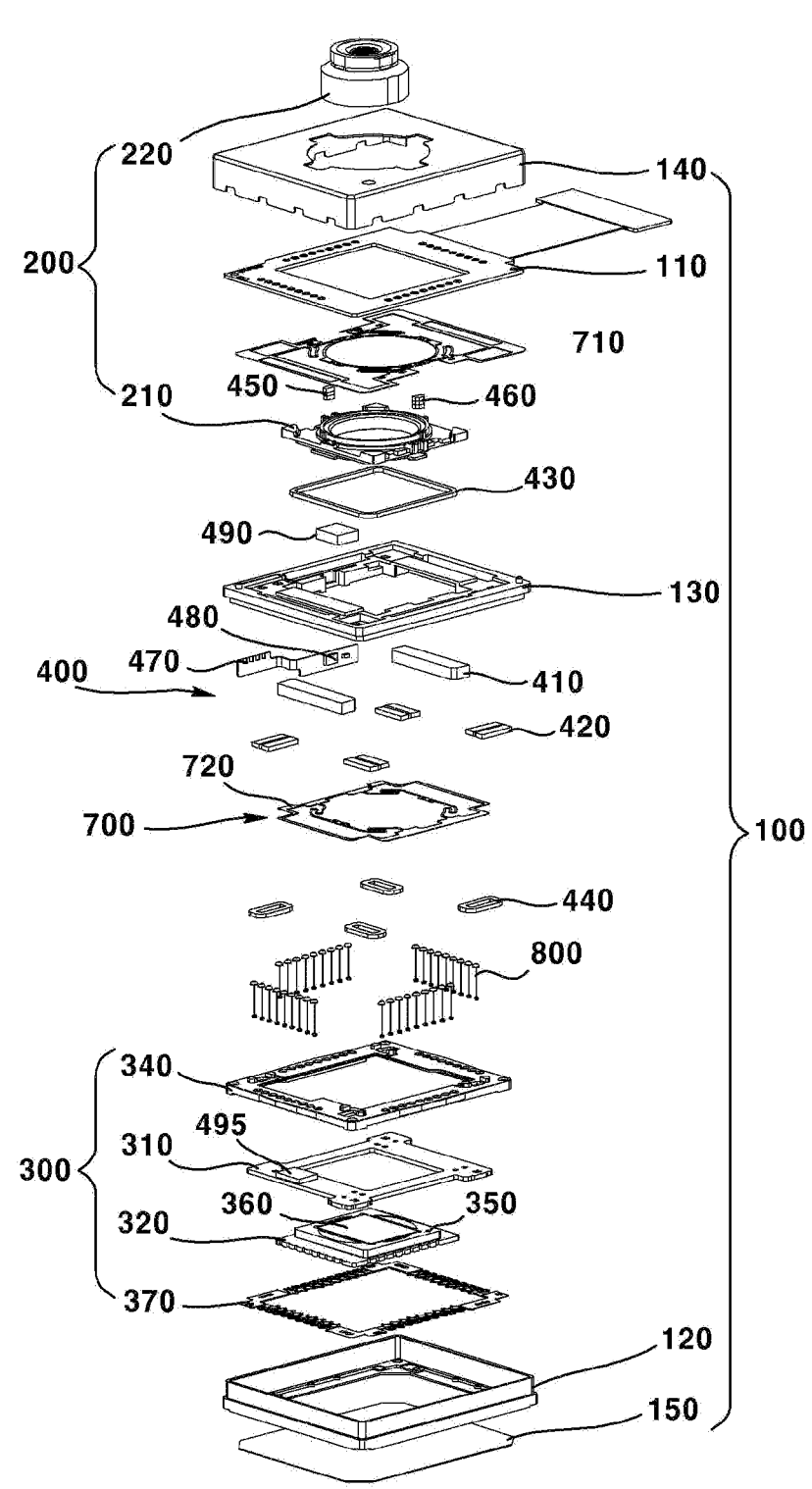
FIG. 11 is an exploded perspective view of a camera device according to a first embodiment of the present invention.
Figure 12:
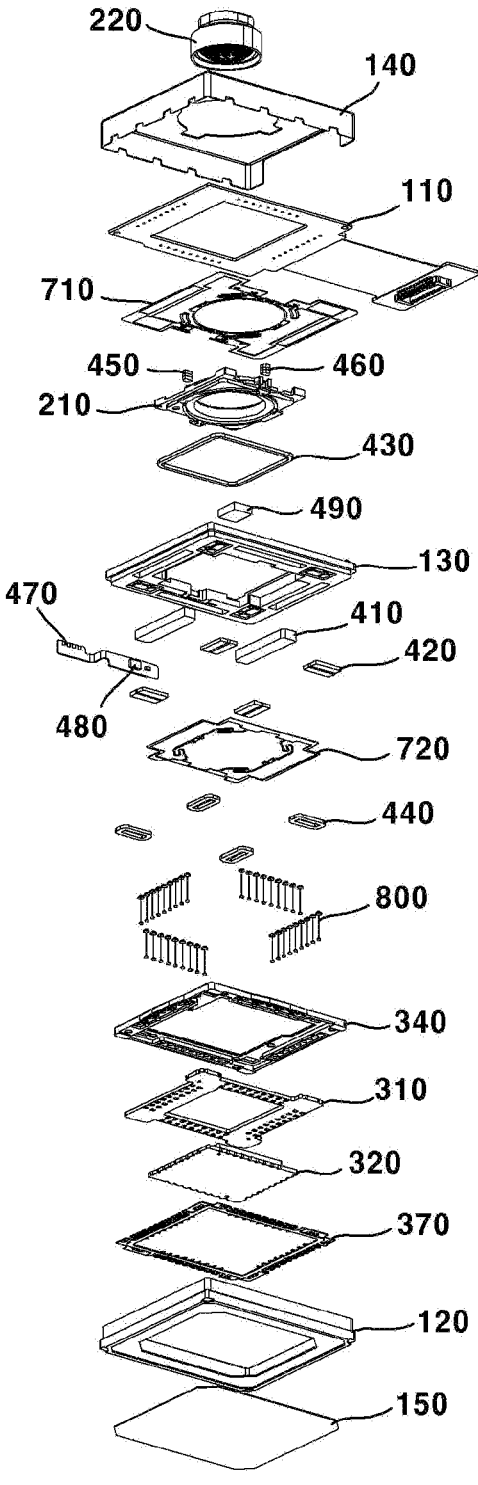
FIG. 12 is an exploded perspective view of a camera device according to a first embodiment of the present invention as viewed from a direction different from that of FIG. 11.
Figure 13:
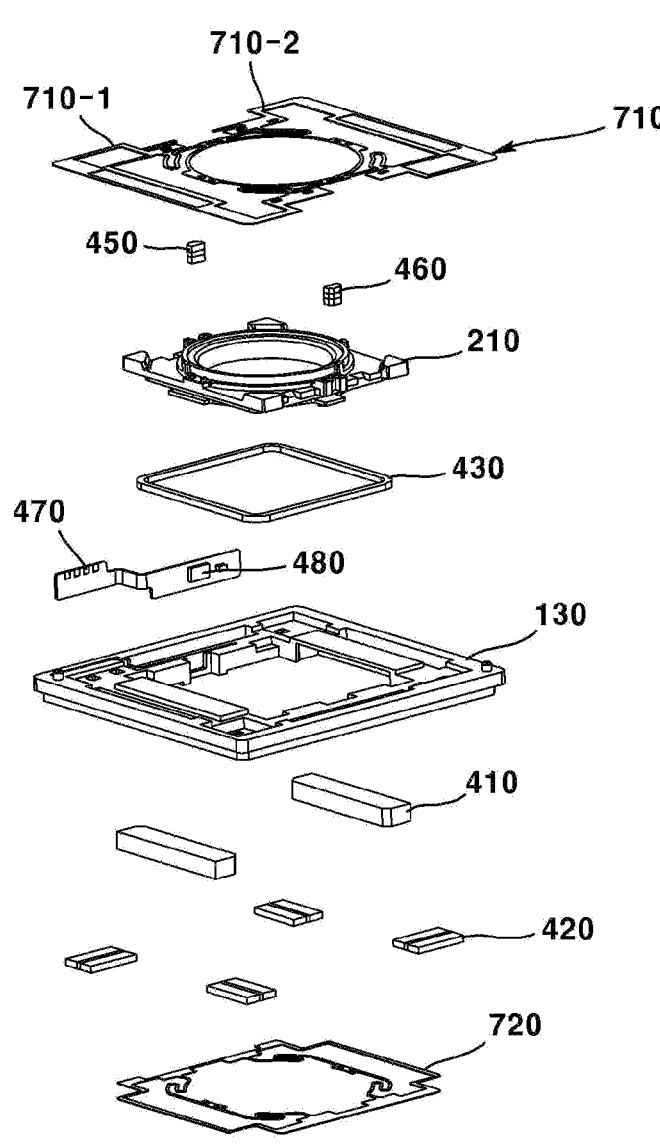
FIG. 13 is an exploded perspective view of a first moving part and related components of a camera device according to a first embodiment of the present invention.
Figure 14:
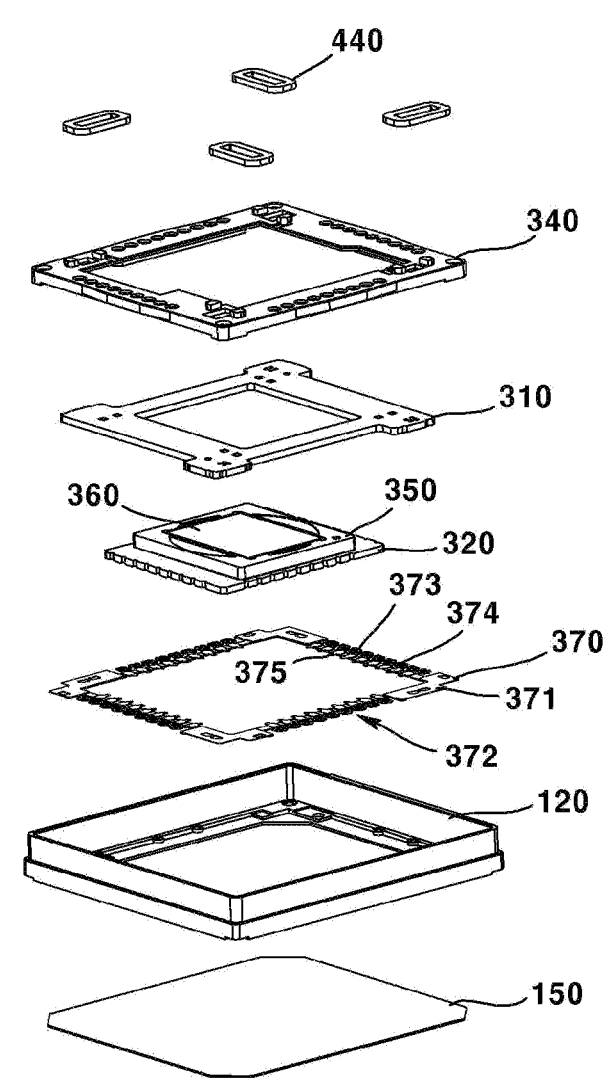
FIG. 14 is an exploded perspective view of a second moving part and related components of a camera device according to a first embodiment of the present invention.
Figure 15:
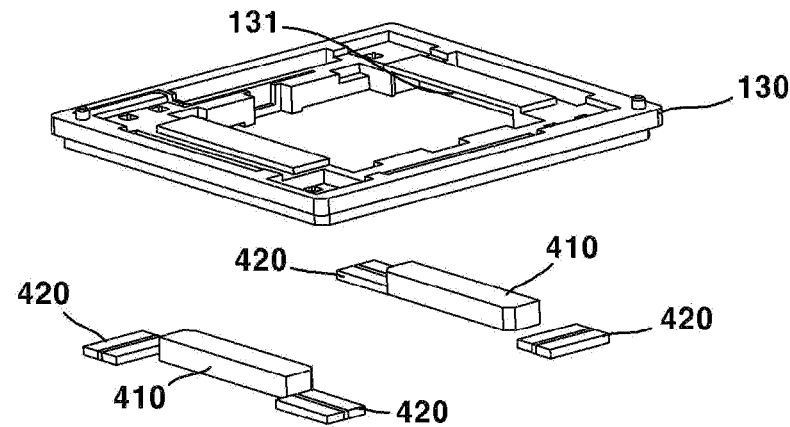
FIG. 15 is an exploded perspective view illustrating a housing, and first and second magnets of a camera device according to a first embodiment of the present invention.
Figure 16:
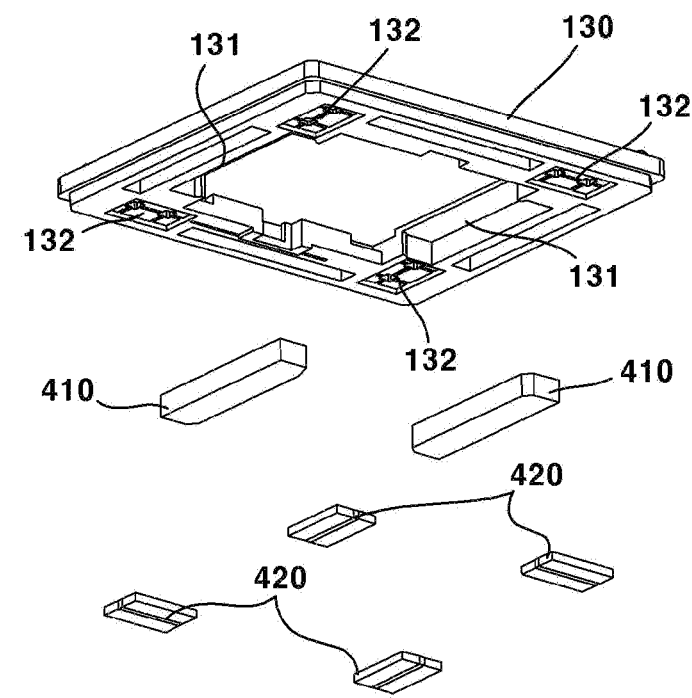
FIG. 16 is an exploded perspective view of a housing, and first and second magnets of a camera device according to a first embodiment of the present invention, as viewed from a direction different from that of FIG. 15.
Figure 17:
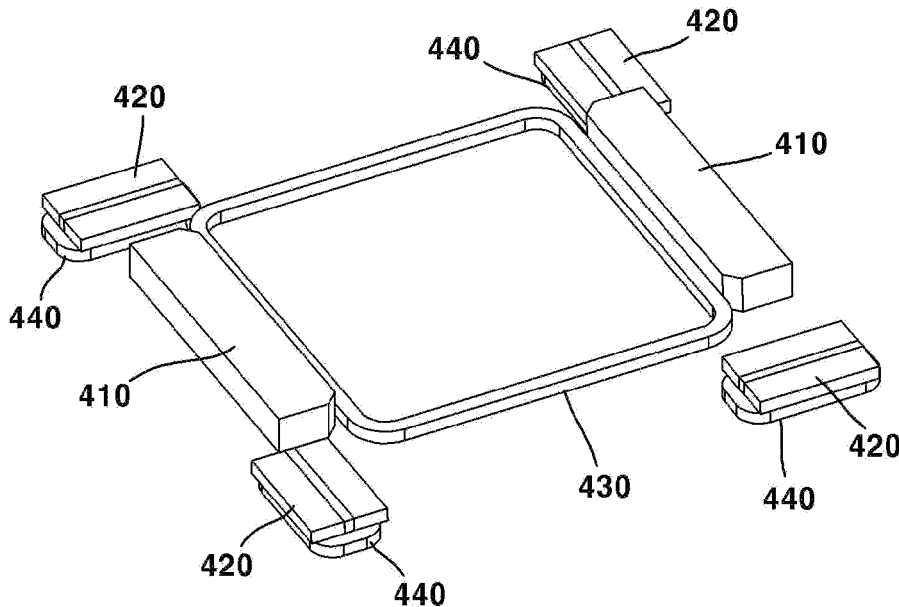
FIG. 17 is a perspective view illustrating a magnet and a coil of a camera device according to a first embodiment of the present invention.

FIG. 1 is a perspective view of a camera device according to a first embodiment of the present invention; FIG. 2 is a perspective view of a state in which a cover member is omitted from a camera device according to a first embodiment of the present invention; FIG. 3 is a plan view of a camera device according to a first embodiment of the present invention; FIG. 4 is a cross-sectional view taken along line A-A of FIG. 3; FIG. 5 is a cross-sectional view taken along line B-B of FIG. 3; FIG. 6a is a cross-sectional view taken along line C-C of FIG. 3; FIG. 6b is a partially enlarged view of FIG. 6a; FIG. 7 is an exploded perspective view of a camera device according to a first embodiment of the present invention; FIG. 8 is an exploded perspective view of a sensor part of a camera device according to a first embodiment of the present invention; FIG. 9 is a diagram illustrating the assembly direction of a sensor part of a camera device according to a first embodiment of the present invention; FIG. 10 is a diagram illustrating FIG. 9 from another direction; FIG. 11 is an exploded perspective view of a camera device according to a first embodiment of the present invention; FIG. 12 is an exploded perspective view of a camera device according to a first embodiment of the present invention as viewed from a direction different from that of FIG. 11; FIG. 13 is an exploded perspective view of a first moving part and related components of a camera device according to a first embodiment of the present invention; FIG. 14 is an exploded perspective view of a second moving part and related components of a camera device according to a first embodiment of the present invention; FIG. 15 is an exploded perspective view illustrating a housing, and first and second magnets of a camera device according to a first embodiment of the present invention; FIG. 16 is an exploded perspective view of a housing, and first and second magnets of a camera device according to a first embodiment of the present invention, as viewed from a direction different from that of FIG. 15; and FIG. 17 is a perspective view illustrating a magnet and a coil of a camera device according to a first embodiment of the present invention.

The camera device 10 may photograph any one or more of a video and an image. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a handshake correction assembly. The camera device 10 may comprise an auto focus device. The camera device 10 may comprise a handshake correction device. The camera device 10 may comprise an actuator. The camera device 10 may comprise a lens driving actuator. The camera device 10 may comprise a sensor driving actuator. The camera device 10 may comprise an auto focus actuator. The camera device 10 may comprise a handshake correction actuator.

The camera device 10 may comprise a fixed part 100. The fixed part 100 may be a part relatively fixed when the moving parts 200 and 300 are being moved. The fixed part 100 may be a part relatively fixed when at least one of the first moving part 200 and the second moving part 300 is being moved. The fixed part 100 may accommodate the first moving part 200 and the second moving part 300. The fixed part 100 may be disposed at an outer side of the first moving part 200 and the second moving part 300.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical apparatus 1. The first substrate 110 may comprise a connector connected to the power source of the optical apparatus 1.

Although the first substrate 110 has been described as one configuration of the fixed part 100 throughout the specification, the first substrate 110 may be understood as a separate configuration from the fixed part 100.

The camera device 10 may comprise a base 120. The fixed part 100 may comprise a base 120. The base 120 may be disposed below the housing 130. The base 120 may be fixed to the housing 130. The base 120 may be coupled to the housing 130. The base 120 may be disposed below the first substrate 110. The base 120 may be fixed to the first substrate 110. The base 120 may be coupled to the first substrate 110.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to the base 120. The housing 130 may be coupled to the base 120. The housing 130 may be attached to the base 120 by an adhesive. The housing 130 may be disposed below the first substrate 110. The housing 130 may be formed of a member separate from the base 120. The housing 130 may be integrally formed.

The camera device 10 may comprise a cover member 140. The fixed part 100 may comprise a cover member 140. The cover member 140 may be coupled to the base 120. The cover member 140 may be coupled to the housing 130. The cover member 140 may be fixed to the base 120. The cover member 140 may be fixed to the housing 130. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole formed in the upper plate. The hole may be formed at a position corresponding to the lens 220. The cover member 140 may comprise a side plate. The side plate may comprise a plurality of side plates. The side plate may comprise 4 side plates. The side plate may comprise first to fourth side plates. The side plate may comprise first and second side plates being disposed opposite to each other, and third and fourth side plates being disposed opposite to each other. The cover member 140 may comprise a plurality of corners between the plurality of side plates.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a stiffener 150. The fixed part 100 may comprise a stiffener 150. The stiffener 150 may be coupled to a lower surface of the base 120. The stiffener 150 may be coupled to a lower side of the sensor part 300a. The stiffener 150 may be spaced apart from the sensor part 300a. The stiffener 150 may be coupled to the base 120 to close the space open downward of the base 120. The stiffener 150 may be a plate member. The stiffener 150 may be a SUS.

The camera device 10 may comprise a first moving part 200. The first moving part 200 may move against the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be movably disposed in an optical axis direction inside the fixed part 100. An auto focus (AF) function may be performed as the first moving part 200 is being moved against the fixed part 100 in an optical axis direction. The first moving part 200 may be disposed on the second moving part 300.

The camera device 10 may comprise a bobbin 210. The first moving part 200 may comprise a bobbin 210. The bobbin 210 may be disposed below the first substrate 110. The bobbin 210 may be disposed below the first substrate 110 to be spaced apart therefrom. The bobbin 210 may be disposed inside the housing 130. The bobbin 210 may be disposed at an inner side of the housing 130. At least a portion of the bobbin 210 may be accommodated in the housing 130. The bobbin 210 may be movably disposed in the housing 130. The bobbin 210 may be movably disposed in the housing 130 in an optical axis direction. The bobbin 210 may be coupled to the lens 220. The bobbin 210 may comprise a hollow or a hole. The lens 220 may be disposed in a hollow or hole of the bobbin 210. The outer circumferential surface of the lens 220 may be coupled to the inner circumferential surface of the bobbin 210.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to the image sensor 330. The optical axis of the lens 220 may coincide with the optical axis of the image sensor 330. The optical axis may be the z-axis. The lens 220 may comprise a plurality of lenses. The lens 220 may comprise a 5-element or 6-element lens.

The camera device 10 may comprise a lens module. The lens module may be coupled to the bobbin 210. The lens module may comprise a barrel and one or more lenses 220 disposed inside the barrel.

The camera device 10 may comprise a second moving part 300. The second moving part 300 may move against the fixed part 100. The second moving part 300 may move in a direction perpendicular to the optical axis direction with respect to the fixed part 100. The second moving part 300 may be disposed inside the fixed part 100. The second moving part 300 may be movably disposed inside the fixed part 100. The second moving part 300 may be movably disposed inside the fixed part 100 in a direction perpendicular to the optical axis direction. A handshake correction (OIS) function may be performed by moving the second moving part 300 in a direction perpendicular to the optical axis direction with respect to the fixed part 100. The second moving part 300 may be disposed between the first moving part 200 and the base 120. The second moving part 300 may be disposed below the first moving part 200.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the base 120. The second substrate 310 may be disposed between the bobbin 210 and the base 120. The second substrate 310 may be disposed between the lens 220 and the base 120. The second substrate 310 may be spaced apart from the fixed part 100. The second substrate 310 may be spaced apart from the fixed part 100 in a direction perpendicular to the optical axis direction and the optical axis direction. The second substrate 310 may move in a direction perpendicular to the optical axis direction. The second substrate 310 may be electrically connected to the image sensor 330. The second substrate 310 may be electrically connected to the first substrate 110. The second substrate 310 may move integrally with the image sensor 330. The second substrate 310 may comprise a hole. An image sensor 330 may be disposed in a hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. A terminal 321 of the sensor substrate 320 may be soldered to the terminal 311 of the second substrate 310.

The second substrate 310 may comprise a hole 312. The hole 312 may be formed in the second substrate 310. The hole 312 may penetrate the second substrate 310 in an optical axis direction. The hole 312 may be formed in a central portion of the second substrate 310. At least a portion of the sensor part 300a may be inserted into the hole 312. The sensor holder 350 may be inserted into the hole 312. The sensor holder 350 may be inserted into the hole 312 of the second substrate 310. The sensor holder 350 may be disposed in the hole 312 of the second substrate 310.

The sensor holder 350 may be overlapped with the second substrate 310 in a direction perpendicular to the optical axis direction. The filter 360 may be overlapped with the second substrate 310 in a direction perpendicular to the optical axis direction.

The camera device 10 may comprise a sensor part 300a. The second moving part 300 may comprise a sensor part 300a. The sensor part 300a may be coupled with the second substrate 310. The sensor part 300a may be coupled to the second substrate 310. The sensor part 300a may be inserted into the second substrate 310 from below to be coupled thereto (refer to a in FIGS. 9 and 10).

The sensor part 300a may comprise any one or more of a sensor substrate 320, an image sensor 330, a sensor holder 350, and a filter 360. The sensor part 300a may comprise a sensor substrate 320 comprising a terminal 321 being connected to the terminal 311 of the second substrate 310. The sensor part 300a may comprise an image sensor 330 being disposed on a sensor substrate 320. The sensor part 300a may comprise a sensor holder 350 being disposed on the image sensor 330. The sensor part 300a may comprise a filter 360 being disposed in the sensor holder 350.

The upper surface of the filter 360 may be disposed higher than the upper surface of the second substrate 310. The upper surface of the filter 360 may be disposed at the same height as the upper surface of the second substrate 310. The upper surface of the filter 360 may be disposed lower than the upper surface of the second substrate 310. The lower surface of the filter 360 may be disposed higher than the upper surface of the second substrate 310. The lower surface of the filter 360 may be disposed at the same height as the upper surface of the second substrate 310. The lower surface of the filter 360 may be disposed to be lower than the upper surface of the second substrate 310 and to be higher than the lower surface of the second substrate 310.

The upper surface of the image sensor 330 may be disposed to be lower than the upper surface of the second substrate 310. The upper surface of the sensor holder 350 may be disposed to be higher than the upper surface of the second substrate 310. The thickness of the sensor holder 350 in an optical axis direction may be thicker than the thickness of the second substrate 310. Or, the upper surface of the sensor holder 350 may be disposed at the same height as the upper surface of the second substrate 310. The thickness of the sensor holder 350 in an optical axis direction may be the same as the thickness of the second substrate 310. Or, the upper surface of the sensor holder 350 may be disposed to be lower than the upper surface of the second substrate 310. The thickness of the sensor holder 350 in an optical axis direction may be thinner than the thickness of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310. The sensor substrate 320 may be disposed below the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 in a state being coupled with the image sensor 330.

The terminal 321 may comprise a first portion 321a. The first portion 321a may be disposed on a lower surface of the sensor substrate 320. The terminal 321 may comprise a second portion 321b. The second portion 321b may be connected to the first portion 321a. The second portion 321b may be disposed on a side surface of the sensor substrate 320.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor holder 350. The image sensor 330 may be electrically connected to the second substrate 310. The image sensor 330 may move integrally with the second substrate 310. The image sensor 330 may be disposed in a hole of the second substrate 310.

Light passing through the lens 220 and the filter 360 may be incident to the image sensor 330 to form an image. The image sensor 330 may be electrically connected to the sensor substrate 320, the second substrate 310, and the first substrate 110. The image sensor 330 may comprise an effective image area. The image sensor 330 may convert light irradiated to the effective image area into an electrical signal. The image sensor 330 may comprise any one or more of a charge coupled device (CCD), a metal oxide semiconductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. A second coil 440 may be disposed in the holder 340. The holder 340 may comprise a protrusion on which the second coil 440 is wound. The holder 340 may comprise a hole in which a Hall sensor 445 is disposed.

The camera device 10 may comprise a sensor holder 350. The second moving part 300 may comprise a sensor holder 350. The sensor holder 350 may be disposed in the sensor substrate 320. The sensor holder 350 may comprise a hole formed at a position corresponding to the image sensor 330. The sensor holder 350 may comprise a groove in which the filter 360 is disposed. The sensor holder 350 may be protruded above the second substrate 310. The sensor holder 350 may be disposed in the hole 312 of the second substrate 310. The sensor holder 350 may be overlapped with the second substrate 310 in a direction perpendicular to the optical axis direction. A part of the sensor holder 350 may be disposed between the second substrate 310 and the image sensor 330 in a direction perpendicular to the optical axis direction. The upper surface of the sensor holder 350 may be disposed to be higher than the upper surface of the holder 340 and to be lower than the upper surface of the second coil 440.

The camera device 10 may comprise a filter 360. The second moving part 300 may comprise a filter 360. The filter 360 may be disposed between the lens 220 and the image sensor 330. The filter 360 may be disposed in the sensor holder 350. The filter 360 may block light of a specific frequency band from being incident on the image sensor 330 from the light passing through the lens 220. The filter 360 may comprise an infrared cut filter. The filter 360 may block infrared rays from being incident on the image sensor 330. The filter 360 may be disposed at a position higher than the second substrate 310. The upper surface of the filter 360 may be disposed at the same height as the upper surface of the sensor holder 350.

The camera device 10 may comprise a terminal member 370. The terminal member 370 may be an interposer. The terminal member 370 may connect a wire 800 and the second substrate 310. The terminal member 370 may electrically connect the wire 800 and the second substrate 310.

The terminal member 370 may comprise a body part 371. The body part 371 may be formed of an insulating material. The body part 371 may be an insulation part. The body part 371 may be an insulator. However, the body part 371 may comprise a conductive region. The body part 371 may be disposed in the holder 340.

The terminal member 370 may comprise a terminal 372. The terminal 372 may be disposed in the body part 371. The terminal 372 may be formed of a metal. The terminal 372 may be formed of a conductive member. The terminal 372 may have elasticity at least in part.

The terminal 372 may comprise a first portion 373. The first portion 373 may be disposed in the body part 371. The terminal 372 may comprise a second portion 374. The second portion 374 may be extended to one side from the first portion 373. The second portion 374 may be coupled with the wire 800. The second portion 374 may comprise a bent portion. The second portion 374 may have elasticity. The terminal 372 may comprise a third portion 375. The third portion 375 may be extended from the first portion 373 toward the other side. The third portion 375 may be coupled with the second substrate 310.

The camera device 10 may comprise a driving unit. The driving unit may move the moving parts 200 and 300 against the fixed part 100. The driving unit may perform an auto focus (AF) function. The driving unit may perform a handshake correction (OIS) function. The driving unit may move the lens 220. The driving unit may move the image sensor 330. The driving unit may comprise a magnet and a coil. The driving unit may comprise a shape memory alloy (SMA).

The camera device 10 may comprise a first driving unit. The first driving unit may be an AF driving unit. The first driving unit may move the first moving part 200 in an optical axis direction. The first driving unit may move the bobbin 210 in an optical axis direction. The first driving unit may move the lens 220 in an optical axis direction. The first driving unit may perform an auto focus (AF) function. The first driving unit may move the first moving part 200 in an upward direction of the optical axis direction. The first driving unit may move the first moving part 200 in a downward direction of the optical axis direction. The first driving unit may comprise a first magnet 410. The first driving unit may comprise a first coil 430.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor holder 350 in a direction perpendicular to the optical axis direction. The second driving unit may move the filter 360 in a direction perpendicular to the optical axis direction. The second driving unit may perform a handshake correction (OIS) function. The second driving unit may comprise a second magnet 420. The second driving unit may comprise a second coil 440.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about the optical axis.

The camera device 10 may comprise a first magnet 410. The driving unit may comprise a first magnet 410. The first magnet 410 may be an AF magnet. The first magnet 410 may be used for AF driving. The first magnet 410 may be a magnet. The first magnet 410 may be a permanent magnet.

The first magnet 410 and the second magnet 420 may be formed of one magnet. Any one of the first magnet 410 and the second magnet 420 may be omitted. The first magnet 410 and the second magnet 420 may be disposed in the fixed part 100. The first magnet 410 and the second magnet 420 may be described as one configuration of the fixed part 100.

The first magnet 410 may be disposed in the fixed part 100. The first magnet 410 may be fixed to the fixed part 100. The first magnet 410 may be coupled to the fixed part 100. The first magnet 410 may be attached to the fixed part 100 by an adhesive. The first magnet 410 may be disposed in the housing 130. The first magnet 410 may be fixed to the housing 130. The first magnet 410 may be coupled to the housing 130. The first magnet 410 may be attached to the housing 130 by an adhesive.

The first magnet 410 may be a two-pole magnetized magnet comprising one N-pole region and one S-pole region. As a modified embodiment, the first magnet 410 may be a four-pole magnetized magnet comprising two N-pole regions and two S-pole regions.

The first magnet 410 may comprise a plurality of magnets. The first magnet 410 may comprise two magnets. The two first magnets 410 may be disposed between the four second magnets 420. The first magnet 410 may comprise first and second unit magnets. The first and second unit magnets may be disposed symmetrically to the optical axis. The first and second unit magnets may be formed to have the same size and shape as each other.

The camera device 10 may comprise a second magnet 420. The driving unit may comprise a second magnet 420. The second magnet 420 may be an OIS magnet 420. The second magnet 420 may be used for OIS driving. The second magnet 420 may be a magnet. The second magnet 420 may be a permanent magnet.

The second magnet 420 may be disposed in the fixed part 100. The second magnet 420 may be fixed to the fixed part 100. The second magnet 420 may be coupled to the fixed part 100. The second magnet 420 may be attached to the fixed part 100 by an adhesive. The second magnet 420 may be disposed in the housing 130. The second magnet 420 may be fixed to the housing 130. The second magnet 420 may be coupled to the housing 130. The second magnet 420 may be attached to the housing 130 by an adhesive. The second magnet 420 may be disposed at a corner of the housing 130. The second magnet 420 may be disposed to be biased toward a corner of the housing 130.

The second magnet 420 may be a four-pole magnetized magnet comprising two N-pole regions and two S-pole regions. As a modified embodiment, the second magnet 420 may be a two-pole magnetized magnet comprising one N-pole region and one S-pole region.

The second magnet 420 may comprise a plurality of magnets. The second magnet 420 may comprise four magnets. The four second magnets 420 may be respectively disposed in four corner areas of the fixed part 100. The second magnet 420 may comprise first to fourth unit magnets. The unit magnets may be disposed symmetrically to the optical axis, and the first to fourth unit magnets may be formed to have the same size and shape.

In a first embodiment of the present invention, the sizes of the first magnet 410 and the second magnet 420 may be different from each other. In a direction parallel to the outer surface of the first sidewall of the fixed part 100, at least a portion of the first magnet 410 may be overlapped with the second magnet 420. At least a portion of the first magnet 410 may be overlapped with the second magnet 420 in a direction perpendicular to the optical axis direction. The first magnet 410 may be formed separately from the second magnet 420. The first magnet 410 may be spaced apart from the second magnet 420. The thickness of the second magnet 420 in an optical axis direction may be thinner than the thickness of the first magnet 410. The length of the long axis of the first magnet 410 may be greater than the length of the long axis of the second magnet 420.

The first magnet 410 may comprise a first unit magnet being disposed in the central region of the first sidewall of the fixed part 100. The second magnet 420 may comprise a first unit magnet being disposed on a first sidewall of the fixed part 100. The first unit magnet of the first magnet 410 may be spaced apart from the first unit magnet of the second magnet 420. The first unit magnet of the first magnet 410 and the first unit magnet of the second magnet 420 may be respectively disposed in a long axis direction of the magnet. The first unit magnet of the first magnet 410 and the first unit magnet of the second magnet 420 may be disposed long in length in a first direction perpendicular to the optical axis direction. The second magnet 420 may comprise a second unit magnet being disposed on a first sidewall of the fixed part 100. The first unit magnet of the first magnet 410 may be disposed between the first unit magnet and the second unit magnet of the second magnet 420. The second unit magnet of the second magnet 420 may be disposed on a first sidewall of the fixed part 100 in a short axis direction. The second unit magnets of the second magnet 420 may be disposed long in length in a second direction perpendicular to the optical axis direction and the first direction. That is, the first unit magnet and the second unit magnet of the second magnet 420 may be disposed in different directions. In a direction parallel to the outer side surface of the first sidewall of the fixed part 100, the shortest distance between the first unit magnet of the first magnet 410 and the first unit magnet of the second magnet 420 may be smaller than the shortest distance between the first unit magnet of the first magnet 410 and the second unit magnet of the second magnet 420. Conversely, in a direction parallel to the outer side surface of the first sidewall of the fixed part 100, the shortest distance between the first unit magnet of the first magnet 410 and the first unit magnet of the second magnet 420 may be greater than the shortest distance between the first unit magnet of the first magnet 410 and the second unit magnet of the second magnet 420.

Two of the four second magnets 420 are disposed on a first sidewall of the housing 130, and the other two may be disposed on a second sidewall at the opposite side. The separation distance between the unit magnet of the first magnet 410 and the unit magnet of the second magnet 420 may be different at both sides of the unit magnet of the first magnet 410.

With respect to the short axis of the first unit magnet of the first magnet 410, the first unit magnet of the first magnet 410 may be overlapped with the first unit magnet of the second magnet 420 by 60% or more. The first magnet 410 and the second magnet 420 may be spaced apart by 0.3 mm or more.

In the first embodiment of the present invention, the first magnet 410 and the second magnet 420 may be disposed together in the housing 130 formed integrally. At this time, the first magnet 410 may be disposed in a first region of the first sidewall of the housing 130, and the second magnet 420 may be disposed in a second region of the first sidewall of the housing 130. The first region of the housing 130 may comprise a central region of the first sidewall of the housing 130 in a direction parallel to the optical axis direction. The second region of the housing 130 may comprise a corner region of the first sidewall of the housing 130 in a direction parallel to the optical axis direction. The second region may comprise a peripheral region of the first sidewall.

In a first embodiment of the present invention, a VCM (voice coil motor) can be integrated into one VCM by integrating the parts to which the first magnet 410 and the second magnet 420 are being assembled. The first embodiment of the present invention may comprise a structure in which lens driving (AF) and image sensor driving (OIS) are implemented with two VCMs inside a one-body actuator. In a first embodiment of the present invention, the material cost reduction effect can be expected through the integration of the magnet support parts. In addition, it is possible to reduce the height dimension through the actuator integration. That is, the shoulder height of the camera device 10 may be reduced.

As a modified embodiment, the first magnet 410 and the second magnet 420 may be disposed in the moving parts 200 and 300, and the first coil 430 and the second coil 440 may be disposed in the fixed part 100.

The camera device 10 may comprise a first coil 430. The driving unit may comprise a first coil 430. The first coil 430 may be an AF coil. The first coil 430 may be used for AF driving. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed in the bobbin 210. The first coil 430 may be fixed to the bobbin 210. The first coil 430 may be coupled to the bobbin 210. The first coil 430 may be attached to the bobbin 210 by an adhesive. The first coil 430 may be disposed around the outer circumferential surface of the bobbin 210. The first coil 430 may be electrically connected to the driver IC 480.

The first coil 430 may be electrically connected to the lower elastic member 720, the sensing substrate 470, and the driver IC 480. The first coil 430 may receive a current from the driver IC 480. The first coil 430 may be understood as one configuration of the first moving part 200.

The first coil 430 may be disposed at a position corresponding to the first magnet 410. The first coil 430 may be disposed in the bobbin 210 at a position corresponding to the first magnet 410. The first coil 430 may be disposed at a position corresponding to the first magnet 410 in the first moving part 200. The first coil 430 may face the first magnet 410. The first coil 430 may comprise a surface facing the first magnet 410. The first coil 430 may be disposed adjacent to the first magnet 410. The first coil 430 may interact with the first magnet 410. The first coil 430 may electromagnetically interact with the first magnet 410.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 in an upward direction of the optical axis direction. The first coil 430 may move the bobbin 210 in an upward direction of the optical axis direction. The first coil 430 may move the lens 220 in an upward direction of the optical axis direction. The first coil 430 may move the first moving part 200 in a downward direction of the optical axis direction. The first coil 430 may move the bobbin 210 in a downward direction of the optical axis direction. The first coil 430 may move the lens 220 in a downward direction of the optical axis direction. The first coil 430 may move the first moving part 200 in an optical axis direction through interaction with the first magnet 410.

The camera device 10 may comprise a second coil 440. The driving unit may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be wound around the protrusion of the holder 340 and disposed. The second coil 440 may be disposed on the holder 340. The second coil 440 may be electrically connected to the second substrate 310. Both ends of the second coil 440 may be soldered to the second substrate 310. The second coil 440 may be coupled to the second substrate 310 by soldering. The second coil 440 may be electrically connected to the driver IC 495. The second coil 440 may be electrically connected to the second substrate 310 and the driver IC 495. The second coil 440 may receive a current from the driver IC 495. The second coil 440 may be understood as one configuration of the second moving part 300.

The second coil 440 may be disposed at a position corresponding to the second magnet 420. The second coil 440 may be disposed at a position corresponding to the second magnet 420 in the holder 340. The second coil 440 may be disposed at a position corresponding to the second magnet 420 in the second moving part 300. The second coil 440 may face the second magnet 420. The second coil 440 may comprise a surface facing the second magnet 420. The second coil 440 may be disposed adjacent to the second magnet 420. The second coil 440 may interact with the second magnet 420. The second coil 440 may electromagnetically interact with the second magnet 420.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis. The second coil 440 may move the second moving part 300 in a direction perpendicular to the optical axis direction and rotate it with respect to the optical axis through interaction with the second magnet 420.

The second coil 440 may comprise a plurality of coils. The second coil 440 may comprise four coils. The second coil 440 may comprise a coil for x-axis shift. The second coil 440 may comprise a coil for y-axis shift.

The second coil 440 may comprise a second-first coil 441. The second-first coil 441 may be a first unit coil. The second-first coil 441 may be a first sub-coil. The second-first coil 441 may be a coil for x-axis shift. The second-first coil 441 may move the second moving part 300 in the x-axis direction. The second-first coil 441 may be disposed long in length along the y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, the two coils of the second-first coil 441 may receive current together. Or, the two coils of the second-first coil 441 may be electrically separated from each other to receive current individually.

The second coil 440 may comprise a second-second coil 442. The second-second coil 442 may be a second unit coil. The second-second coil 442 may be a second sub-coil. The second-second coil 442 may be a coil for y-axis shift. The second-second coil 442 may move the second moving part 300 in the y-axis direction. The second-second coil 442 may be disposed in length along the x-axis. The second-first coil 441 may comprise a plurality of coils. The second-second coil 442 may comprise two coils. The two coils of the second-second coil 442 may be electrically connected to each other. The second-second coil 442 may comprise a connection coil connecting the two coils. In this case, the two coils of the second-second coil 442 may receive current together. Or, the two coils of the second-second coil 442 may be electrically separated from each other to receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall IC. The Hall sensor 445 may detect the second magnet 420. The Hall sensor 445 may detect the magnetic force of the second magnet 420. The Hall sensor 445 may face the second magnet 420. The Hall sensor 445 may be disposed at a position corresponding to the second magnet 420. The Hall sensor 445 may be disposed adjacent to the second magnet 420. The Hall sensor 445 may detect the position of the second moving part 300. The Hall sensor 445 may detect the movement of the second moving part 300. The Hall sensor 445 may be disposed in a hollow of the second coil 440. The detected value detected by the Hall sensor 445 may be used to feedback the handshake correction operation. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect the displacement of the second moving part 300 in the x-axis direction. The second Hall sensor may detect the displacement of the second moving part 300 in the y-axis direction. The third Hall sensor may detect the rotation of the second moving part 300 about the z-axis alone or together with any one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the driving magnets 410 and 420. Through this, the influence of the sensing magnet 450 on driving may be minimized.

The sensing magnet 450 may be disposed at an opposite side of the correction magnet 460. The sensing magnet 450 and the correction magnet 460 may be disposed opposite to each other in the first moving part 200. The sensing magnet 450 and the correction magnet 460 may be disposed opposite to each other in the bobbin 210.

The camera device 10 may comprise a correction magnet 460. The correction magnet 460 may be a compensating magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a smaller size than the driving magnets 410 and 420. Through this, the influence of the correction magnet 460 on driving may be minimized. In addition, the correction magnet 460 may be disposed at an opposite side of the sensing magnet 450 to form a magnetic force balance with the sensing magnet 450. Through this, a tilt that may be generated by the sensing magnet 450 may be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled with the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130.

The camera device 10 may comprise a driver IC 480. The driver IC 480 may be an AF driver IC. The driver IC 480 may be electrically connected to the first coil 430. The driver IC 480 may apply a current to the first coil 430 to perform AF driving. The driver IC 480 may apply power to the first coil 430. The driver IC 480 may apply a current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450. The driver IC 480 may detect the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part 200. The detected value detected by the sensor may be used for feedback of auto focus driving.

The camera device 10 may comprise a gyro sensor 490. The gyro sensor 490 may be disposed on the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shaking of the camera device 10 detected by the gyro sensor 490 may be used to drive the handshake correction (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply power to the second coil 440. The driver IC 495 may apply a current to the second coil 440. The driver IC 495 may apply a voltage to the second coil 440. The driver IC 495 may be disposed in the second substrate 310.

The camera device 10 may comprise an interposer. The interposer may movably support the second moving part 300. The interposer may be electrically connected to the image sensor 330. The interposer may provide an electrical conduction line connecting the image sensor 330 to the outside. The interposer may comprise a wire 800.

In a modified embodiment, the camera device 10 may comprise a connection substrate which is a configuration not illustrated. The interposer may be a connection substrate. The connection substrate may be a connection part. The connection substrate may be a connection member. The connection substrate may be a flexible substrate. The connection substrate may be a soft substrate. The connection substrate may be a flexible printed circuit board. The connection substrate may be a flexible printed circuit board (FPCB). The connection substrate may be flexible at least in part. The second substrate 310 and the connection substrate may be integrally formed. The connection substrate may connect the second substrate 310 and the first substrate 110. The connection substrate may electrically connect the second substrate 310 and the first substrate 110.

The connection substrate may support the second moving part 300. The connection substrate may support the movement of the second moving part 300. The connection substrate may movably support the second moving part 300. The connection substrate may connect the second moving part 300 and the fixed part 100. The connection substrate can connect the first substrate 110 and the second substrate 310. The connection substrate may electrically connect the first substrate 110 and the second substrate 310. The connection substrate may guide the movement of the second moving part 300. The connection substrate may guide the second moving part 300 to move in a direction perpendicular to the optical axis direction. The connection substrate may guide the second moving part 300 to rotate about the optical axis. The connection substrate may limit the movement of the second moving part 300 in an optical axis direction. A portion of the connection substrate may be coupled to the base 120.

The connection substrate may comprise a first portion coupled to the first substrate 110, a second portion coupled to the second substrate 310, and a third portion connecting the first portion and the second portion. The third portion may be disposed parallel to an optical axis at least in part. The third portion may be formed to have the length in an optical axis direction longer than a thickness. The second portion of the connection substrate may be disposed parallel to the second substrate 310 at least in part. The third portion of the connection substrate may be disposed vertically with respect to the second portion at least in part. The third portion of the connection substrate may be bent roundly in a portion corresponding to the corner of the second substrate 310.

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 130. The elastic member 700 may elastically connect the bobbin 210 and the housing 130. The elastic member 700 may movably support the first moving part 200 against the fixed part 100. The elastic member 700 may be deformed when the first moving part 200 is moved. When the movement of the first moving part 200 is finished, the elastic member 700 may position the first moving part 200 to an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part 200.

The camera device 10 may comprise an upper elastic member 710. The elastic member 700 may comprise an upper elastic member 710. The upper elastic member 710 may be disposed above the lower elastic member 720. The upper elastic member 710 may comprise an inner side portion coupled to the bobbin 210. An inner side portion of the upper elastic member 710 may be coupled to an upper portion of the bobbin 210. The inner portion of the upper elastic member 710 may be disposed on an upper surface of the bobbin 210. The upper elastic member 710 may comprise an outer side portion being coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connection part connecting the inner side portion and the outer side portion. The connection part may have elasticity.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise an outer side portion being coupled to the housing 130. The outer side portion of the lower elastic member 720 may be coupled to an upper portion of the housing 130. The outer side portion of the lower elastic member 720 may be disposed on an upper surface of the housing 130. The lower elastic member 720 may comprise a connection part connecting an inner side portion and an outer side portion. The connection part may have elasticity.

The lower elastic member 720 may comprise a plurality of lower elastic units. The lower elastic member 720 may comprise first and second lower elastic units 720-1 and 720-2. The lower elastic member 720 may comprise two lower elastic units 720-1 and 720-2. The two lower elastic units 720-1 and 720-2 are spaced apart from each other to electrically connect the sensing substrate 470 and the first coil 430. The lower elastic member 720 may comprise two lower elastic members 720. The two lower elastic members 720 may electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 may connect the fixed part 100 and the second moving part 300. The wire 800 may elastically connect the fixed part 100 and the second moving part 300. The wire 800 may electrically connect the first substrate 110 and the second substrate 310. The wire 800 may movably support the second moving part 300. The wire 800 may support the second moving part 300 to move or rotate in a direction perpendicular to the optical axis direction. The wire 800 may be disposed in an optical axis direction. The wire 800 may be disposed parallel to the optical axis. The wire 800 may be formed of metal. The wire 800 may be formed of a conductive material. The wire 800 may have elasticity at least in part. The wire 800 may comprise a plurality of wires. Wire 800 may comprise 36 wires.

Hereinafter, driving of the camera device according to a first embodiment of the present invention will be described with reference to the drawings.

Figure 18:
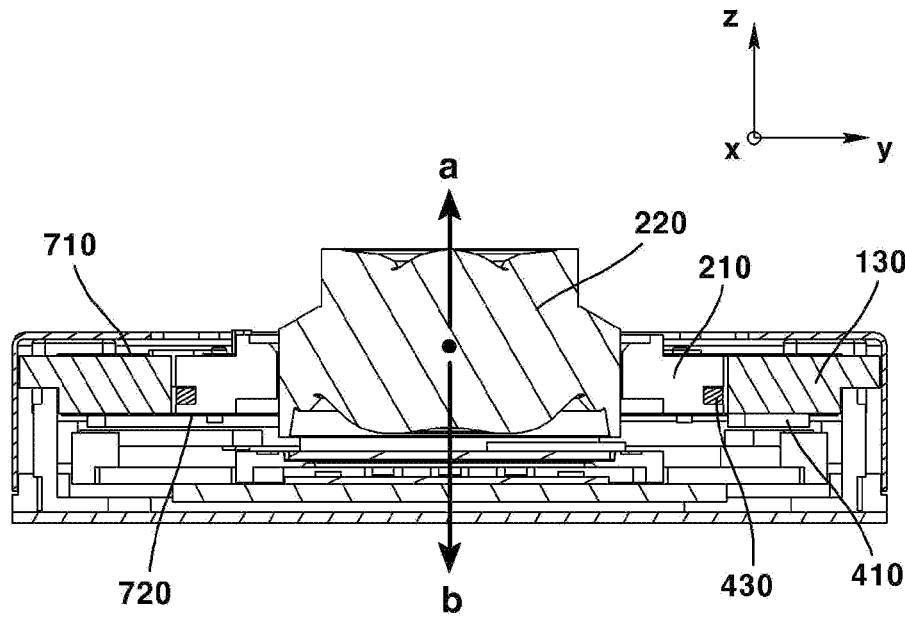
FIG. 18 is a diagram for explaining the operation of an auto focus function of a camera device according to a first embodiment of the present invention.

FIG. 18 is a diagram for explaining the operation of an auto focus function of a camera device according to a first embodiment of the present invention.

When power is applied to the first coil 430 of the camera device 10 according to a first embodiment of the present invention, an electromagnetic field is formed in the first coil 430 and the first coil 430 can move in an optical axis direction (z-axis direction) through electromagnetic interaction formed with a first magnet 410. At this time, the first coil 430 may move in the optical axis direction together with the first moving part 200 comprising the lens 220. In this case, since the lens 220 moves away from or closer to the image sensor 330, the focus of the subject may be adjusted. In order to apply power to the first coil 430, any one or more of a current and a voltage may be applied.

When a current in the first direction is applied to the first coil 430 of the camera device 10 according to a first embodiment of the present invention, the first coil 430 can move in an upward direction (refer to a in FIG. 18) of the optical axis direction through electromagnetic interaction with the first magnet 410. At this time, the first coil 430 may move the lens 220 in an upward direction of the optical axis directions move away from the image sensor 330.

When a current in a second direction opposite to the first direction is applied to the first coil 430 of the camera device 10 according to a first embodiment of the present invention, the first coil 430 can move in a lower direction (refer to b in FIG. 18) of the optical axis direction through electromagnetic interaction with the first magnet 410. It In this case, the first coil 430 may move the lens 220 in a lower direction of the optical axis so as to be closer to the image sensor 330.

Figure 19:
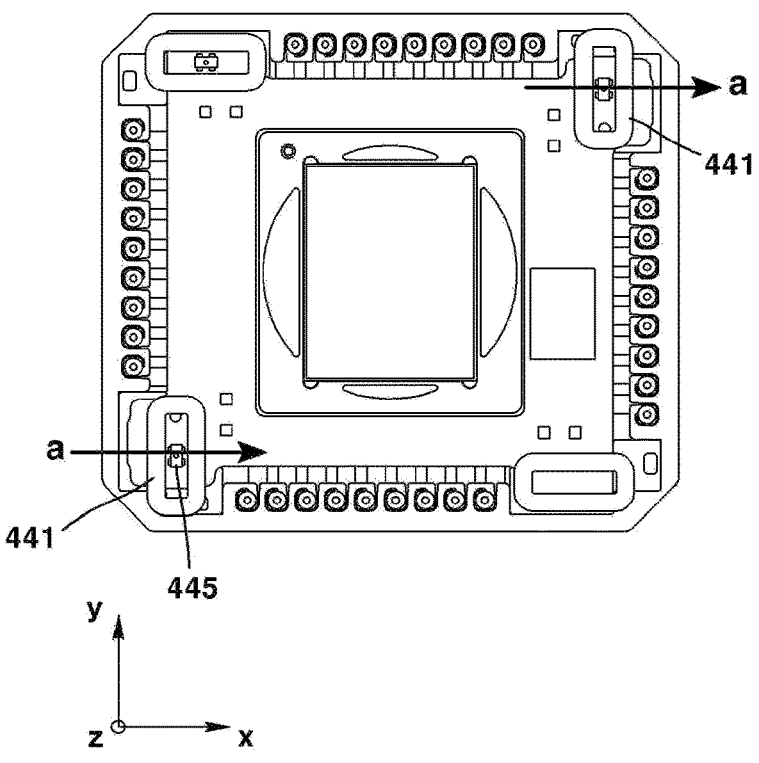
FIGS. 19 to 21 are diagrams for explaining an operation of the handshake correction function of a camera device according to a first embodiment of the present invention. In more detail.
Figure 20:
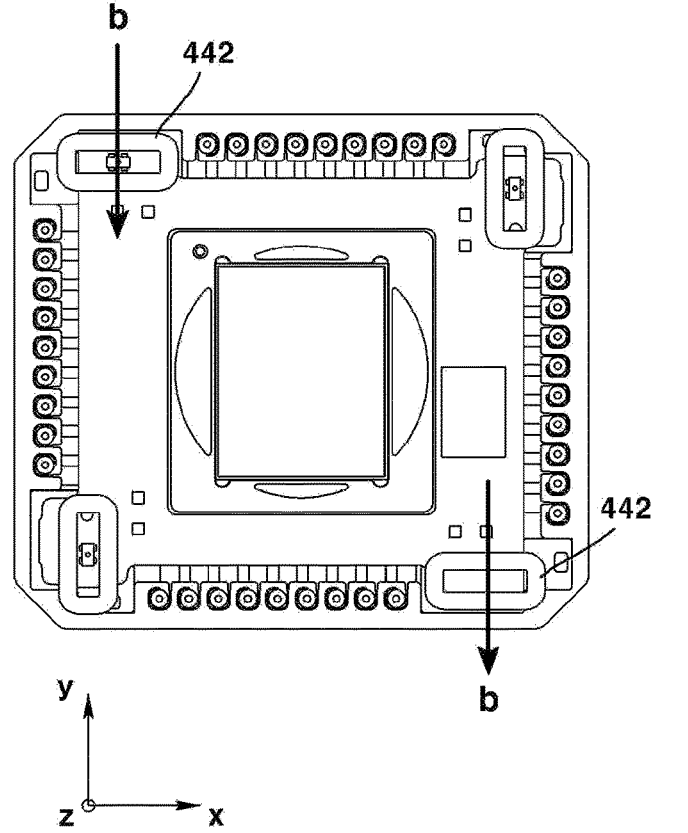
Figure 21:
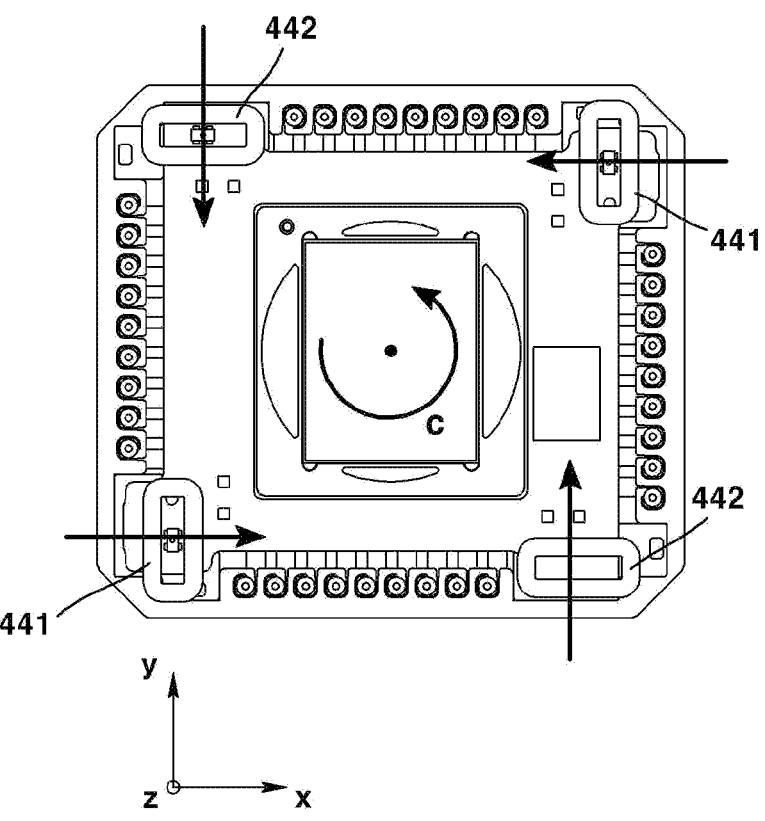

FIGS. 19 to 21 are diagrams for explaining an operation of the handshake correction function of a camera device according to a first embodiment of the present invention.

When power is applied to the second coil 440 of the camera device 10 according to a first embodiment of the present invention, an electromagnetic field is formed in the second coil 440, and the second coil 440 may move in a direction perpendicular to the optical axis direction through electromagnetic interaction with the second magnet 420. In addition, the second coil 440 may rotate about the optical axis through electromagnetic interaction with the second magnet 420. At this time, the second coil 440 may move or rotate together with the second moving part 300 comprising the image sensor 330. In a first embodiment of the present invention, the second coil 440 may move the image sensor 330 to compensate for shaking of the camera device 10 detected by the gyro sensor 490.

FIG. 19 is a diagram for explaining driving in which an image sensor of a camera device is shifted along the x-axis according to a first embodiment of the present invention.

When a current in the first direction is applied to the second-first coil 441 of the camera device 10 according to a first embodiment of the present invention, the second-first coil 441 may move in one direction (refer to a in FIG. 19) among the first directions (x-axis direction) perpendicular to the optical axis direction through electromagnetic interaction with the second magnet 420. At this time, the second-first coil 441 may move the image sensor 330 in one of the first directions perpendicular to the optical axis direction. Conversely, when a current in a second direction opposite to the first direction is applied to the second-first coil 441, the second-first coil 441 may move in the other of the first directions (x-axis direction) perpendicular to the optical axis direction through electromagnetic interaction with the second magnet 420. At this time, the second-first coil 441 may move the image sensor 330 in the other among the first directions perpendicular to the optical axis direction.

FIG. 20 is a diagram for explaining driving in which an image sensor of a camera device is shifted along the y-axis according to a first embodiment of the present invention.

When a current in the first direction is applied to the second-second coil 442 of the camera device 10 according to a first embodiment of the present invention, the second-second coil 442 may move in one of the second directions (y-axis direction) perpendicular to the optical axis direction (refer to b in FIG. 20) through electromagnetic interaction with the second magnet 420. At this time, the second-second coil 442 may move the image sensor 330 in one of the second directions perpendicular to the optical axis direction. Conversely, when a current in a second direction opposite to the first direction is applied to the second-second coil 442, the second-second coil 442 may move in the other direction among the second directions (y-axis direction) perpendicular to the optical axis direction through electromagnetic interaction with the second magnet 420. At this time, the second-second coil 442 may move the image sensor 330 in the other direction among the second directions perpendicular to the optical axis direction.

FIG. 21 is a diagram for explaining the driving of an image sensor of a camera device according to a first embodiment of the present invention being rolled about the z-axis.

When a current in a first direction is applied to the second-first coil 441 and the second-second coil 442 of the camera device 10 according to a first embodiment of the present invention, the second-first coil 441 and the second-second coil 442 may rotate in one direction about the optical axis through electromagnetic interaction with the second magnet 420 (refer to c in FIG. 21). At this time, the second-first coil 441 and the second-second coil 442 may rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 may rotate in other directions about the optical axis through electromagnetic interaction with the second magnet 420. At this time, the second-first coil 441 and the second-second coil 442 may rotate the image sensor 330 in other directions about the optical axis. At this time, the other direction may be clockwise.

Hereinafter, an optical apparatus according to a first embodiment of the present invention will be described with reference to the drawings.

Figure 22:
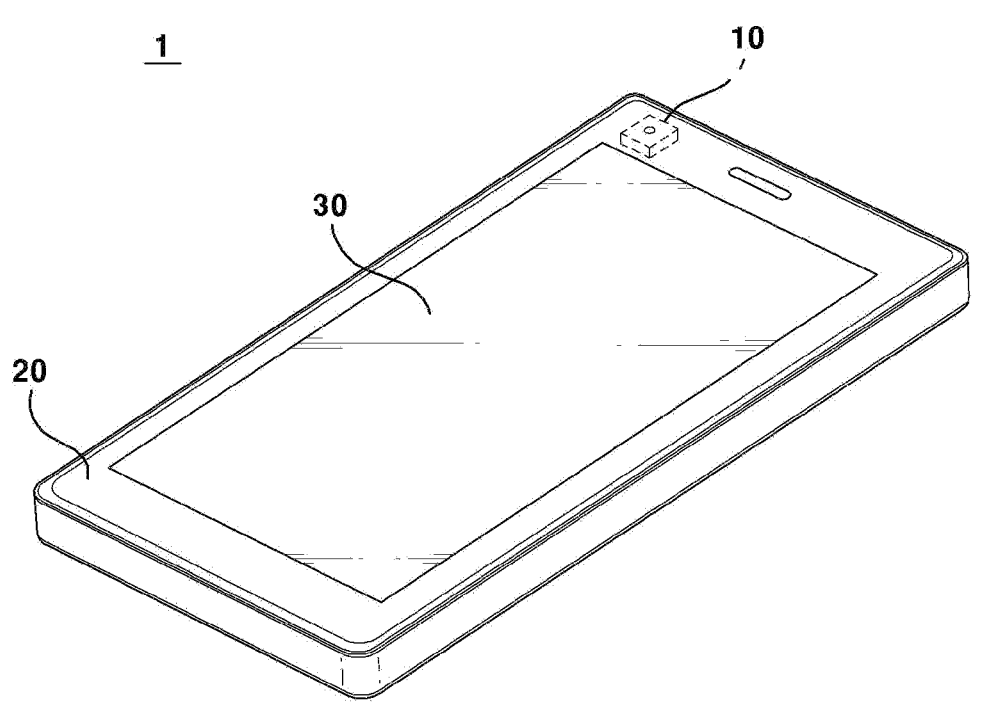
FIG. 22 is a perspective view of an optical apparatus according to a first embodiment of the present invention.
Figure 23:
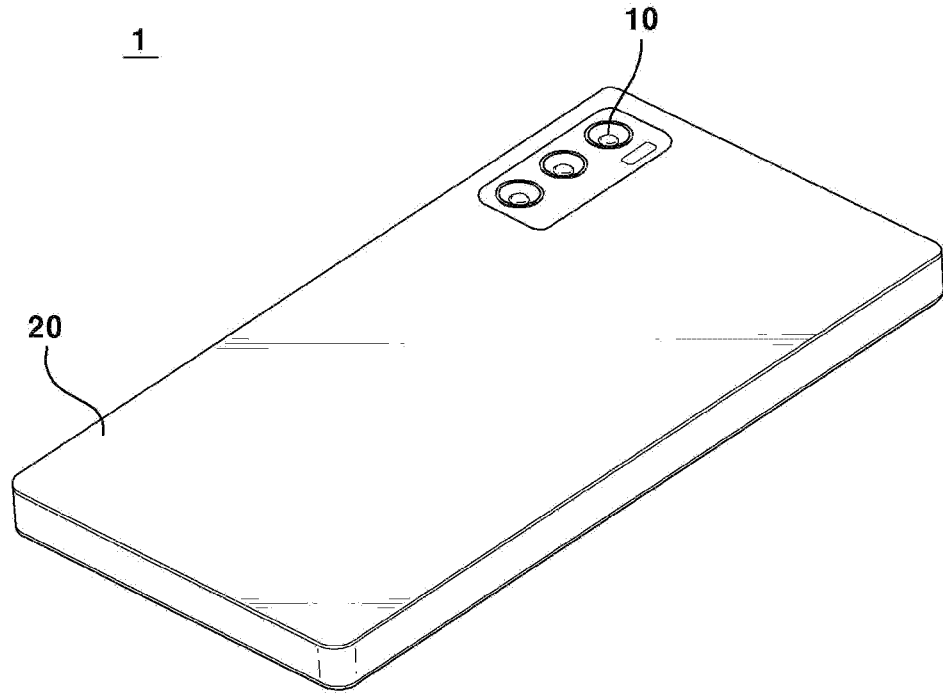
FIG. 23 is a perspective view of an optical apparatus according to a first embodiment of the present invention as viewed from a different direction from that of FIG. 22.

FIG. 22 is a perspective view of an optical apparatus according to a first embodiment of the present invention; and FIG. 23 is a perspective view of an optical apparatus according to a first embodiment of the present invention as viewed from a different direction from that of FIG. 22.

The optical apparatus 1 may comprise any one or more of a mobile phone, a mobile phone, a mobile terminal, a mobile terminal, a smart phone, a smart pad, a portable smart device, a digital camera, a laptop computer, a digital broadcasting terminal, a personal digital assistant (PDA), a portable multimedia player (PMP), and navigation. The optical apparatus 1 may comprise any device for photographing images or photos.

The optical apparatus 1 may comprise a main body 20. The optical apparatus 1 may comprise a camera device 10. The camera device 10 may be disposed in the main body 20. The camera device 10 may photograph a subject. The optical apparatus 1 may comprise a display 30. The display 30 may be disposed in the main body 20. The display 30 may output any one or more of a video and an image photographed by the camera device 10. The display 30 may be disposed on the first surface of the main body 20. The camera device 10 may be disposed on any one or more of the first surface of the main body 20 and the second surface opposite to the first surface.

Hereinafter, a camera device according to a second embodiment of the present invention will be described with reference to the drawings.

Figure 24:
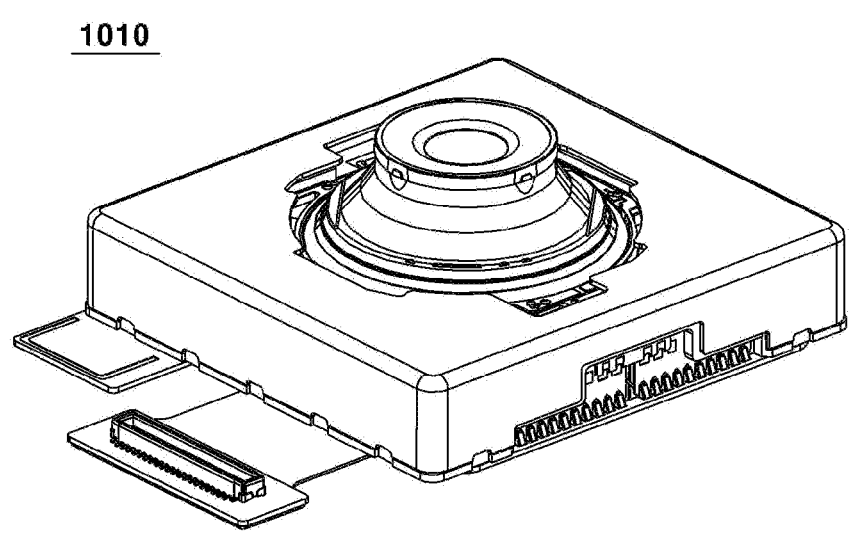
FIG. 24 is a perspective view of a camera device according to a second embodiment of the present invention.
Figure 25:
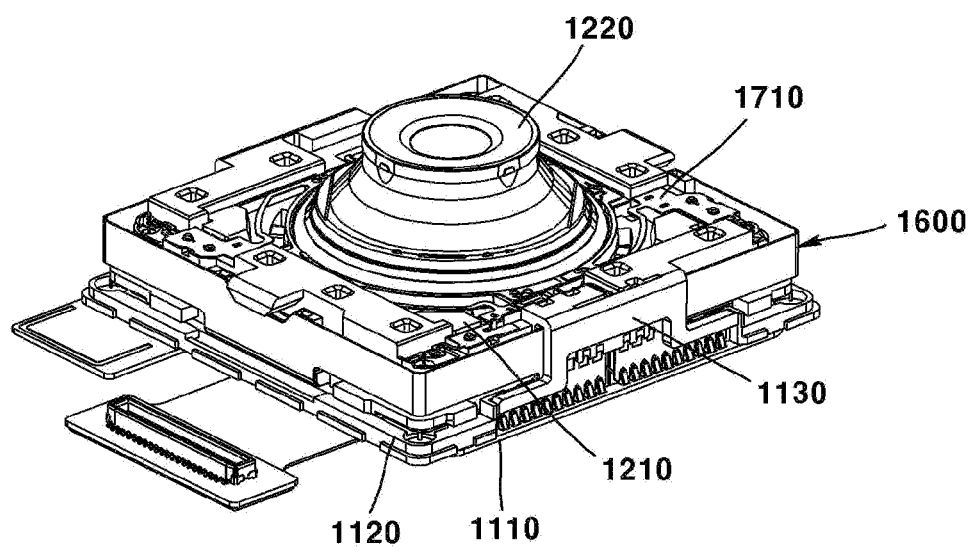
FIG. 25 is a perspective view illustrating a state in which the cover member is omitted from the camera device according to a second embodiment of the present invention.
Figure 26:
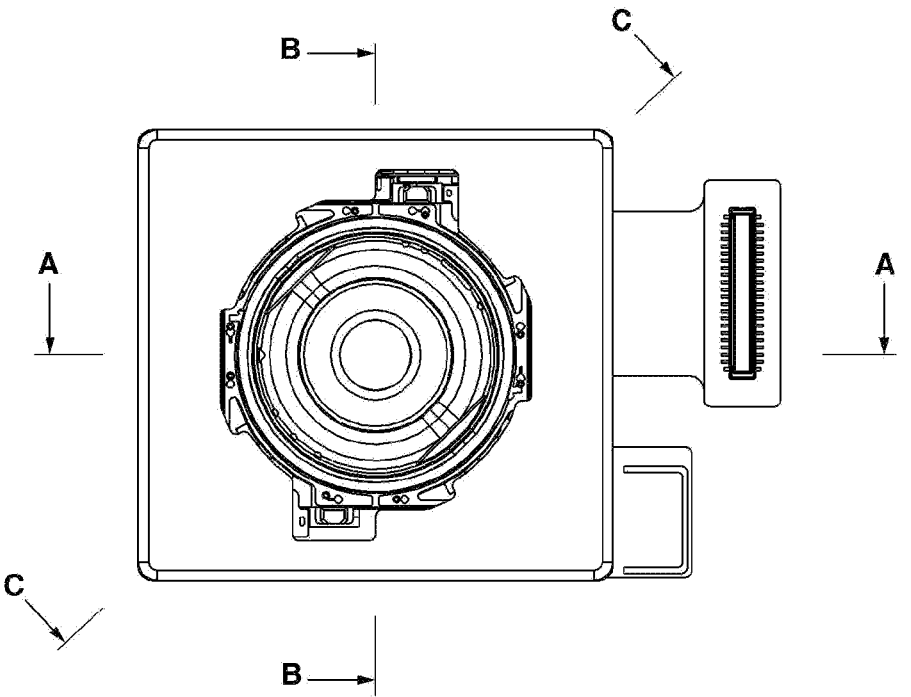
FIG. 26 is a plan view of a camera device according to a second embodiment of the present invention.
Figure 27:
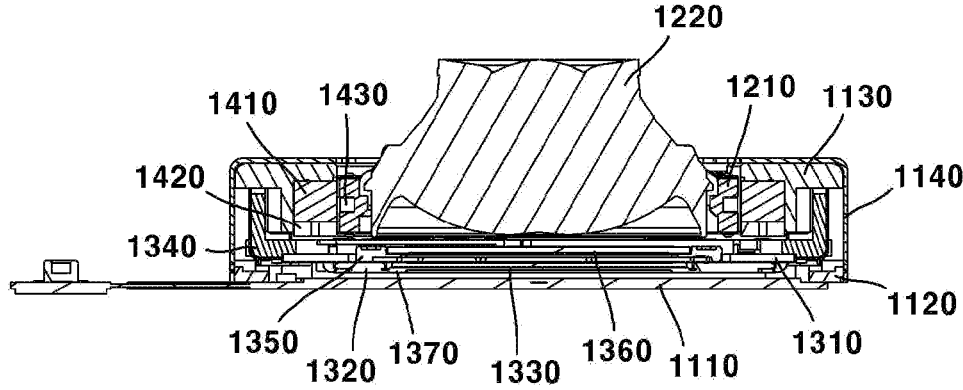
FIG. 27 is a cross-sectional view taken along line A-A of FIG. 26.
Figure 28A:
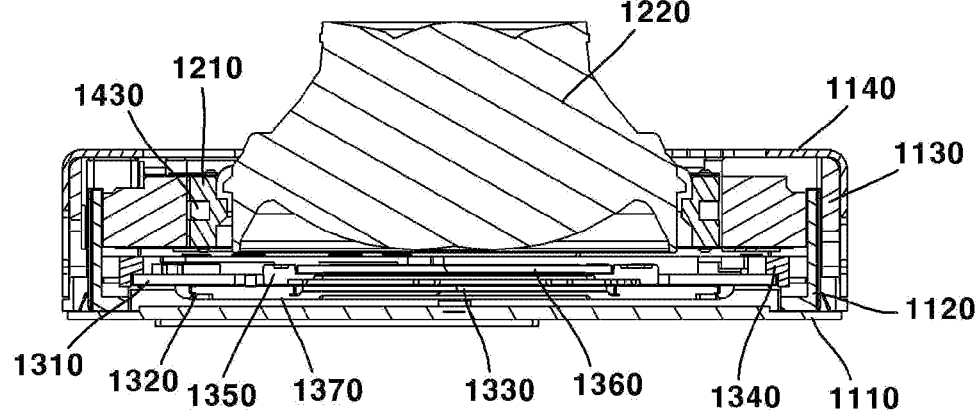
FIG. 28_a_ is a cross-sectional view taken along line B-B of FIG. 26.
Figure 28B:
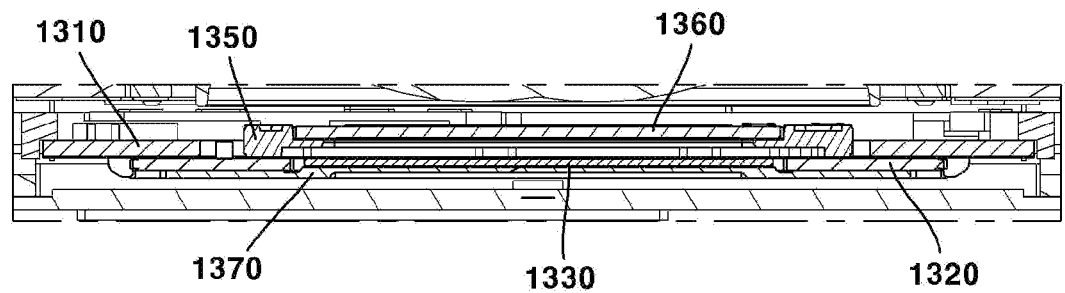
Figure 29:
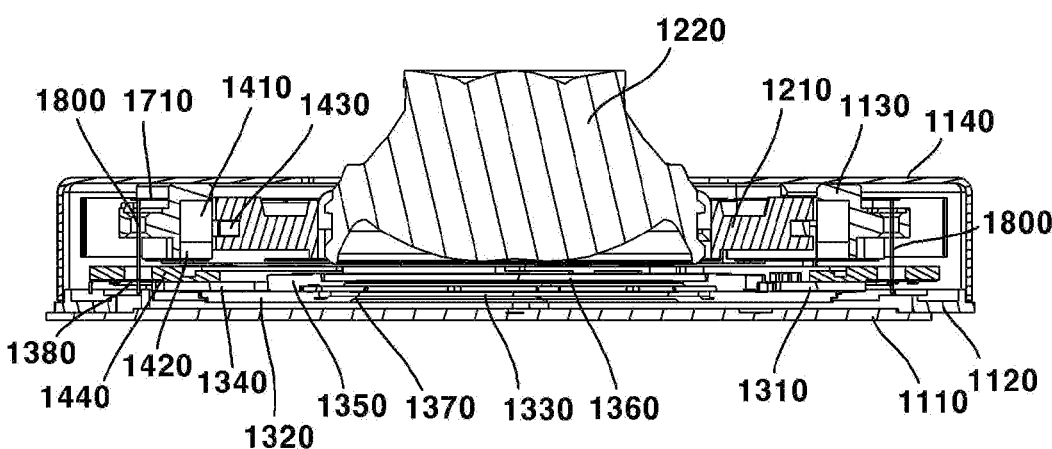
FIG. 29 is a cross-sectional view taken along line C-C of FIG. 26.
Figure 30:
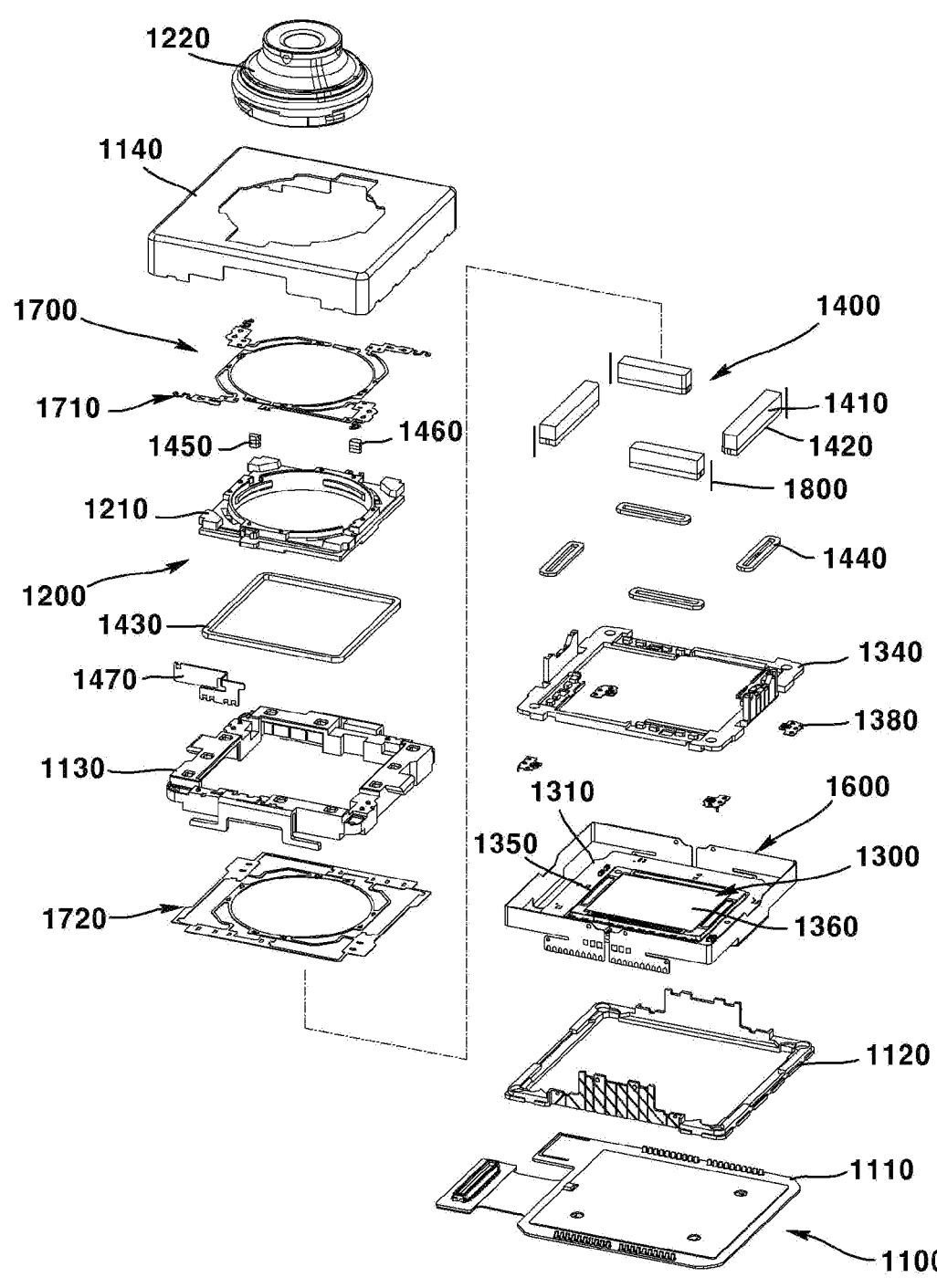
FIG. 30 is an exploded perspective view of a camera device according to a second embodiment of the present invention.
Figure 31:
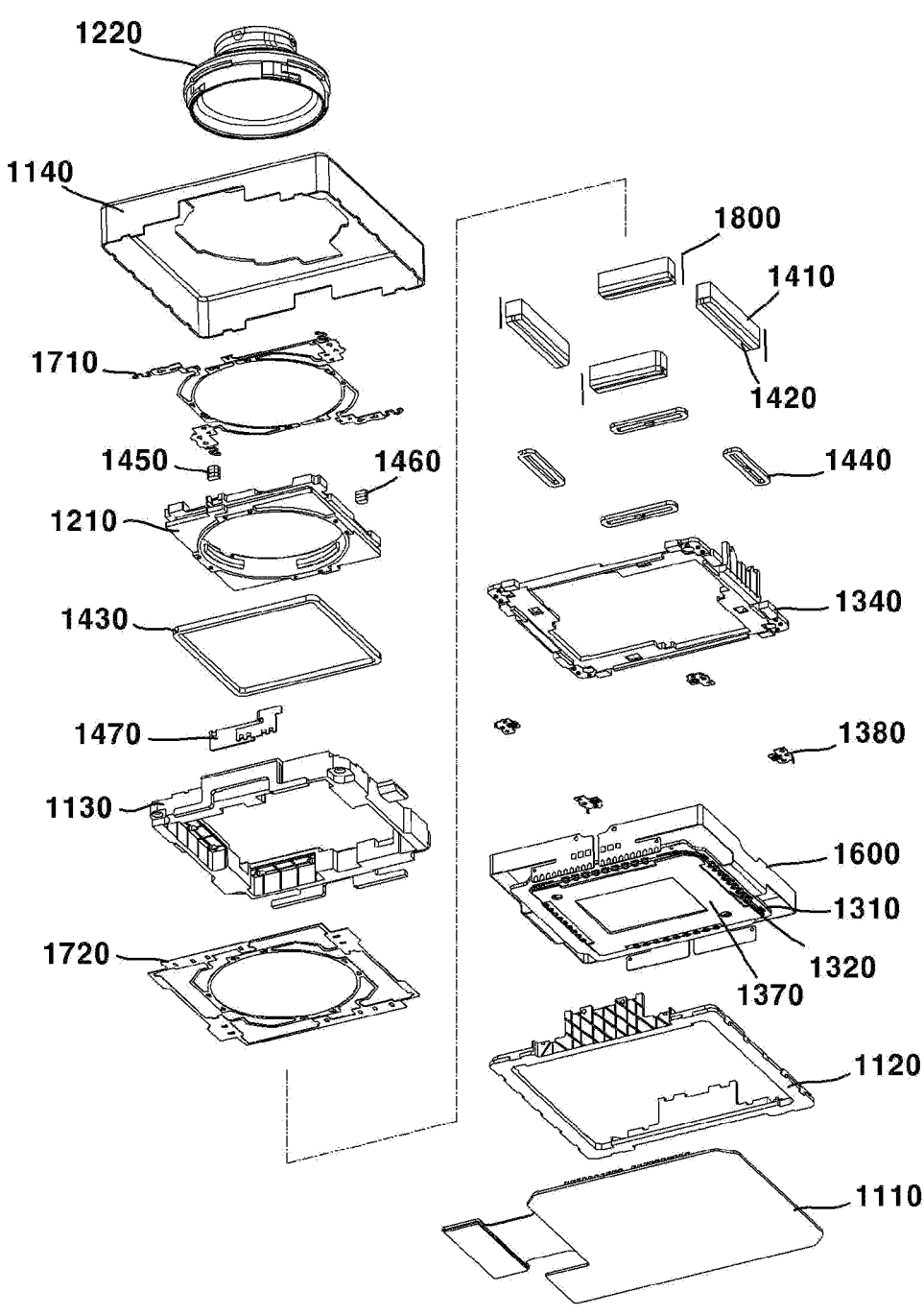
FIG. 31 is an exploded perspective view of a camera device according to a second embodiment of the present invention, viewed from a different direction from that of FIG. 30.
Figure 32:
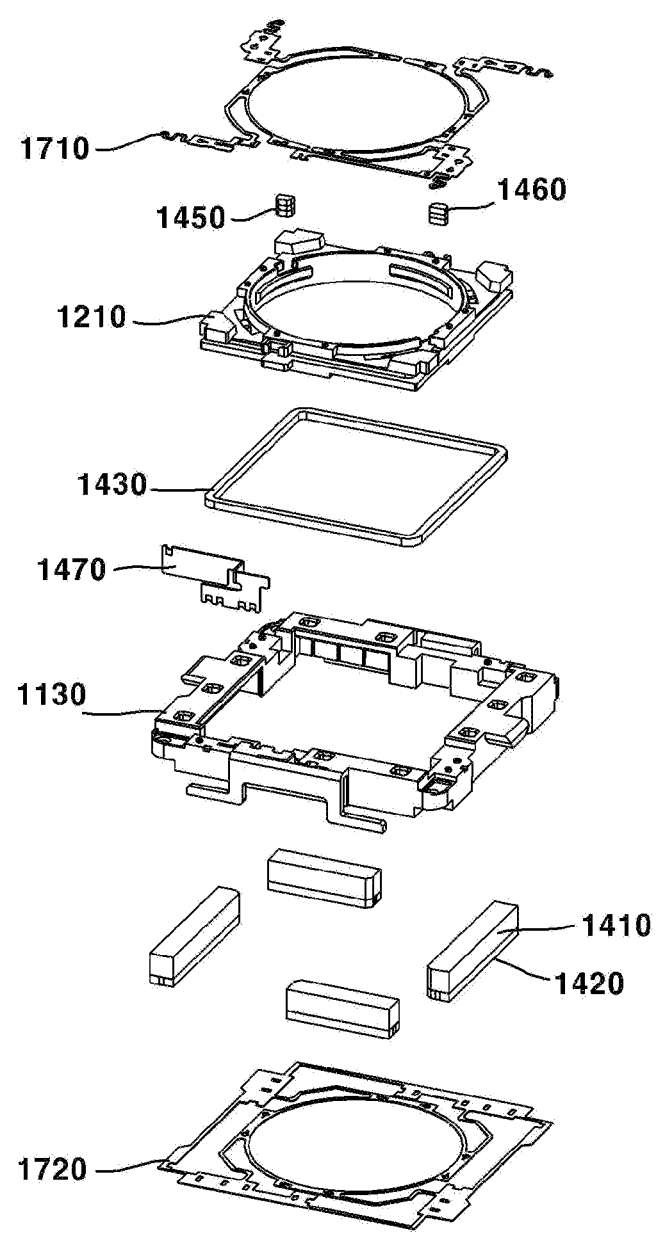
FIG. 32 is an exploded perspective view of a first moving part and related components of a camera device according to a second embodiment of the present invention.
Figure 33:
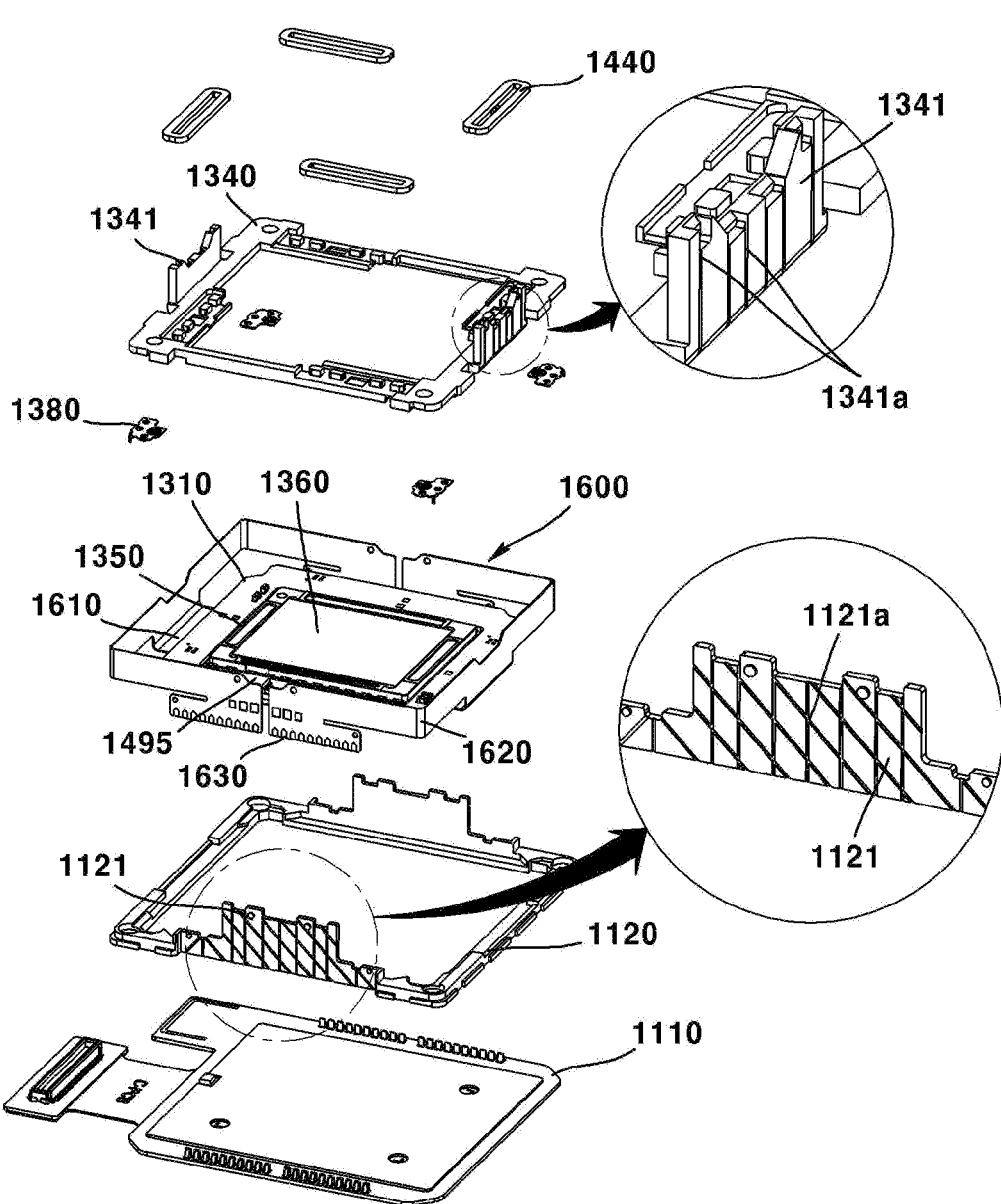
FIG. 33 is an exploded perspective view of a second moving part and related components of a camera device according to a second embodiment of the present invention.
Figure 34:
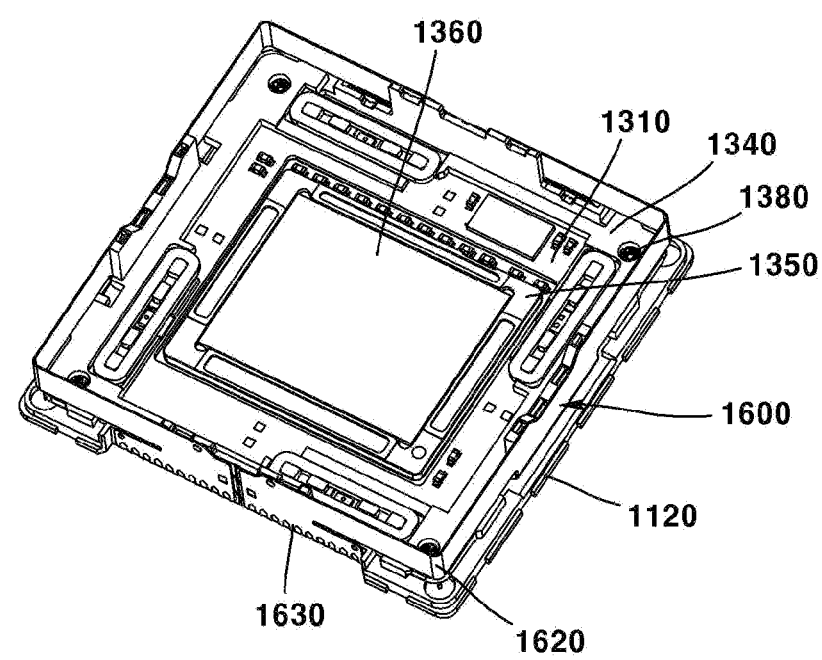
FIG. 34 is a perspective view of a second moving part, a fixed part, and a connection substrate of a camera device according to a second embodiment of the present invention.
Figure 35:
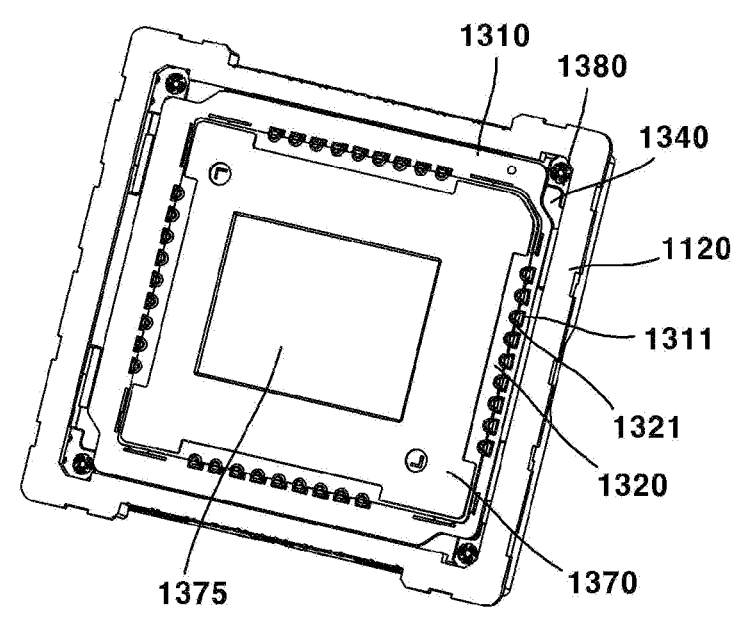
FIG. 35 is a bottom perspective view of a second moving part and a fixed part of a camera device according to a second embodiment of the present invention.
Figure 36:
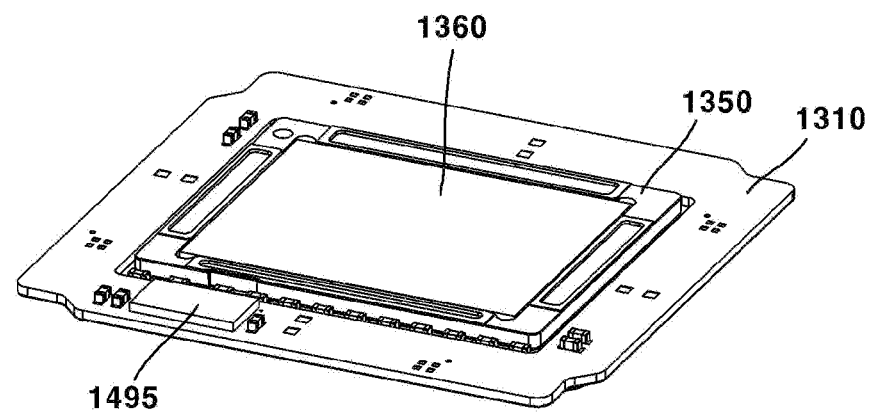
FIG. 36 is a perspective view of a partial configuration of a second moving part of a camera device according to a second embodiment of the present invention.
Figure 37:
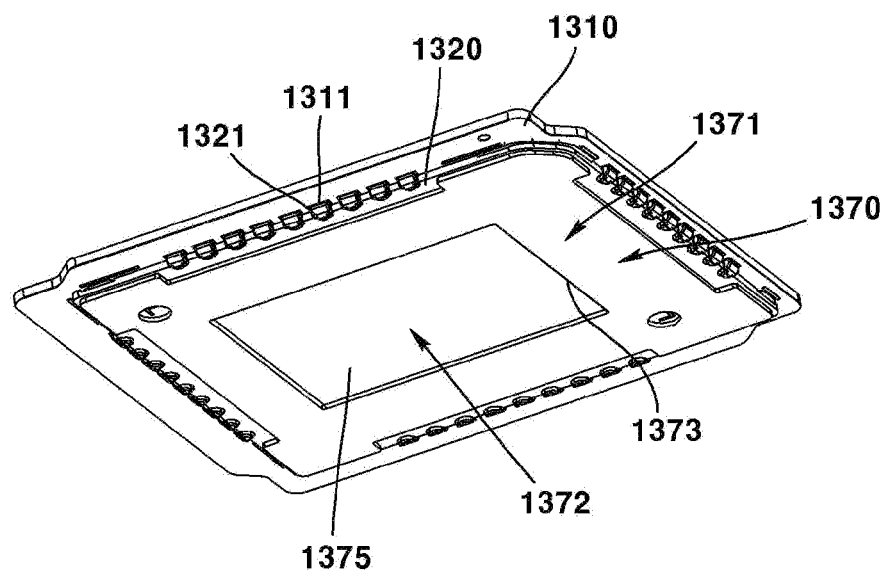
FIG. 37 is a bottom perspective view of a partial configuration of a second moving part of a camera device according to a second embodiment of the present invention.
Figure 38:
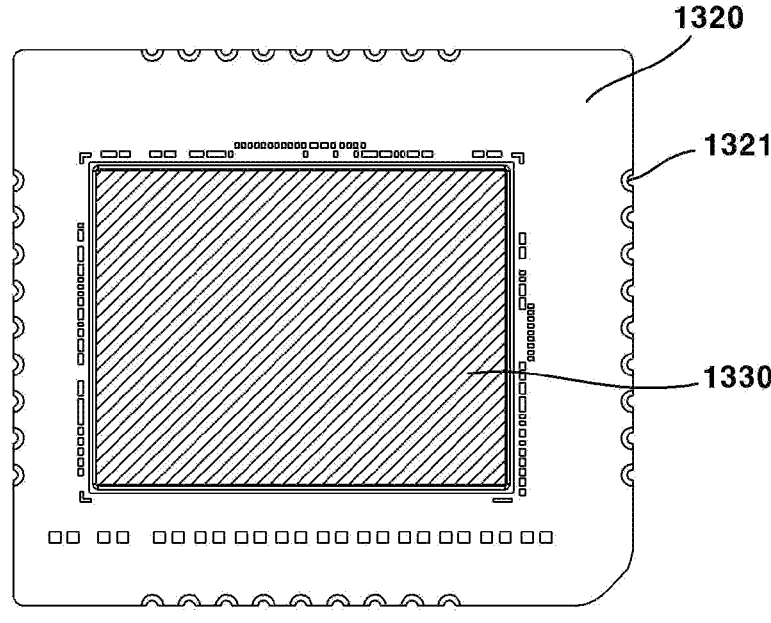
FIG. 38 is a plan view illustrating an image sensor and related configuration of a camera device according to a second embodiment of the present invention.
Figure 39:
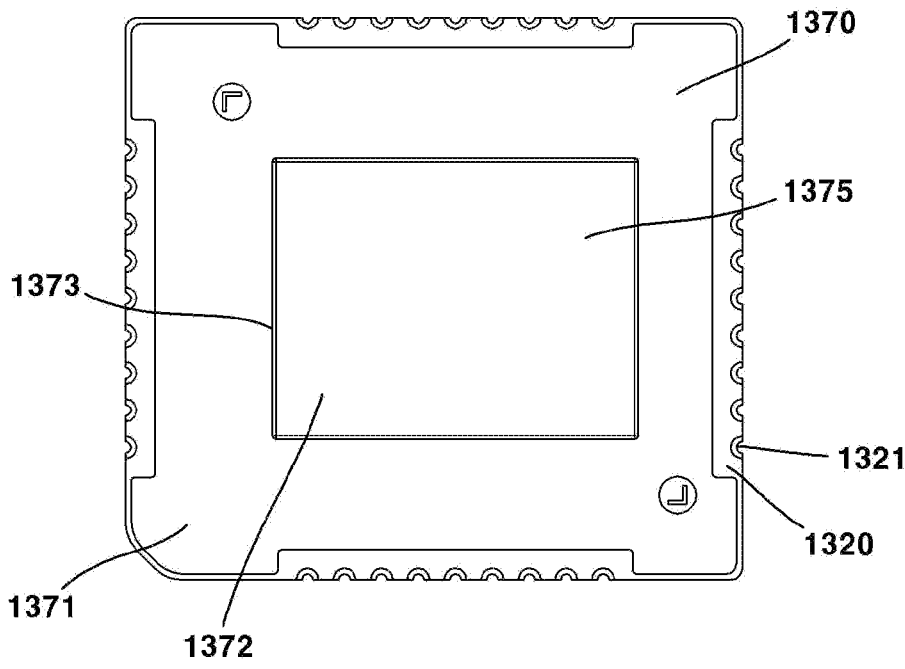
FIG. 39 is a bottom view illustrating a plate member and related configuration of a camera device according to a second embodiment of the present invention.
Figure 40:
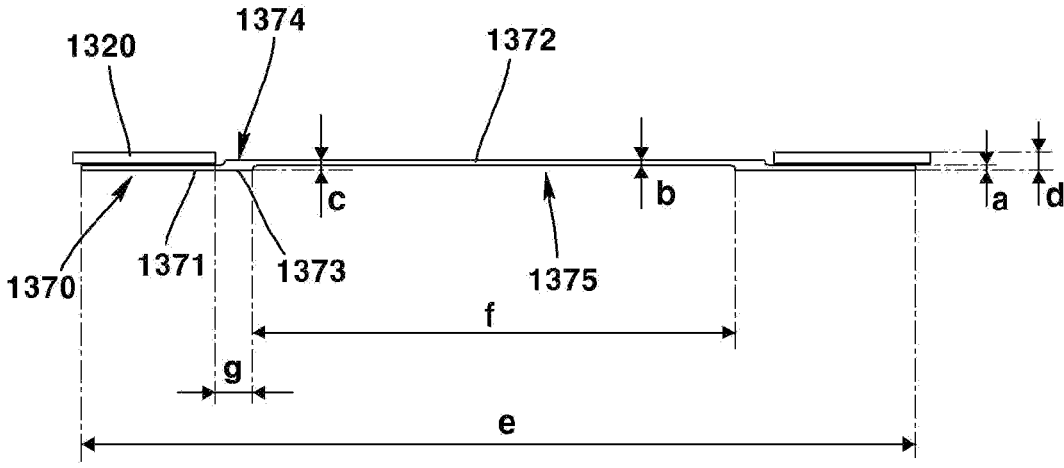
FIG. 40 is a cross-sectional view illustrating an image sensor, a plate member, and a sensor substrate of a camera device according to a second embodiment of the present invention.
Figure 41:
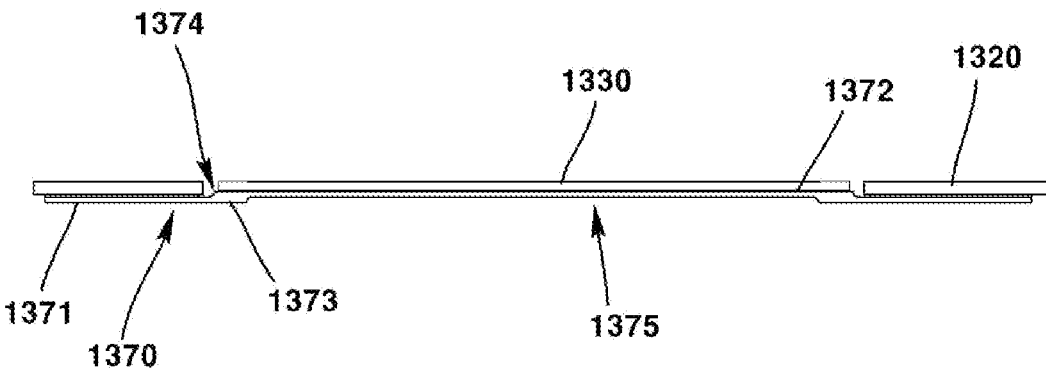
FIG. 41 is a cross-sectional view further illustrating the image sensor in FIG. 40.
Figure 42:
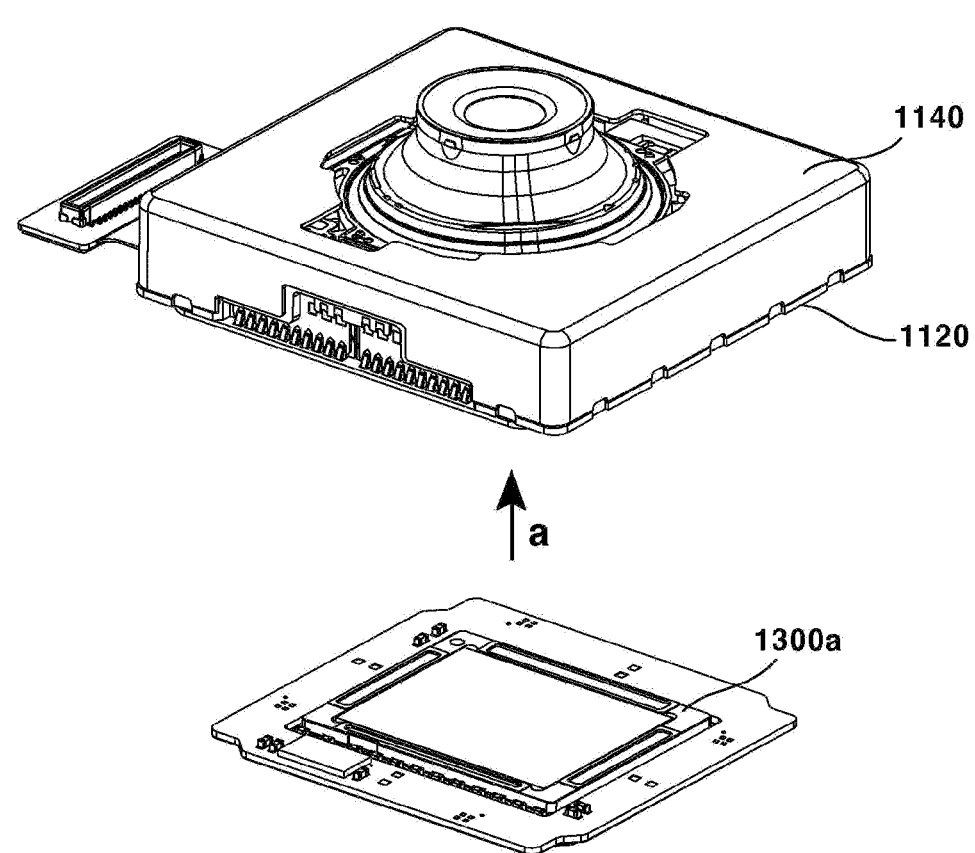
FIG. 42 is an exploded perspective view of a camera device according to a second embodiment of the present invention.
Figure 43A:
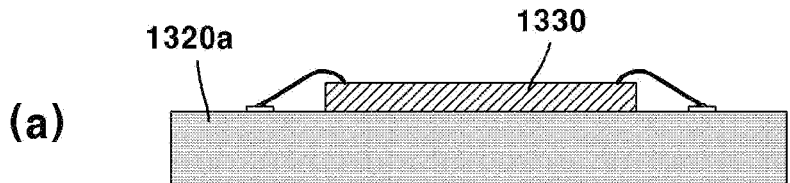
FIG. 43_a_ (a) to (d) and FIG. 43_b_ (a) to (c) are conceptual diagrams illustrating the coupling structure of an image sensor, a sensor substrate, and a plate member in various embodiments.
Figure 43A:
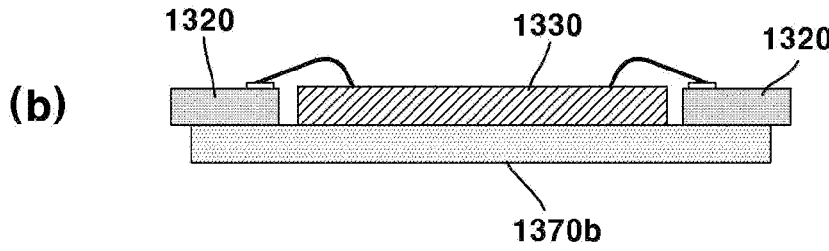
Figure 43A:
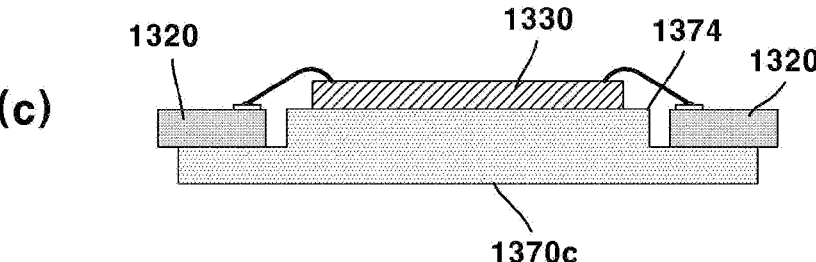
Figure 43A:
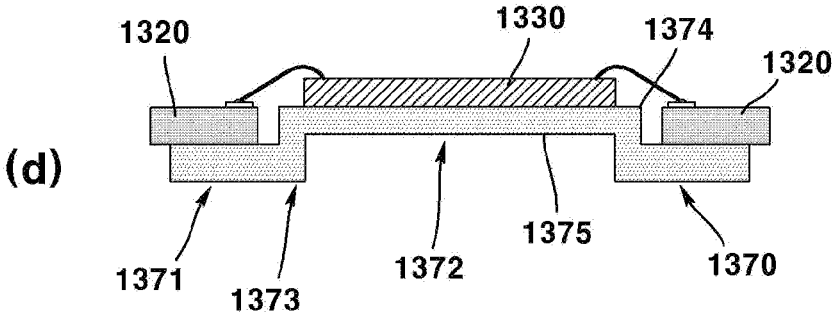

FIG. 24 is a perspective view of a camera device according to a second embodiment of the present invention; FIG. 25 is a perspective view illustrating a state in which the cover member is omitted from the camera device according to a second embodiment of the present invention; FIG. 26 is a plan view of a camera device according to a second embodiment of the present invention; FIG. 27 is a cross-sectional view taken along line A-A of FIG. 26; FIG. 28a is a cross-sectional view taken along line B-B of FIG. 26; FIG. 28b is a partially enlarged view of FIG. 28a; FIG. 29 is a cross-sectional view taken along line C-C of FIG. 26; FIG. 30 is an exploded perspective view of a camera device according to a second embodiment of the present invention; FIG. 31 is an exploded perspective view of a camera device according to a second embodiment of the present invention, viewed from a different direction from that of FIG. 30; FIG. 32 is an exploded perspective view of a first moving part and related components of a camera device according to a second embodiment of the present invention; FIG. 33 is an exploded perspective view of a second moving part and related components of a camera device according to a second embodiment of the present invention; FIG. 34 is a perspective view of a second moving part, a fixed part, and a connection substrate of a camera device according to a second embodiment of the present invention; FIG. 35 is a bottom perspective view of a second moving part and a fixed part of a camera device according to a second embodiment of the present invention; FIG. 36 is a perspective view of a partial configuration of a second moving part of a camera device according to a second embodiment of the present invention; FIG. 37 is a bottom perspective view of a partial configuration of a second moving part of a camera device according to a second embodiment of the present invention; FIG. 38 is a plan view illustrating an image sensor and related configuration of a camera device according to a second embodiment of the present invention; FIG. 39 is a bottom view illustrating a plate member and related configuration of a camera device according to a second embodiment of the present invention; FIG. 40 is a cross-sectional view illustrating an image sensor, a plate member, and a sensor substrate of a camera device according to a second embodiment of the present invention; FIG. 41 is a cross-sectional view further illustrating the image sensor in FIG. 40; FIG. 42 is an exploded perspective view of a camera device according to a second embodiment of the present invention; FIG. 43*a* (a) to (d) and FIG. 43*b* (a) to (c) are conceptual diagrams illustrating the coupling structure of an image sensor, a sensor substrate, and a plate member in various embodiments; FIG. 44*a* is a perspective view illustrating a magnet and a coil of a camera device according to a second embodiment of the present invention; and FIG. 44*b* is a perspective view illustrating a magnet and a coil of a camera device according to a modified embodiment of a second embodiment of the present invention.

The camera device 1010 may photograph any one or more of a video and an image. The camera device 1010 may be a camera. The camera device 1010 may be a camera module. The camera device 1010 may be a camera assembly. The camera device 1010 may be a camera unit. The camera device 1010 may comprise a lens driving device. The camera device 1010 may comprise a sensor driving device. The camera device 1010 may comprise a voice coil motor (VCM). The camera device 1010 may comprise an auto focus assembly. The camera device 1010 may comprise a handshake correction assembly. The camera device 1010 may comprise an auto focus device. The camera device 1010 may comprise a handshake correction device. The camera device 1010 may comprise an actuator. The camera device 1010 may comprise a lens driving actuator. The camera device 1010 may comprise a sensor driving actuator. The camera device 1010 may comprise an auto focus actuator. The camera device 1010 may comprise a handshake correction actuator.

The camera device 1010 may comprise a fixed part 1100. The fixed part 1100 may be a portion being relatively fixed when the moving parts 1200 and 300 move. The fixed part 1100 may be a portion being relatively fixed when at least one of the first moving part 1200 and the second moving part 1300 moves. The fixed part 1100 may accommodate the first moving part 1200 and the second moving part 1300. The fixed part 1100 may be disposed at an outer side of the first moving part 1200 and the second moving part 1300.

Although the first substrate 1110 has been described as one configuration of the fixed part 1100 throughout the specification, the first substrate 1110 may be understood as a separate configuration from the fixed part 1100. The fixed part 1100 may be disposed in the first substrate 1110. The fixed part 1100 may be disposed on the first substrate 1110. The fixed part 1100 may be disposed above the first substrate 1110.

The camera device 1010 may comprise a first substrate 1110. The fixed part 1100 may comprise a first substrate 1110. The first substrate 1110 may be a main substrate. The first substrate 1110 may be a substrate. The first substrate 1110 may be a printed circuit board (PCB). The first substrate 1110 may be connected to a power source of the optical apparatus 1001. The first substrate 1110 may comprise a connector connected to the power source of the optical apparatus 1001.

The camera device 1010 may comprise a base 1120. The fixed part 1100 may comprise a base 1120. The base 1120 may be disposed in the first substrate 1110. The base 1120 may be disposed on the first substrate 1110. The base 1120 may be disposed above the first substrate 1110. The base 1120 may be fixed to the first substrate 1110. The base 1120 may be coupled to the first substrate 1110. The base 1120 may be attached to the first substrate 1110 by an adhesive. The base 1120 may be disposed between the first substrate 1110 and the housing 1130.

The connection substrate 1600 may be disposed in the base 1120. The connection substrate 1600 may be connected to the base 1120. The connection substrate 1600 may be fixed to the base 1120. The connection substrate 1600 may be coupled to the base 1120. The connection substrate 1600 may be attached to the base 1120. The connection substrate 1600 may be fixed to the base 1120 by an adhesive. The connection substrate 1600 may be in contact with the base 1120.

The base 1120 may comprise a protruded part 1121. The protruded part 1121 may be protruded from an upper surface of the base 1120. The protruded part 1121 may be protruded upward from an outer side surface of the base 1120. The connection substrate 1600 may be disposed in the protruded part 1121 of the base 1120. The connection substrate 1600 may be connected to the protruded part 1121 of the base 1120. The connection substrate 1600 may be fixed to the protruded part 1121 of the base 1120. The connection substrate 1600 may be coupled to the protruded part 1121 of the base 1120. The connection substrate 1600 may be attached to the protruded part 1121 of the base 1120. The connection substrate 1600 may be fixed to the protruded part 1121 of the base 1120 by an adhesive. The connection substrate 1600 may be in contact with the protruded part 1121 of the base 1120.

The terminal unit 630 of the connection substrate 1600 may be disposed in the protruded part 1121 of the base 1120. The terminal unit 630 of the connection substrate 1600 may be connected to the protruded part 1121 of the base 1120. The terminal unit 630 of the connection substrate 1600 may be fixed to the protruded part 1121 of the base 1120. The terminal unit 630 of the connection substrate 1600 may be coupled to the protruded part 1121 of the base 1120. The terminal unit 630 of the connection substrate 1600 may be attached to the protruded part 1121 of the base 1120. The terminal unit 630 of the connection substrate 1600 may be fixed to the protruded part 1121 of the base 1120 by an adhesive. The terminal unit 630 of the connection substrate 1600 may be in contact with the protruded part 1121 of the base 1120.

The base 1120 may comprise a groove 1121*a*. The groove 1121*a* may be an adhesive accommodating groove. The groove 1121*a* may be formed on an outer side surface of the protruded part 1121 of the base 1120. The groove 1121*a* may be formed on an upper surface of the protruded part 1121 of the base 1120. The groove 1121*a* may be formed from an upper surface to a lower surface of the protruded part 1121 of the base 1120. An adhesive for attaching the connection substrate 1600 to the base 1120 may be disposed in the groove 1121*a*. The groove 1121*a* may comprise a plurality of grooves.

The camera device 1010 may comprise a housing 1130. The fixed part 1100 may comprise a housing 1130. The housing 1130 may be disposed in the base 1120. The housing 1130 may be disposed on the base 1120. The housing 1130 may be disposed above the base 1120. The housing 1130 may be fixed to the base 1120. The housing 1130 may be coupled to the base 1120. The housing 1130 may be attached to the base 1120 by an adhesive. The housing 1130 may be disposed on the first substrate 1110. The housing 1130 may be disposed above the first substrate 1110. The housing 1130 may be formed of a member separate from the base 1120.

The camera device 1010 may comprise a cover member 1140. The fixed part 1100 may comprise a cover member 1140. The cover member 1140 may be coupled to the base 1120. The cover member 1140 may be coupled to the housing 1130. The cover member 1140 may be coupled to the first substrate 1110. The cover member 1140 may be fixed to the base 1120. The cover member 1140 may be fixed to the housing 1130. The cover member 1140 may be fixed to the first substrate 1110. The cover member 1140 may cover at least a portion of the base 1120. The cover member 1140 may cover at least a portion of the housing 1130.

The cover member 1140 may be a 'cover can' or a 'shield can'. The cover member 1140 may be formed of a metal material. The cover member 1140 may block electromagnetic interference (EMI). The cover member 1140 may be electrically connected to the first substrate 1110. The cover member 1140 may be grounded to the first substrate 1110.

The cover member 1140 may comprise an upper plate. The cover member 1140 may comprise a hole formed in the upper plate. The hole may be formed at a position corresponding to the lens 1220. The cover member 1140 may comprise a side plate. The side plate may comprise a plurality of side plates. The side plate may comprise 4 side plates. The side plate may comprise first to fourth side plates. The side plate may comprise first and second side plates being disposed opposite to each other, and third and fourth side plates being disposed opposite to each other. The cover member 1140 may comprise a plurality of corners between the plurality of side plates.

Although the cover member 1140 has been described as one configuration of the fixed part 1100 throughout the specification, the cover member 1140 may be understood as a configuration separate from the fixed part 1100. The cover member 1140 may be coupled to the fixed part 1100. The cover member 1140 may cover the first moving part 1200.

The camera device 1010 may comprise a first moving part 1200. The first moving part 1200 may move against the fixed part 1100. The first moving part 1200 may move in an optical axis direction with respect to the fixed part 1100. The first moving part 1200 may be disposed inside the fixed part 1100. The first moving part 1200 may be movably disposed inside the fixed part 1100. The first moving part 1200 may be movably disposed inside the fixed part 1100 in an optical axis direction. An auto focus (AF) function may be performed by moving the first moving part 1200 in an optical axis direction against the fixed part 1100. The first moving part 1200 may be disposed on the second moving part 1300.

The camera device 1010 may comprise a bobbin 1210. The first moving part 1200 may comprise a bobbin 1210. The bobbin 1210 may be disposed on the first substrate 1110. The bobbin 1210 may be disposed above the first substrate 1110. The bobbin 1210 may be disposed to be spaced apart from the first substrate 1110. The bobbin 1210 may be disposed inside the housing 1130. The bobbin 1210 may be disposed at an inner side of the housing 1130. At least a portion of the bobbin 1210 may be accommodated in the housing 1130. The bobbin 1210 may be movably disposed in the housing 1130. The bobbin 1210 may be movably disposed in the housing 1130 in an optical axis direction. The bobbin 1210 may be coupled to the lens 1220. The bobbin 1210 may comprise a hollow or a hole. The lens 1220 may be disposed in a hollow or hole of the bobbin 1210. An outer circumferential surface of the lens 1220 may be coupled to an inner circumferential surface of the bobbin 1210.

The camera device 1010 may comprise a lens 1220. The first moving part 1200 may comprise a lens 1220. The lens 1220 may be coupled to the bobbin 1210. The lens 1220 may be fixed to the bobbin 1210. The lens 1220 may move integrally with the bobbin 1210. The lens 1220 may be screw-coupled to the bobbin 1210. The lens 1220 may be attached to the bobbin 1210 by an adhesive. The lens 1220 may be disposed at a position corresponding to the image sensor 1330. The optical axis of the lens 1220 may coincide with the optical axis of the image sensor 1330. The optical axis may be the z-axis. The lens 1220 may comprise a plurality of lenses. The lens 1220 may comprise a 5-element or 6-element lens.

The camera device 1010 may comprise a lens module. The lens module may be coupled to the bobbin 1210. The lens module may comprise a barrel and one or more lenses 1220 disposed inside the barrel.

The camera device 1010 may comprise a second moving part 1300. The second moving part 1300 may move against the fixed part 1100. The second moving part 1300 may move in a direction perpendicular to the optical axis direction with respect to the fixed part 1100. The second moving part 1300 may be disposed inside the fixed part 1100. The second moving part 1300 may be movably disposed inside the fixed part 1100. The second moving part 1300 may be movably disposed in the fixed part 1100 in a direction perpendicular to the optical axis direction. A handshake correction (OIS) function may be performed by moving the second moving part 1300 in a direction perpendicular to the optical axis direction with respect to the fixed part 1100. The second moving part 1300 may be disposed between the first moving part 1200 and the first substrate 1110.

The camera device 1010 may comprise a second substrate 1310. The second moving part 1300 may comprise a second substrate 1310. The second substrate 1310 may be a substrate. The second substrate 1310 may be a printed circuit board (PCB). The second substrate 1310 may be disposed between the first moving part 1200 and the first substrate 1110. The second substrate 1310 may be disposed between the bobbin 1210 and the first substrate 1110. The second substrate 1310 may be disposed between the lens 1220 and the first substrate 1110. The second substrate 1310 may be spaced apart from the fixed part 1100. The second substrate 1310 may be spaced apart from the fixed part 1100 in an optical axis direction and a direction perpendicular to the optical axis direction. The second substrate 1310 may move in a direction perpendicular to the optical axis direction. The second substrate 1310 may be electrically connected to the image sensor 1330. The second substrate 1310 may move integrally with the image sensor 1330. The second substrate 1310 may comprise a hole. An image sensor 1330 may be disposed in a hole of the second substrate 1310. The second substrate 1310 may be coupled to an upper surface of the sensor substrate 1320. The second substrate 1310 may be disposed on an upper surface of the sensor substrate 1320. The second substrate 1310 may be fixed to an upper surface of the sensor substrate 1320.

The second substrate 1310 may comprise a terminal 1311. The terminal 1311 may be disposed on a lower surface of the second substrate 1310. The terminal 1311 may be coupled to the terminal 1321 of the sensor substrate 1320. The second substrate 1310 may be formed separately from the sensor substrate 1320. The second substrate 1310 may be formed separately from the sensor substrate 1320 to be coupled thereto. The terminal 1321 of the sensor substrate 1320 may be soldered to the terminal 1311 of the second substrate 1310.

The second substrate 1310 may comprise a hole 1312. A hole 1312 may be formed in the second substrate 1310. The hole 1312 may penetrate the second substrate 1310 in an optical axis direction. The hole 1312 may be formed in a central portion of the second substrate 1310. At least a portion of the sensor part 1300a may be inserted into the hole 1312. The sensor holder 1350 may be inserted into the hole 1312. The sensor holder 1350 may be inserted into the hole 1312 of the second substrate 1310. The sensor holder 1350 may be disposed in the hole 1312 of the second substrate 1310.

The sensor holder 1350 may be overlapped with the second substrate 1310 in a direction perpendicular to the optical axis direction. The filter 1360 may be overlapped with the second substrate 1310 in a direction perpendicular to the optical axis direction.

The camera device 1010 may comprise a sensor part 1300a. The second moving part 1300 may comprise a sensor part 1300a. The sensor part 1300a may be coupled with the second substrate 1310. The sensor part 1300a may be coupled to the second substrate 1310. The sensor part 1300a may be inserted and coupled to the second substrate 1310 from below (refer to a in FIG. 42).

The sensor part 1300a may comprise any one or more of a sensor substrate 1320, an image sensor 1330, a sensor holder 1350, and a filter 1360. The sensor part 1300a may comprise a sensor substrate 1320 comprising a terminal 1321 being connected to the terminal 1311 of the second substrate 1310. The sensor part 1300a may comprise an image sensor 1330 being disposed on the sensor substrate 1320. The sensor part 1300a may comprise a sensor holder 1350 being disposed on the image sensor 1330. The sensor part 1300a may comprise a filter 1360 being disposed in the sensor holder 1350.

The upper surface of the filter 1360 may be disposed higher than the upper surface of the second substrate 1310. The upper surface of the filter 1360 may be disposed at the same height as the upper surface of the second substrate 1310. The upper surface of the filter 1360 may be disposed lower than the upper surface of the second substrate 1310. The lower surface of the filter 1360 may be disposed higher than the upper surface of the second substrate 1310. The lower surface of the filter 1360 may be disposed at the same height as the upper surface of the second substrate 1310. The lower surface of the filter 1360 is lower than the upper surface of the second substrate 1310 and may be disposed higher than the lower surface of the second substrate 1310.

The camera device 1010 may comprise a sensor substrate 1320. The second moving part 1300 may comprise a sensor substrate 1320. The sensor substrate 1320 may be a substrate. The sensor substrate 1320 may be a printed circuit board (PCB). The sensor substrate 1320 may be coupled to the image sensor 1330. The sensor substrate 1320 may be coupled to the second substrate 1310.

The sensor substrate 1320 may comprise a terminal 1321. The terminal 1321 of the sensor substrate 1320 may be coupled to the terminal 1311 of the second substrate 1310. The sensor substrate 1320 may be coupled to a lower surface of the second substrate 1310. The sensor substrate 1320 may be disposed below the second substrate 1310. The sensor substrate 1320 may be coupled below the second substrate 1310 in a state being coupled with the image sensor 1330.

The terminal 1321 may comprise a first portion 1321a. The first portion 1321a may be disposed on a lower surface of the sensor substrate 1320. The terminal 1321 may comprise a second portion 1321b. The second portion 1321b may be connected to the first portion 1321a. The second portion 1321b may be disposed on a side surface of the sensor substrate 1320.

The sensor substrate 1320 may comprise a hole 1322. The hole 1322 may be hollow. An image sensor 1330 may be disposed in the hole 1322 of the sensor substrate 1320. A portion of the plate member 1370 may be disposed in the hole 1322 of the sensor substrate 1320. The protruded part 1374 of the plate member 1370 may be disposed in the hole 1322 of the sensor substrate 1320. The hole 1322 of the sensor substrate 1320 may be formed in a size and shape corresponding to the protruded part 1374 of the plate member 1370. The size of the hole 1322 may be larger than the size of the groove 1375 of the plate member 1370. In a cross section perpendicular to the optical axis direction, the size of the hole 1322 may be greater than the size of the groove 1375 of the plate member 1370. An area of an upper surface of the protruded part 1374 may be larger than an area of a bottom surface of the groove 1375.

The camera device 1010 may comprise an image sensor 1330. The second moving part 1300 may comprise an image sensor 1330. The image sensor 1330 may be disposed in the sensor substrate 1320. The image sensor 1330 may be disposed between the sensor substrate 1320 and the sensor holder 1350. The image sensor 1330 may be electrically connected to the second substrate 1310. The image sensor 1330 may move integrally with the second substrate 1310. The image sensor 1330 may be disposed below the lens 1220. The image sensor 1330 may be disposed in the plate member 1370 and may be electrically connected to the sensor substrate 1320 through wire bonding.

An image may be formed when light passing through the lens 1220 and the filter 1360 is incident on the image sensor 1330. The image sensor 1330 may be electrically connected to the sensor substrate 1320, the second substrate 1310, and the first substrate 1110. The image sensor 1330 may comprise an effective image area. The image sensor 1330 may convert light irradiated to the effective image area into an electrical signal. The image sensor 1330 may comprise any one or more of a charge coupled device (CCD), a metal oxide semi-conductor (MOS), a CPD, and a CID.

The camera device 1010 may comprise a holder 1340. The second moving part 1300 may comprise a holder 1340. The holder 1340 may be formed of an insulating material. The holder 1340 may be disposed in the second substrate 1310. The holder 1340 may be disposed on the second substrate 1310. The holder 1340 may be disposed above the second substrate 1310. The holder 1340 may be fixed to the second substrate 1310. The holder 1340 may be coupled to the second substrate 1310. The holder 1340 may comprise a hollow or a hole in which the image sensor 1330 is disposed. A second coil 1440 may be disposed in the holder 1340. The holder 1340 may comprise a protrusion on which the second coil 1440 is wound. The holder 1340 may comprise a hole in which the Hall sensor 1445 is disposed.

A connection substrate 1600 may be disposed in the holder 1340. The connection substrate 1600 may be connected to the holder 1340. The connection substrate 1600 may be fixed to the holder 1340. The connection substrate 1600 may be coupled to the holder 1340. The connection substrate 1600 may be attached to the holder 1340. The connection substrate 1600 may be fixed to the holder 1340 by an adhesive. The connection substrate 1600 may be in contact with the holder 1340.

The holder 1340 may comprise a protruded part 1341. The protruded part 1341 may be protruded from an upper surface of the holder 1340. The protruded part 1341 may be protruded upward from the outer side surface of the holder 1340. The connection substrate 1600 may be disposed in the protruded part 1341 of the holder 1340. The connection substrate 1600 may be connected to the protruded part 1341 of the holder 1340. The connection substrate 1600 may be fixed to the protruded part 1341 of the holder 1340. The connection substrate 1600 may be coupled to the protruded part 1341 of the holder 1340. The connection substrate 1600 may be attached to the protruded part 1341 of the holder 1340. The connection substrate 1600 may be fixed to the protruded part 1341 of the holder 1340 by an adhesive. The connection substrate 1600 may be in contact with the protruded part 1341 of the holder 1340.

The holder 1340 may comprise a groove 1341a. The groove 1341a may be an adhesive accommodating groove. The groove 1341a may be formed on an outer side surface of the protruded part 1341 of the holder 1340. The groove 1341a may be formed on an upper surface of the protruded part 1341 of the holder 1340. The groove 1341a may be formed from an upper surface to a lower surface of the protruded part 1341 of the holder 1340. An adhesive for attaching the connection substrate 1600 to the holder 1340 may be disposed in the groove 1341a. The groove 1341a may comprise a plurality of grooves.

At least a portion of the connection part 610 and the extension part 620 of the connection substrate 1600 may be disposed on the protruded part 1341 of the holder 1340. At least a portion of the connection part 610 and the extension part 620 of the connection substrate 1600 may be connected to the protruded part 1341 of the holder 1340. At least a portion of the connection part 610 and the extension part 620 of the connection substrate 1600 may be fixed to the protruded part 1341 of the holder 1340. At least a portion of the connection part 610 and the extension part 620 of the connection substrate 1600 may be coupled to the protruded part 1341 of the holder 1340. At least a portion of the connection part 610 and the extension part 620 of the connection substrate 1600 may be attached to the protruded part 1341 of the holder 1340. At least some of the connection part 610 and the extension part 620 of the connection substrate 1600 may be fixed to the protruded part 1341 of the holder 1340 by an adhesive. At least a portion of the connection part 610 and the extension part 620 of the connection substrate 1600 may be in contact with the protruded part 1341 of the holder 1340.

The camera device 1010 may comprise a sensor holder 1350. The second moving part 1300 may comprise a sensor holder 1350. The sensor holder 1350 may be disposed in the sensor substrate 1320. The sensor holder 1350 may comprise a hole formed at a position corresponding to the image sensor 1330. The sensor holder 1350 may comprise a groove in which the filter 1360 is disposed. The sensor holder 1350 may be protruded above the second substrate 1310. The sensor holder 1350 may be disposed in the hole 1312 of the second substrate 1310. The sensor holder 1350 may be overlapped with the second substrate 1310 in a direction perpendicular to the optical axis direction. A portion of the sensor holder 1350 may be disposed between the second substrate 1310 and the image sensor 1330 in a direction perpendicular to the optical axis direction. The upper surface of the sensor holder 1350 may be disposed higher than the upper surface of the holder 1340 and lower than the upper surface of the second coil 1440.

The camera device 1010 may comprise a filter 1360. The second moving part 1300 may comprise a filter 1360. The filter 1360 may be disposed between the lens 1220 and the image sensor 1330. The filter 1360 may be disposed in the sensor holder 1350. The filter 1360 may block light having a specific frequency band from being incident on the image sensor 1330 from the light passing through the lens 1220. The filter 1360 may comprise an infrared cut filter. The filter 1360 may block infrared rays from being incident on the image sensor 1330. The filter 1360 may be disposed at a higher position than the second substrate 1310. The upper surface of the filter 1360 may be disposed at the same height as the upper surface of the sensor holder 1350.

The camera device 1010 may comprise a plate member 1370. The second moving part 1300 may comprise a plate member 1370. The plate member 1370 may be a SUS. The plate member 1370 may be formed of a SUS. The plate member 1370 may be formed of a copper alloy. The plate member 1370 may comprise copper. The plate member 1370 may be a reinforcing plate. The plate member 1370 may be a stiffener. The plate member 1370 may be coupled to a lower surface of the sensor substrate 1320. The plate member 1370 may be disposed on a lower surface of the sensor substrate 1320. The plate member 1370 may be in contact with the lower surface of the sensor substrate 1320. The plate member 1370 may be fixed to a lower surface of the sensor substrate 1320. The plate member 1370 may be attached to a lower surface of the sensor substrate 1320 by an adhesive.

In a second embodiment of the present invention, the image sensor 1330 may be directly disposed in the plate member 1370. Meanwhile, the plate member 1370 may be easier to manage flatness than the sensor substrate 1320. Through this, it is possible to easily manage the flatness of the mounting surface of the image sensor 1330. The image sensor 1330 may be electrically connected to the sensor substrate 1320 through wire bonding. The image sensor 1330 may be electrically connected to the sensor substrate 1320.

The plate member 1370 may comprise a protruded part 1374. The protruded part 1374 may be protruded from an upper surface of the plate member 1370. At least a portion of the protruded part 1374 may be disposed in a hole of the sensor substrate 1320. The protruded part 1374 of the plate member 1370 may be overlapped with the sensor substrate 1320 in a direction perpendicular to the optical axis direction. The image sensor 1330 may be disposed in the protruded part 1374 of the plate member 1370. The image sensor 1330 may be disposed on the protruded part 1374 of the plate member 1370. The image sensor 1330 may be in contact with the protruded part 1374 of the plate member 1370. The image sensor 1330 may be fixed to the protruded part 1374 of the plate member 1370. The image sensor 1330 may be attached to the protruded part 1374 of the plate member 1370 by an adhesive. As a modified embodiment, the protruded part 1374 in the plate member 1370 is omitted and only the groove 1375 may be formed.

The plate member 1370 may comprise a groove 1375. The groove 1375 may be formed at a position corresponding to the protruded part 1374. The groove 1375 may be concavely formed in a lower surface of the plate member 1370. The groove 1375 may be formed through etching. In a second embodiment of the present invention, as the groove 1375 is formed in the plate member 1370, the weight of the plate member 1370 can be reduced. As an example, the weight of the plate member 1370 may be reduced by 15% to 25% by the groove 1375. The weight of the plate member 1370 may be reduced by 10% to 30% by the groove 1375.

The plate member 1370 may comprise a support region. The support region may be coupled to the sensor substrate 1320. The support region may be a support part. The support region may be disposed at an outer side of the protruded part 1374. The support region may form an edge. The protruded part 1374 may be protruded from the support region. The thickness of the protruded part 1374 may be smaller than the thickness of the sensor substrate 1320. At this time, the thickness of the protruded part 1374 may be a thickness from the upper surface of the support region to the upper surface of the protruded part 1374. That is, the thickness from the upper surface of the support region to the upper surface of the protruded part 1374 may be smaller than the thickness of the sensor substrate 1320.

The plate member 1370 may comprise a first portion 1371 that is an outer side of the protruded part 1374. The plate member 1370 may comprise a second portion 1372 in which a groove 1375 is formed. The plate member 1370 may comprise a third portion 1373 connecting the first portion 1371 and the second portion 1372.

In the optical axis direction, the thickness of the third portion 1373 (refer to c in FIG. 40) may be thicker than the thickness of the first portion 1371 (refer to a in FIG. 40). In the optical axis direction, the thickness c of the third portion 1373 may be thicker than the thickness of the second portion 1372 (refer to b in FIG. 40). In the optical axis direction, the thickness a of the first portion 1371 may be the same as the thickness b of the second portion 1372. In a modified embodiment, in the optical axis direction, the thickness of the first portion 1371 may be different from the thickness of the second portion 1372.

In the optical axis direction, the thickness of the third portion 1373 may be 1.8 times to 2.2 times the thickness of the first portion 1371. In the optical axis direction, the thickness of the third portion 1373 may be 1.5 to 2.5 times the thickness of the first portion 1371. In the optical axis direction, the thickness of the third portion 1373 may be 1.8 times to 2.2 times the thickness of the second portion 1372. In the optical axis direction, the thickness of the third portion 1373 may be 1.5 to 2.5 times the thickness of the second portion 1372.

The upper end of the second portion 1372 may be disposed lower than the center of the sensor substrate 1320 in the optical axis direction. As a modified embodiment, the upper end of the second portion 1372 may be disposed at a height corresponding to the center of the sensor substrate 1320 in the optical axis direction. In another modified embodiment, the upper end of the second portion 1372 may be disposed higher than the center of the sensor substrate 1320 in the optical axis direction.

In the optical axis direction, the thickness of the plate member 1370 may be thinner than the thickness of the sensor substrate 1320. However, as a modified embodiment, the thickness of the plate member 1370 in one portion is the same as the thickness of the sensor substrate 1320 or may be thicker than the sensor substrate 1320.

In a second embodiment of the present invention, the thickness a of the first portion 1371 of the plate member

1370 in the optical axis direction may be 0.09 mm to 0.11 mm. The thickness a of the first portion 1371 of the plate member 1370 in the optical axis direction may be 0.08 mm to 0.12 mm. The thickness a of the first portion 1371 of the plate member 1370 in the optical axis direction may be 0.05 mm to 0.15 mm. The thickness b of the second portion 1372 of the plate member 1370 in the optical axis direction may be 0.09 mm to 0.11 mm. The thickness b of the second portion 1372 of the plate member 1370 in the optical axis direction may be 0.08 mm to 0.12 mm. The thickness b of the second portion 1372 of the plate member 1370 in the optical axis direction may be 0.05 mm to 0.15 mm.

The thickness a of the third portion 1373 of the plate member 1370 in the optical axis direction may be 0.19 mm to 0.21 mm. The thickness a of the third portion 1373 of the plate member 1370 in the optical axis direction may be 0.18 mm to 0.22 mm. The thickness a of the third portion 1373 of the plate member 1370 in the optical axis direction may be 0.15 mm to 0.25 mm. The sum of the thicknesses of the first portion 1371 of the plate member 1370 and the sensor substrate 1320 in the optical axis direction (refer to d in FIG. 40) may be 0.36 mm to 0.38 mm. The sum of the thicknesses of the first portion 1371 of the plate member 1370 and the sensor substrate 1320 in the optical axis direction (refer to d in FIG. 40) may be 0.35 mm to 0.39 mm. The sum of the thicknesses of the first portion 1371 of the plate member 1370 and the sensor substrate 1320 in the optical axis direction (refer to d in FIG. 40) may be 0.32 mm to 0.42 mm.

The width of the groove 1375 of the plate member 1370 (refer to f in FIG. 40) may be 40 to 70% of the entire width of the plate member 1370 (refer to e in FIG. 40). The width f of the groove 1375 of the plate member 1370 may be 50 to 60% of the total width e of the plate member 1370. The width of the third portion 1373 of the plate member 1370 (refer to g in FIG. 40) may be 1 to 3 times greater than the thickness c of the third portion 1373 of the plate member 1370. The width g of the third portion 1373 of the plate member 1370 may be 1.5 to 2.5 times greater than the thickness c of the third portion 1373 of the plate member 1370. At this time, the thickness may be the length in the optical axis direction, and the width may be the length in a direction perpendicular to the optical axis direction.

In the case of a second embodiment of the present invention, the plate member 1370 may comprise a first portion 1371 and a third portion 1373 having a thickness greater than that of the second portion 1372. Through this, the strength of the plate member 1370 may be increased. Accordingly, the occurrence of warpage in the plate member 1370 may be minimized. In other words, when compared with the comparative example, which is a plate in the shape of a planar plate, having the same thickness as the first portion 1371, the occurrence of warpage in the plate member 1370 of a second embodiment of the present invention can be minimized. If a plate in the shape of a planar plate is used to achieve the same rigidity as in the second embodiment of the present invention, a thicker plate must be used, and in this case, the weight may be increased.

The upper surface of the image sensor 1330 being disposed in the plate member 1370 may be disposed at the same height as the upper surface of the sensor substrate 1320. The thickness of the image sensor 1330 may be thinner than the thickness of the sensor substrate 1320. The height of the seating surface of the image sensor 1330 of the plate member 1370 may be lower than the height of the upper surface of the sensor substrate 1320.

Referring to FIG. 43 (a), the image sensor 1330 may be disposed directly on the sensor substrate 1320a. The image sensor 1330 may be disposed on the upper surface of the sensor substrate 1320*a*. At this time, the plate member 1370 may be omitted.

Referring to FIG. 43*a* (b), the image sensor 1330 may be disposed on the plate member 1370*b*. The image sensor 1330 may be disposed in the hole 1322 of the sensor substrate 1320. The image sensor 1330 may be disposed on the upper surface of the plate member 1370*b*. In the embodiment illustrated in FIG. 43*a* (b), the protruded part 1374 may be omitted when compared with the embodiment illustrated in FIG. 43*a* (c) and (d). The lower surface of the image sensor 1330 may be disposed at the same height as the lower surface of the sensor substrate 1320.

Referring to FIG. 43*a* (c), the image sensor 1330 may be disposed in the protruded part 1374 of the plate member 1370*c*. In an embodiment illustrated in FIG. 43*a* (c), when compared to an embodiment illustrated in FIG. 43*a* (d), the groove 1375 of the plate member 1370 may be omitted. When the groove 1375 of the plate member 1370 is omitted, the weight may increase compared to the embodiment illustrated in FIG. 43*a* (d). However, when compared with the embodiment illustrated in FIG. 43*a* (d), the strength is high, so that the occurrence of warpage can be minimized.

Referring to FIG. 43*a* (d), the image sensor 1330 may be disposed in the protruded part 1374 of the plate member 1370. The plate member 1370 may comprise a groove 1375 formed at an opposite side of the protruded part 1374. The groove 1375 may be overlapped with the protruded part 1374 in the optical axis direction.

Figure 43B:
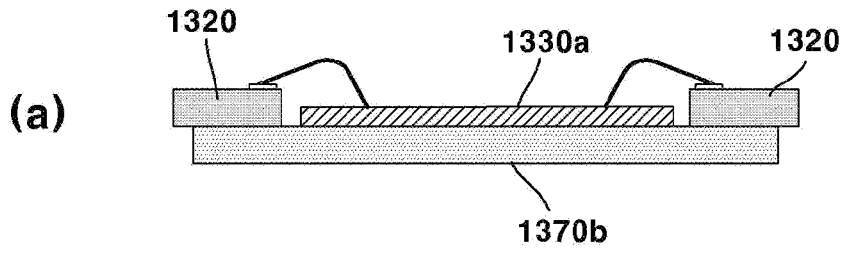
Figure 43B:
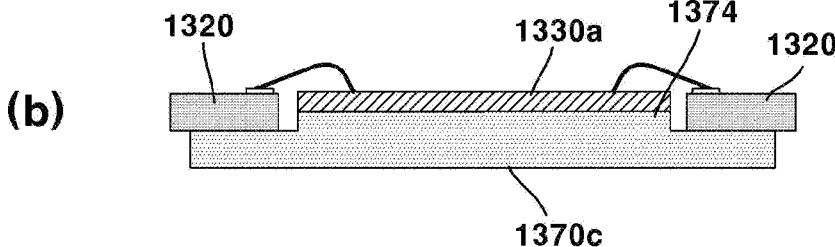
Figure 43B:
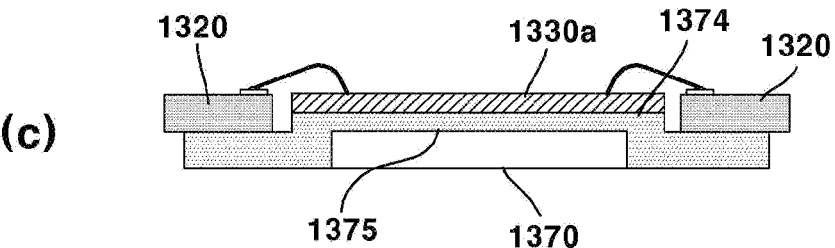
Figure 44A:
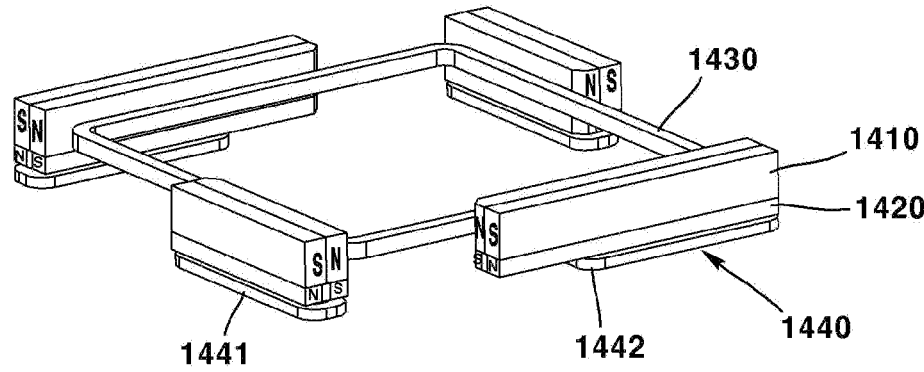
FIG. 44_a_ is a perspective view illustrating a magnet and a coil of a camera device according to a second embodiment of the present invention.
Figure 44B:
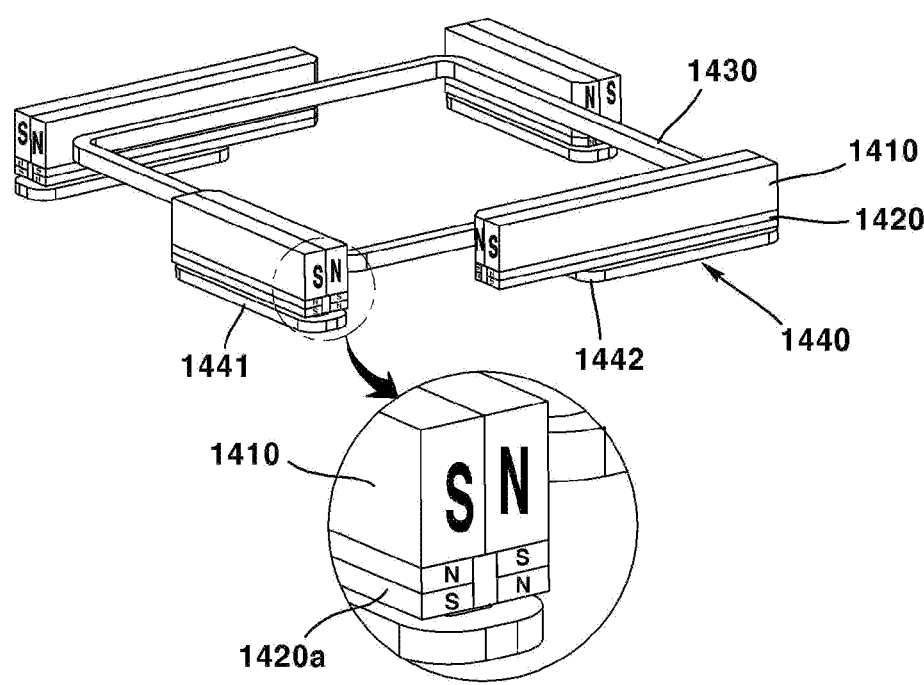

Referring to FIG. 43*b* (a), the image sensor 1330*a* may be disposed in the plate member 1370*b*. The image sensor 1330*a* may be disposed in the hole 1322 of the sensor substrate 1320. The image sensor 1330*a* may be disposed in the upper surface of the plate member 1370*b*. In the embodiment illustrated in FIG. 43*b* (a), the image sensor may be formed to have a thinner thickness compared to the embodiment illustrated in FIG. 43*a* (b). Through this, the upper surface of the image sensor 1330*a* may be disposed lower than the upper surface of the sensor substrate 1320.

Referring to FIG. 43*b* (b), the image sensor 1330*a* may be disposed in the protruded part 1374 of the plate member 1370*c*. In the embodiment illustrated in FIG. 43*b* (b), the image sensor may be formed to have a thinner thickness compared to the embodiment illustrated in FIG. 43*a* (c). Through this, the upper surface of the image sensor 1330*a* may be disposed at the same height as the upper surface of the sensor substrate 1320.

Referring to FIG. 43*b* (c), the image sensor 1330*a* may be disposed in the protruded part 1374 of the plate member 1370. The plate member 1370 may comprise a groove 1375 formed at an opposite side of the protruded part 1374. The groove 1375 may be overlapped with the protruded part 1374 in the optical axis direction. In the embodiment illustrated in FIG. 43*b* (c), when compared to the embodiment illustrated in FIG. 43*a* (d), the image sensor may be formed to have a thinner thickness. Through this, the upper surface of the image sensor 1330*a* may be disposed at the same height as the upper surface of the sensor substrate 1320.

The camera device 1010 may comprise a terminal 1380. The second moving part 1300 may comprise a terminal 1380. The terminal 1380 may be disposed in the holder 1340. The terminal 1380 may be coupled to a wire 1800. The terminal 1380 may be connected to the wire 1800 through solder. The terminal 1380 may be formed of a metal. The terminal 1380 may comprise a hole through which the wire 1800 passes. The terminal 1380 may comprise a buffer for shock mitigation. The terminal 1380 may have a shape bent a plurality of times. The terminal 1380 may comprise a plurality of terminals. The terminal 1380 may comprise four terminals being disposed in four corner regions of the holder 1340.

The camera device 1010 may comprise a driving unit. The driving unit may move the moving parts 1200 and 300 against the fixed part 1100. The driving unit may perform an auto focus (AF) function. The driving unit may perform a handshake correction (OIS) function. The driving unit may move the lens 1220. The driving unit may move the image sensor 1330. The driving unit may comprise a magnet and a coil. The driving unit may comprise a shape memory alloy (SMA).

The camera device 1010 may comprise a first driving unit. The first driving unit may be an AF driving unit. The first driving unit may move the first moving part 1200 in the optical axis direction. The first driving unit may move the bobbin 1210 in the optical axis direction. The lens 1220 may be moved in the optical axis direction. The first driving unit may perform an auto focus (AF) function. The first driving unit may move the first moving part 1200 in an upward direction of the optical axis direction. The first driving unit may move the first moving part 1200 in a downward direction of the optical axis direction.

The camera device 1010 may comprise a second driving unit. The second driving unit may be an OIS driving unit. The second driving unit may move the second moving part 1300 in a direction perpendicular to the optical axis direction. The second driving unit may move the second substrate 1310 in a direction perpendicular to the optical axis direction. The second driving unit may move the sensor substrate 1320 in a direction perpendicular to the optical axis direction. The second driving unit may move the image sensor 1330 in a direction perpendicular to the optical axis direction. The second driving unit may move the holder 1340 in a direction perpendicular to the optical axis direction. The second driving unit may move the sensor holder 1350 in a direction perpendicular to the optical axis direction. The second driving unit may move the filter 1360 in a direction perpendicular to the optical axis direction. The second driving unit may perform a handshake correction (OIS) function.

The second driving unit may move the second moving part 1300 in a first direction perpendicular to the optical axis direction. The second driving unit may move the second moving part 1300 in a second direction perpendicular to the optical axis direction and the first direction. The second driving unit may rotate the second moving part 1300 about the optical axis.

In a second embodiment of the present invention, the first driving unit may comprise a first coil 1430. The second driving unit may comprise a second coil 1440. The first driving unit may comprise a first driving magnet 1410. The second driving unit may comprise a second driving magnet 1420. As a modified embodiment, the first driving unit and the second driving unit may comprise a driving magnet commonly used for interaction between the first coil 1430 and the second coil 1440. That is, the first driving unit and the second driving unit may comprise individually controlled coils and a common magnet.

The camera device 1010 may comprise a first driving magnet 1410. The driving unit may comprise a first driving magnet 1410. The first driving magnet 1410 may be a magnet. The first driving magnet 1410 may be a permanent magnet. The first driving magnet 1410 may be a common magnet. The first driving magnet 1410 may be used for auto focus (AF).

The first driving magnet 1410 may be disposed in the fixed part 1100. The first driving magnet 1410 may be fixed to the fixed part 1100. The first driving magnet 1410 may be coupled to the fixed part 1100. The first driving magnet 1410 may be attached to the fixed part 1100 by an adhesive. The first driving magnet 1410 may be disposed in the housing 1130. The first driving magnet 1410 may be fixed to the housing 1130. The first driving magnet 1410 may be coupled to the housing 1130. The first driving magnet 1410 may be attached to the housing 1130 by an adhesive. The first driving magnet 1410 may be disposed at a corner of the housing 1130. The first driving magnet 1410 may be disposed to be biased at a corner of the housing 1130.

The first driving magnet 1410 may be a two-pole magnetized magnet comprising one N-pole region and one S-pole region. As a modified embodiment, the first driving magnet 1410 may be a four-pole magnetized magnet comprising two N-pole regions and two S-pole regions.

The first driving magnet 1410 may comprise a plurality of magnets. The first driving magnet 1410 may comprise four magnets. The first driving magnet 1410 may comprise first to fourth magnets. The first to fourth magnets may be disposed symmetrically to the optical axis. The first to fourth magnets may be formed to have the same size and shape as each other.

The camera device 1010 may comprise a second driving magnet 1420. The driving unit may comprise a second driving magnet 1420. The second driving magnet 1420 may be a magnet. The second driving magnet 1420 may be a permanent magnet. The second driving magnet 1420 may be a common magnet. The second driving magnet 1420 may be used for handshake correction (OIS).

The second driving magnet 1420 may be disposed in the fixed part 1100. The second driving magnet 1420 may be fixed to the fixed part 1100. The second driving magnet 1420 may be coupled to the fixed part 1100. The second driving magnet 1420 may be attached to the fixed part 1100 by an adhesive. The second driving magnet 1420 may be disposed in the housing 1130. The second driving magnet 1420 may be fixed to the housing 1130. The second driving magnet 1420 may be coupled to the housing 1130. The second driving magnet 1420 may be attached to the housing 1130 by an adhesive. The second driving magnet 1420 may be disposed at a corner of the housing 1130. The second driving magnet 1420 may be disposed to be biased at a corner of the housing 1130.

As illustrated in FIG. 44*a*, the second driving magnet 1420 may be a two-pole magnetized magnet comprising one N-pole region and one S-pole region. As a modified embodiment, as shown in FIG. 44*b*, the second driving magnet 1420 may be a 4-pole magnetized magnet comprising two N-pole regions and two S-pole regions. The second driving magnet 1420 may comprise an air gap. The second driving magnet 1420 may comprise a neutral portion. The neutral portion of the second driving magnet 1420 may be a portion having a neutral polarity. The air gap of the second driving magnet 1420 may be disposed in an optical axis direction.

The second driving magnet 1420 may comprise a plurality of magnets. The second driving magnet 1420 may comprise four magnets. The second driving magnet 1420 may comprise first to fourth magnets. The first to fourth magnets may be disposed symmetrically to the optical axis. The first to fourth magnets may be formed to have the same size and shape as each other.

The second driving magnet 1420 may be disposed below the first driving magnet 1410. The second driving magnet 1420 may be disposed on a lower surface of the first driving magnet 1410. The second driving magnet 1420 may be in contact with a lower surface of the first driving magnet 1410. The second driving magnet 1420 may be fixed to a lower surface of the first driving magnet 1410. The second driving magnet 1420 may be coupled to the lower surface of the first driving magnet 1410 by an adhesive. In the optical axis direction, the length of the second driving magnet 1420 may be shorter than the length of the first driving magnet 1410. The size of the second driving magnet 1420 may be smaller than the length of the first driving magnet 1410.

The camera device 1010 may comprise a first coil 1430. The driving unit may comprise a first coil 1430. The first coil 1430 may be disposed in the first moving part 1200. The first coil 1430 may be fixed to the first moving part 1200. The first coil 1430 may be coupled to the first moving part 1200. The first coil 1430 may be attached to the first moving part 1200 by an adhesive. The first coil 1430 may be disposed in the bobbin 1210. The first coil 1430 may be fixed to the bobbin 1210. The first coil 1430 may be coupled to the bobbin 1210. The first coil 1430 may be attached to the bobbin 1210 by an adhesive. The first coil 1430 may be electrically connected to the driver IC 1480. The first coil 1430 may be electrically connected to the lower elastic member 1720, the sensing substrate 1470, and the driver IC 1480. The first coil 1430 may be supplied with a current from the driver IC 1480.

The first coil 1430 may be disposed at a position corresponding to the first driving magnet 1410. The first coil 1430 may be disposed in the bobbin 1210 at a position corresponding to the first driving magnet 1410. The first coil 1430 may face the first driving magnet 1410. The first coil 1430 may comprise a surface facing the first driving magnet 1410. The first coil 1430 may be disposed adjacent to the first driving magnet 1410. The first coil 1430 may interact with the first driving magnet 1410. The first coil 1430 may electromagnetically interact with the first driving magnet 1410.

The first coil 1430 may move the first moving part 1200 in an optical axis direction. The first coil 1430 may move the bobbin 1210 in an optical axis direction. The first coil 1430 may move the lens 1220 in an optical axis direction. The first coil 1430 may move the first moving part 1200 in an upward direction of the optical axis direction. The first coil 1430 may move the bobbin 1210 in an upward direction of the optical axis direction. The first coil 1430 may move the lens 1220 in an upward direction of the optical axis direction. The first coil 1430 may move the first moving part 1200 in a downward direction of the optical axis direction. The first coil 1430 may move the bobbin 1210 in a downward direction of the optical axis direction. The first coil 1430 may move the lens 1220 in a downward direction of the optical axis direction.

The camera device 1010 may comprise a second coil 1440. The driving unit may comprise a second coil 1440. The second coil 1440 may be disposed in the second moving part 1300. The second coil 1440 may be fixed to the second moving part 1300. The second coil 1440 may be coupled to the second moving part 1300. The second coil 1440 may be attached to the second moving part 1300 by an adhesive. The second coil 1440 may be disposed in the holder 1340. The second coil 1440 may be fixed to the holder 1340. The second coil 1440 may be coupled to the holder 1340. The second coil 1440 may be attached to the holder 1340 by an adhesive. The second coil 1440 may be wound around the protrusion of the holder 1340 and disposed. The second coil 1440 may be disposed on the holder 1340. The second coil 1440 may be electrically connected to the second substrate 1310. Both ends of the second coil 1440 may be soldered to the second substrate 1310. The second coil 1440 may be coupled to the second substrate 1310 by soldering. The second coil 1440 may be electrically connected to the driver IC 1495. The second coil 1440 may be electrically connected to the second substrate 1310 and the driver IC 1495. The second coil 1440 may receive a current from the driver IC 1495.

The second coil 1440 may be disposed at a position corresponding to the second driving magnet 1420. The second coil 1440 may be disposed in the holder 1340 at a position corresponding to the second driving magnet 1420. The second coil 1440 may face the second driving magnet 1420. The second coil 1440 may comprise a surface facing the second driving magnet 1420. The second coil 1440 may be disposed adjacent to the second driving magnet 1420. The second coil 1440 may interact with the second driving magnet 1420. The second coil 1440 may electromagnetically interact with the second driving magnet 1420.

The second coil 1440 may move the second moving part 1300 in a direction perpendicular to the optical axis direction. The second coil 1440 may move the second substrate 1310 in a direction perpendicular to the optical axis direction. The second coil 1440 may move the sensor substrate 1320 in a direction perpendicular to the optical axis direction. The second coil 1440 may move the image sensor 1330 in a direction perpendicular to the optical axis direction. The second coil 1440 may move the holder 1340 in a direction perpendicular to the optical axis direction. The second coil 1440 may rotate the second moving part 1300 about an optical axis. The second coil 1440 may rotate the second substrate 1310 about an optical axis. The second coil 1440 may rotate the sensor substrate 1320 about an optical axis. The second coil 1440 may rotate the image sensor 1330 about an optical axis. The second coil 1440 may rotate the holder 1340 about an optical axis.

The second coil 1440 may comprise a plurality of coils. The second coil 1440 may comprise four coils. The second coil 1440 may comprise a coil for x-axis shift. The second coil 1440 may comprise a coil for y-axis shift.

The second coil 1440 may comprise a second-first coil 1441. The second-first coil 1441 may be a first sub-coil. The second-first coil 1441 may be a coil for x-axis shift. The second-first coil 1441 may move the second moving part 1300 in the x-axis direction. The second-first coil 1441 may be disposed long in length along the y-axis. The second-first coil 1441 may comprise a plurality of coils. The second-first coil 1441 may comprise two coils. The two coils of the second-first coil 1441 may be electrically connected to each other. The second-first coil 1441 may comprise a connection coil connecting the two coils. In this case, the two coils of the second-first coil 1441 may receive current together. Or, the two coils of the second-first coil 1441 may be electrically separated from each other to receive current individually.

The second coil 1440 may comprise a second-second coil 1442. The second-second coil 1442 may be a second sub-coil. The second-second coil 1442 may be a coil for y-axis shift. The second-second coil 1442 may move the second moving part 1300 in the y-axis direction. The second-second coil 1442 may be disposed in length along the x-axis. The second-first coil 1441 may comprise a plurality of coils. The second-second coil 1442 may comprise two coils. The two coils of the second-second coil 1442 may be electrically connected to each other. The second-second coil 1442 may comprise a connection coil connecting the two coils. In this case, the two coils of the second-second coil 1442 may receive current together. Or, the two coils of the second-second coil 1442 may be electrically separated from each other to receive current individually.

The camera device 1010 may comprise a Hall sensor 1445. The Hall sensor 1445 may be disposed in the second substrate 1310. The Hall sensor 1445 may be disposed in a hole of the holder 1340. The Hall sensor 1445 may comprise a Hall IC. The Hall sensor 1445 may detect the second driving magnet 1420. The Hall sensor 1445 may detect the magnetic force of the second driving magnet 1420. The Hall sensor 1445 may face the second driving magnet 1420. The Hall sensor 1445 may be disposed at a position corresponding to the second driving magnet 1420. The Hall sensor 1445 may be disposed adjacent to the second driving magnet 1420. The Hall sensor 1445 may detect the position of the second moving part 1300. The Hall sensor 1445 may detect the movement of the second moving part 1300. The Hall sensor 1445 may be disposed in a hollow of the second coil 1440. The detected value detected by the Hall sensor 1445 may be used to feedback the handshake correction operation. The Hall sensor 1445 may be electrically connected to the driver IC 1495.

The Hall sensor 1445 may comprise a plurality of Hall sensors. The Hall sensor 1445 may comprise three Hall sensors. The Hall sensor 1445 may comprise first to third Hall sensors. The first Hall sensor may detect the displacement of the second moving part 1300 in the x-axis direction. The second Hall sensor may detect the displacement of the second moving part 1300 in the y-axis direction. The third Hall sensor may detect the rotation of the second moving part 1300 about the z-axis alone or together with any one or more of the first Hall sensor and the second Hall sensor.

The camera device 1010 may comprise a sensing magnet 1450. The sensing magnet 1450 may be disposed in the first moving part 1200. The sensing magnet 1450 may be fixed to the first moving part 1200. The sensing magnet 1450 may be coupled to the first moving part 1200. The sensing magnet 1450 may be attached to the first moving part 1200 by an adhesive. The sensing magnet 1450 may be disposed in the bobbin 1210. The sensing magnet 1450 may be fixed to the bobbin 1210. The sensing magnet 1450 may be coupled to the bobbin 1210. The sensing magnet 1450 may be attached to the bobbin 1210 by an adhesive. The sensing magnet 1450 may be formed to have a smaller size than the first driving magnet 1410. The sensing magnet 1450 may be formed to have a smaller size than the second driving magnet 1420. Through this, the influence of the sensing magnet 1450 on driving may be minimized.

The sensing magnet 1450 may be disposed at an opposite side of the correction magnet 1460. The sensing magnet 1450 and the correction magnet 1460 may be disposed opposite to each other in the first moving part 1200. The sensing magnet 1450 and the correction magnet 1460 may be disposed opposite to each other in the bobbin 1210.

The camera device 1010 may comprise a correction magnet 1460. The correction magnet 1460 may be a compensating magnet. The correction magnet 1460 may be disposed in the first moving part 1200. The correction magnet 1460 may be fixed to the first moving part 1200. The correction magnet 1460 may be coupled to the first moving part 1200. The correction magnet 1460 may be attached to the first moving part 1200 by an adhesive. The correction magnet 1460 may be disposed in the bobbin 1210. The correction magnet 1460 may be fixed to the bobbin 1210. The correction magnet 1460 may be coupled to the bobbin 1210. The correction magnet 1460 may be attached to the bobbin 1210 by an adhesive. The correction magnet 1460 may be formed to have a smaller size than the first driving magnet 1410. The correction magnet 1460 may be formed to have a smaller size than the second driving magnet 1420. Through this, the influence of the correction magnet 1460 on driving may be minimized. In addition, the correction magnet 1460 may be disposed at an opposite side of the sensing magnet 1450 to form a magnetic force balance with the sensing magnet 1450. Through this, a tilt that may be generated by the sensing magnet 1450 may be inhibited.

The camera device 1010 may comprise a sensing substrate 1470. The sensing substrate 1470 may be a substrate. The sensing substrate 1470 may be a printed circuit board (PCB). The sensing substrate 1470 may be a flexible substrate. The sensing substrate 1470 may be an FPCB. The sensing substrate 1470 may be coupled with the first substrate 1110. The sensing substrate 1470 may be connected to the first substrate 1110. The sensing substrate 1470 may be electrically connected to the first substrate 1110. The sensing substrate 1470 may be soldered to the first substrate 1110. The sensing substrate 1470 may be disposed in the housing 1130. The sensing substrate 1470 may be fixed to the housing 1130. The sensing substrate 1470 may be coupled to the housing 1130. The housing 1130 may comprise a groove or hole having a shape corresponding to that of the sensing substrate 1470. The sensing substrate 1470 may be disposed in a groove or hole of the housing 1130.

The camera device 1010 may comprise a driver IC 1480. The driver IC 480 may be an AF driver IC. The driver IC 1480 may be electrically connected to the first coil 1430. The driver IC 1480 may apply a current to the first coil 1430 to perform AF driving. The driver IC 1480 may apply power to the first coil 1430. The driver IC 1480 may apply a current to the first coil 1430. The driver IC 1480 may apply a voltage to the first coil 1430. The driver IC 1480 may be disposed in the sensing substrate 1470. The driver IC 1480 may be disposed at a position corresponding to the sensing magnet 1450. The driver IC 1480 may be disposed to face the sensing magnet 1450. The driver IC 1480 may be disposed adjacent to the sensing magnet 1450.

The driver IC 1480 may comprise a sensor. The sensor may comprise a Hall IC. The sensor may be disposed at a position corresponding to the sensing magnet 1450. The sensor may be disposed to face the sensing magnet 1450. The sensor may be disposed adjacent to the sensing magnet 1450. The sensor may detect the sensing magnet 1450. The sensor may detect the magnetic force of the sensing magnet 1450. The sensor may detect the position of the first moving part 1200. The sensor may detect the movement of the first moving part 1200. The detected value detected by the sensor may be used for feedback of auto focus driving.

The camera device 1010 may comprise a gyro sensor 1490. The gyro sensor 1490 may be disposed on the first substrate 1110. The gyro sensor 1490 may detect the shaking of the camera device 1010. The gyro sensor 1490 may detect an angular velocity or a linear velocity caused by shaking of the camera device 1010. The gyro sensor 1490 may be electrically connected to the driver IC 1495. The shaking of the camera device 1010 detected by the gyro sensor 1490 may be used to drive the handshake correction (OIS).

The camera device 1100 may comprise a driver IC 1495. The driver IC 1495 may be an OIS driver IC. The driver IC 1495 may be electrically connected to the second coil 1440. The driver IC 1495 may apply a current to the second coil 1440 to perform OIS driving. The driver IC 1495 may apply power to the second coil 1440. The driver IC 1495 may apply a current to the second coil 1440. The driver IC 1495 may apply a voltage to the second coil 1440. The driver IC 1495 may be disposed in the second substrate 1310.

The camera device 1010 may comprise a connection member. The connection member may be an interposer. The connection member may support the movement of the second moving part 1300. The connection member may movably support the second moving part 1300. The connection member may connect the second moving part 1300 and the fixed part 1100. The connection member can connect the first substrate 1110 and the second substrate 1310. The connection member may electrically connect the first substrate 1110 and the second substrate 1310. The connection member may connect the first substrate 1110 and the second moving part 1300. The connection member may guide the movement of the second moving part 1300. The connection member may guide the second moving part 1300 to move in a direction perpendicular to the optical axis direction. The connection member may guide the second moving part 1300 to rotate about the optical axis. The connection member may limit movement of the second moving part 1300 in the optical axis direction.

The connection member may comprise a connection substrate 1600. The connection member may comprise an elastic member for connecting the fixed part 1100 and the second moving part 1300. The connection member may comprise a leaf spring. The connection member may comprise a wire 1800. The connection member may comprise a ball disposed between the fixed part 1100 and the second moving part 1300.

The camera device 1010 may comprise a connection substrate 1600. The connection substrate 1600 may be a connection part. The connection substrate 1600 may be a connection member. The connection substrate 1600 may be a flexible substrate. The connection substrate 1600 may be a soft substrate. The connection substrate 1600 may be a flexible printed circuit board. The connection substrate 1600 may be a flexible printed circuit board (FPCB). At least a portion of the connection substrate 1600 may have flexibility therein. The second substrate 1310 and the connection substrate 1600 may be integrally formed.

The connection 1600 may support the second moving part 1300. The connection substrate 1600 may support the movement of the second moving part 1300. The connection substrate 1600 may movably support the second moving part 1300. The connection substrate 1600 may connect the second moving part 1300 and the fixed part 1100. The connection substrate 1600 can connect the first substrate 1110 and the second substrate 1310. The connection substrate 1600 may electrically connect the first substrate 1110 and the second substrate 1310. The connection substrate 1600 may guide the movement of the second moving part 1300. The connection substrate 1600 may guide the second moving part 1300 to move in a direction perpendicular to the optical axis direction. The connection substrate 1600 may guide the second moving part 1300 to rotate about the optical axis. The connection substrate 1600 may limit the movement of the second moving part 1300 in an optical axis direction. A portion of the connection substrate 1600 may be coupled to the base 1120.

The connection substrate 1600 may comprise two connection substrates 1600 being spaced apart from each other and formed symmetrically. Two connection substrates 1600 may be disposed on both sides of the second substrate 1310. The connection substrate 1600 may be formed by being bent a total of 6 times so as to connect the first substrate 1110 and the second substrate 1310.

The connection substrate 1600 may comprise a first region connected to the second substrate 1310 and bent in the optical axis direction. The first region is connected to the second substrate 1310 and may be bent in the optical axis direction. The first region is connected to the second substrate 1310 and may be extended in the optical axis direction. The first region is connected to the second substrate 1310 and may be bent and extended in the optical axis direction. The connection substrate 1600 may comprise a second region being extended from the first region. The connection substrate 1600 may comprise a third region being bent in a direction perpendicular to the optical axis direction in the second region. The third region may be bent in a direction perpendicular to the optical axis direction in the second region. The third region may be extended in a direction perpendicular to the optical axis direction in the second region. The third region may be bent and extended in a direction perpendicular to the optical axis direction in the second region.

The connection substrate 1600 may comprise a connection part 1610 comprising a first region. The connection substrate 1600 may comprise an extension part 1620 comprising a second region and a third region. The connection substrate 1600 may comprise a connection part 1610 being connected to the second substrate 1310. The connection substrate 1600 may comprise an extension part 1620 being extended from the connection part 1610. The connection substrate 1600 may comprise a terminal unit 1630 being connected to the extension part 1620 and comprising a terminal.

The connection substrate 1600 may comprise a connection part 1610. The connection part 1610 may be connected to the second moving part 1300. The connection part 1610 may be coupled to the second moving part 1300. The connection part 1610 may be fixed to the second moving part 1300. The connection part 1610 may be connected to the second substrate 1310. The connection part 1610 may be coupled to the second substrate 1310. The connection part 1610 may be fixed to the second substrate 1310. The connection part 1610 may comprise a first bending region that is bent in the optical axis direction. The connection part 1610 may comprise a first region being bent in the optical axis direction against the second substrate 1310 and a second region being extended from the first region and being bent in a direction perpendicular to the optical axis direction.

The connection substrate 1600 may comprise an extension part 1620. The extension part 1620 may connect the connection part 1610 and the terminal unit 1630. The extension part 1620 may be extended from the connection part 1610. The extension part 1620 may comprise a second bending region being bent in a direction perpendicular to the optical axis direction.

The connection substrate 1600 may comprise a terminal unit 1630. The terminal unit 1630 may be coupled to the fixed part 1100. The terminal unit 1630 may be fixed to the fixed part 1100. The terminal unit 1630 may be coupled to the first substrate 1110. The terminal unit 1630 may be connected to the first substrate 1110. The terminal unit 1630 may be soldered to the first substrate 1110. The terminal unit 1630 may be fixed to the first substrate 1110. The terminal unit 1630 may be coupled to the base 1120. The terminal unit 1630 may be fixed to the base 1120. The terminal unit 1630 may comprise a terminal. The terminal may be coupled to the first substrate 1110.

In a second embodiment of the present invention, the camera device 1010 may comprise a flexible substrate. The flexible substrate may connect the fixed part 1100 and the second moving part 1300. The flexible substrate may comprise a connection part 1610 being connected to the second moving part 1300, an extension part 1620 being extended from the connection part 1610, and a terminal unit 1630 being connected to the extension part 1620 and comprising a terminal.

In a second embodiment of the present invention, the connection substrate 1600 may comprise a first portion coupled to the first substrate 1110, a second portion coupled to the second substrate 1310, and a third portion connecting the first portion and the second portion. The third portion may be disposed parallel to an optical axis at least in part. The third portion may be formed to have the length in an optical axis direction longer than the thickness. The second portion of the connection substrate 1600 may be disposed parallel to the second substrate 1310 at least in part. The third portion of the connection substrate 1600 may be disposed vertically with respect to the second portion at least in part. The third portion of the connection substrate 1600 may be bent roundly in a portion corresponding to the corner of the second substrate 1310. The second substrate 1310 may comprise a first side and a second side disposed opposite to each other, and a third side and a fourth side disposed opposite to each other. The second portion of the connection substrate 1600 may be coupled to the first side and the second side of the second substrate 1310. The first portion of the connection substrate 1600 may be coupled to a portion of the first substrate 1110 corresponding to the third and fourth sides of the second substrate 1310.

The camera device 1010 may comprise a metal plate. The connection member may comprise a metal plate. The connection substrate 1600 may comprise a metal plate. However, the metal plate may be understood as a configuration separate from the connection substrate 1600. The metal plate may be a metal member. The metal plate may be a metal part. The metal plate may be a metal layer. The metal plate may be a metal thin film. The metal plate may be formed of metal. The metal plate may be formed of an alloy. The metal plate may be formed of a copper alloy. The metal plate may be formed of a conductive material. The metal plate may be distinguished from a conductive layer 1602 of the connection substrate 1600. The metal plate may be formed of a material different from the conductive layer 1602 of the connection substrate 1600. The metal plate may be disposed in the connection substrate 1600. The metal plate may be coupled to the connection substrate 1600. The metal plate may be fixed to the connection substrate 1600. The metal plate may be integrally formed with the connection substrate 1600. The metal plate may have elasticity.

In an optical axis direction, the length of the metal plate at least in part may be the same as the length of the extension part 1620. The metal plate may be extended to the same length as the extension part 1620 in an optical axis direction. The thickness of the metal plate may be the same as the thickness of the connection substrate 1600. The thickness of the metal plate may be thicker than the thickness of the connection substrate 1600. The thickness of the conductive layer may be 7 to 50 µm. The thickness of the metal plate may be 20 to 150 µm. The metal plate may be used for impedance matching and noise suppression by connecting to the ground (GND).

At least a portion of the metal plate may be disposed in the extension part 1620 of the connection substrate 1600. The extension part 1620 may comprise a bending region that is bent in a direction perpendicular to the optical axis direction. At this time, the metal plate may be placed in the bending region. The metal plate may be disposed on an inner surface of the extension part 1620. The metal plate may be disposed on an outer surface of the extension part 1620.

The metal plate may be formed of a conductive material. The metal plate may be electrically connected to the second substrate 1310. The metal plate may be electrically connected to the image sensor 1330. The metal plate may be electrically connected to the driver IC 1495. The metal plate may be connected to the terminal 1631 of the connection substrate 1600. The metal plate may be electrically connected to the terminal 1631 of the connection substrate 1600. The metal plate may be in direct contact with the terminal 1631 of the connection substrate 1600. The metal plate may be coupled to the terminal 1631 of the connection substrate 1600 by a conductive member. The metal plate may be used as a ground (GND). The metal plate may be connected to the ground terminal of the connection substrate 1600. The metal plate may be electrically connected to the first substrate 1110. In this case, the number of power connection patterns of the connection substrate 1600 may be reduced.

The camera device 1010 may comprise an electromagnetic interference (EMI) tape. The connection substrate 1600 may comprise a metal member on an outer side surface. The metal member may comprise any one or more of an EMI tape and a metal plate. The connection substrate 1600 may comprise an EMI member. The connection substrate 1600 may comprise an EMI tape. The EMI member may comprise an EMI tape. The EMI member may also comprise an EMI member that is non-adhesive. EMI tape can replace the metal plate. Or, the EMI tape may be placed with a metal plate. The EMI tape may be a conductive tape. EMI tapes can be conductive and adhesive. The EMI tape may be disposed in the connection substrate 1600. EMI tape may be disposed on an inner surface of the connection substrate 1600. The EMI tape may be disposed on an outer surface of the connection substrate 1600. The EMI tape may be disposed on an inner surface of the extension part 1620 of the connection substrate 1600. The EMI tape may be disposed on an outer surface of the extension part 1620 of the connection substrate 1600. The EMI tape may be attached to the connection substrate 1600 to reinforce the elasticity or rigidity of the connection substrate 1600. The EMI tape may be a reinforcing member.

The EMI tape may be electrically connected to the second substrate 1310. The EMI tape may be electrically connected to the image sensor 1330. The EMI tape may be electrically connected to the driver IC 1495. The EMI tape may be connected to the terminal 1631 of the connection substrate 1600. The EMI tape may be electrically connected to the terminal 1631 of the connection substrate 1600. The EMI tape may be in direct contact with the terminal 1631 of the connection substrate 1600. The EMI tape can be used as a ground (GND). The EMI tape may be connected to the ground terminal of the connection substrate 1600. The EMI tape may be electrically connected to the first substrate 1110. In this case, the number of power connection patterns of the connection substrate 1600 may be reduced.

The camera device 1010 may comprise an elastic member 1700. The elastic member 1700 may be a support member. The elastic member 1700 may connect the fixed part 1100 and the first moving part 1200. The elastic member 1700 may elastically connect the fixed part 1100 and the first moving part 1200. The elastic member 1700 may connect the bobbin 1210 and the housing 1130. The elastic member 1700 may elastically connect the bobbin 1210 and the housing 1130. The elastic member 1700 may movably support the first moving part 1200 against the fixed part 1100. The elastic member 1700 may be deformed when the first moving part 1200 is moved. When the movement of the first moving part 1200 is finished, the elastic member 1700 may position the first moving part 1200 to an initial position through a restoring force (elastic force). The elastic member 1700 may comprise a leaf spring. The elastic member 1700 may comprise a spring. The elastic member 1700 may have elasticity at least in part. The elastic member 1700 may provide a restoring force (elastic force) to the first moving part 1200.

The camera device 1010 may comprise an upper elastic member 1710. The elastic member 1700 may comprise an upper elastic member 1710. The upper elastic member 1710 may be disposed above the lower elastic member 1720. The upper elastic member 1710 may comprise an inner side portion coupled to the bobbin 1210. An inner side portion of the upper elastic member 1710 may be coupled to an upper portion of the bobbin 1210. The inner portion of the upper elastic member 1710 may be disposed on an upper surface of the bobbin 1210. The upper elastic member 1710 may comprise an outer side portion being coupled to the housing 1130. The outer side portion of the upper elastic member 1710 may be coupled to a lower portion of the housing 1130. The outer side portion of the upper elastic member 1710 may be disposed on a lower surface of the housing 1130. The upper elastic member 1710 may comprise a connection part connecting the inner side portion and the outer side portion. The connection part may have elasticity.

The camera device 1010 may comprise a lower elastic member 1720. The elastic member 1700 may comprise a lower elastic member 1720. The lower elastic member 1720 may be disposed below the upper elastic member 1710. The lower elastic member 1720 may comprise an inner side portion coupled to the bobbin 1210. The inner side portion of the lower elastic member 1720 may be coupled to a lower portion of the bobbin 1210. The inner side portion of the lower elastic member 1720 may be disposed on a lower surface of the bobbin 1210. The lower elastic member 1720 may comprise an outer side portion being coupled to the housing 1130. The outer side portion of the lower elastic member 1720 may be coupled to an upper portion of the housing 1130. The outer side portion of the lower elastic member 1720 may be disposed on an upper surface of the housing 1130. The lower elastic member 1720 may comprise a connection part connecting an inner side portion and an outer side portion. The connection part may have elasticity.

The lower elastic member 1720 may comprise a plurality of lower elastic units. The lower elastic member 1720 may comprise first and second lower elastic units 1720-1 and 1720-2. The lower elastic member 1720 may comprise two lower elastic units 1720-1 and 1720-2. The two lower elastic units 1720-1 and 1720-2 are spaced apart from each other to electrically connect the sensing substrate 1470 and the first coil 1430.

The camera device 1010 may comprise a wire 1800. The wire 1800 may be a wire spring. The wire 1800 may be an elastic member. The wire 1800 may be a leaf spring in a modified embodiment. The wire 1800 may connect the fixed part 1100 and the second moving part 1300. The wire 1800 may elastically connect the fixed part 1010 and the second moving part 1300. The wire 1800 may connect the housing 1130 and the second substrate 1310. The wire 1800 may elastically connect the housing 1130 and the second substrate 1310. The wire 1800 may movably support the second moving part 1300. The wire 1800 may be disposed in the optical axis direction. The wire 1800 may movably support the second moving part 1300. The wire 1800 may support the second moving part 1300 to move or rotate in a direction perpendicular to the optical axis direction. The wire 1800 may connect the upper elastic member 1710 and the terminal 1380. The wire 1800 may electrically connect the upper elastic member 1710 and the terminal 1380. The wire 1800 may be coupled to the upper elastic member 1710 through solder. The wire 1800 may be coupled to the terminal 1380 through solder. The wire 1800 may comprise a plurality of wires. The wire 1800 may comprise four wires.

The assembly of the image sensor 1330 in a second embodiment of the present invention may be performed in the following sequences. A sensor substrate 1320 that is a rigid cavity PCB may be attached on the plate member 1370 that is a metal stiffener. Thereafter, the image sensor 1330 may be mounted on the upper surface of the stiffener. Thereafter, the image sensor 1330 may be wire-bonded to the sensor substrate 1320.

In a second embodiment of the present invention, the plate member 1370 may be etched in the mounting area of the sensor substrate 1320. Furthermore, additional etching may be applied to the lower surface as well. Through this, the weight of the plate member 1370 may be reduced.

Hereinafter, the driving of the camera device according to a second embodiment of the present invention will be described with reference to the drawings.

Figure 45:
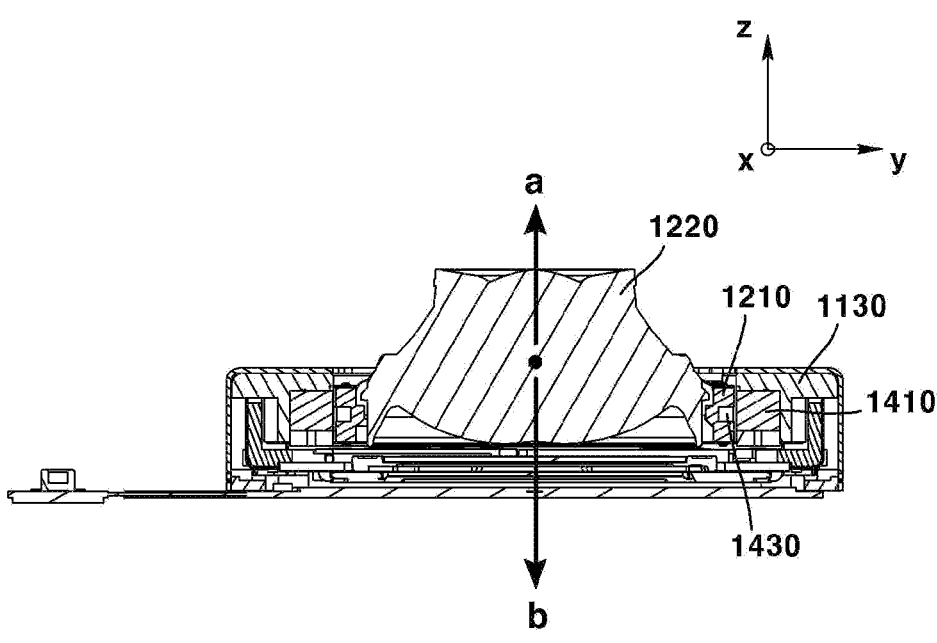
FIG. 45 is a diagram for explaining the operation of an auto focus function of a camera device according to a second embodiment of the present invention.

FIG. 45 is a diagram for explaining the operation of an auto focus function of a camera device according to a second embodiment of the present invention.

When power is applied to the first coil 1430 of the camera device 1010 according to a second embodiment of the present invention, an electromagnetic field is formed in the first coil 1430 so that the first coil 1430 can move in the optical axis direction (z-axis direction) through electromagnetic interaction with the first driving magnet 1410. At this time, the first coil 1430 may move in the optical axis direction together with the first moving part 1200 comprising the lens 1220. In this case, since the lens 1220 is being moved away from or comes closer to the image sensor 1330, the focus of the subject can be adjusted. Any one or more of a current and a voltage may be applied to apply power to the first coil 1430.

When a current in the first direction is applied to the first coil 1430 of the camera device 1010 according to a second embodiment of the present invention, the first coil 1430 may move in an upward direction (refer to a in FIG. 45) of the optical axis direction through the electromagnetic interaction with the first driving magnet 1410. At this time, the first coil 1430 may move the lens 1220 in an upward direction of the optical axis direction to move away from the image sensor 1330.

When a current in a second direction opposite to the first direction is applied to the first coil 1430 of the camera device 1010 according to a second embodiment of the present invention, the first coil 1430 may move in a lower direction (refer to b in FIG. 45) of the optical axis direction through electromagnetic interaction with the first driving magnet 1410. At this time, the first coil 1430 may move the lens 1220 in a lower direction of the optical axis so as to be closer to the image sensor 1330.

Figure 46:
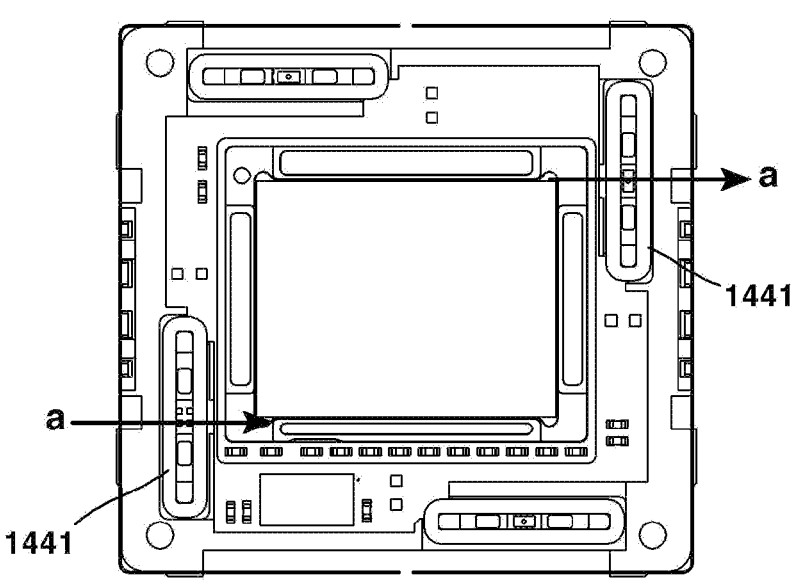
FIGS. 46 to 48 are diagrams for explaining the operation of a handshake correction function of a camera device according to a second embodiment of the present invention. In more detail.
Figure 46:
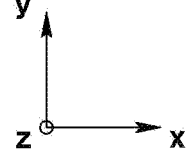
Figure 47:
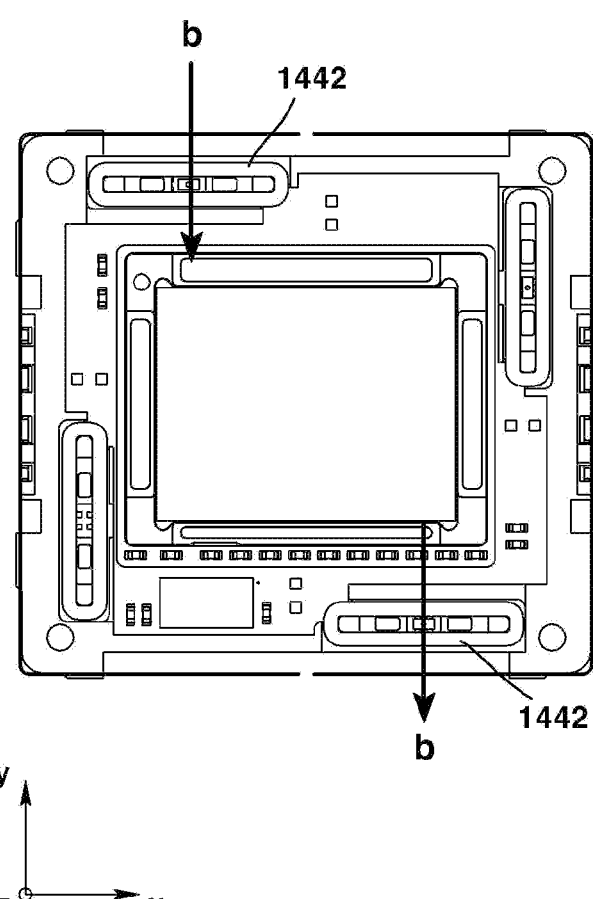
Figure 48:
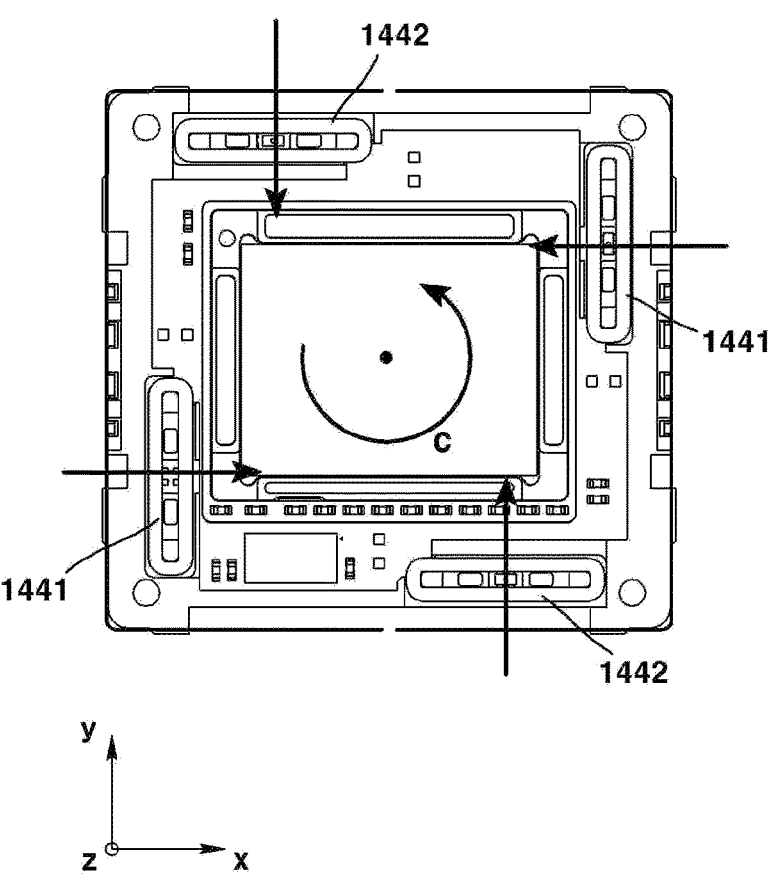

FIGS. 46 to 48 are diagrams for explaining the operation of a handshake correction function of a camera device according to a second embodiment of the present invention.

When power is applied to the second coil 1440 of the camera device 1010 according to a second embodiment of the present invention, an electromagnetic field is formed in the second coil 1440, and the second coil 1440 may move in a direction perpendicular to the direction of the optical axis through electromagnetic interaction with the second driving magnet 1420. In addition, the second coil 1440 may rotate against the optical axis through electromagnetic interaction with the second driving magnet 1420. At this time, the second coil 1440 may move or rotate together with the second moving part 1300 comprising the image sensor 1330. In a second embodiment of the present invention, the second coil 1440 may move the image sensor 1330 to compensate for shaking of the camera device 1010 detected by the gyro sensor 1490.

FIG. 46 is a diagram for explaining driving in which an image sensor of a camera device is shifted along the x-axis according to a second embodiment of the present invention.

When a current in a first direction is applied to the second-first coil 1441 of the camera device 1010 according to a second embodiment of the present invention, the second-first coil 1441 can move in one direction (refer to a in FIG. 46) of the first direction (x-axis direction) perpendicular to the optical axis direction through electromagnetic interaction with second driving magnet 1420. At this time, the second-first coil 1441 may move the image sensor 1330 in one of the first directions perpendicular to the optical axis direction. Conversely, when a current in a second direction opposite to the first direction is applied to the second-first coil 1441, the second-first coil 1441 may move in the other direction of the first direction (x-axis direction) perpendicular to the optical axis direction through electromagnetic interaction with the second driving magnet 1420. At this time, the second-first coil 1441 may move the image sensor 1330 in the other direction of the first directions perpendicular to the optical axis direction.

FIG. 47 is a diagram for explaining driving in which an image sensor of a camera device is shifted along the y-axis according to a second embodiment of the present invention.

When a current in a first direction is applied to the second-second coil 1442 of the camera device 1010 according to a second embodiment of the present invention, the second-second coil 1442 may move in one of the second directions (y-axis direction) perpendicular to the optical axis direction (refer to b of FIG. 47) through electromagnetic interaction with the second driving magnet 1420. At this time, the second-second coil 1442 may move the image sensor 1330 in one of the second directions perpendicular to the optical axis direction. Conversely, when a current in a second direction opposite to the first direction is applied to the second-second coil 1442, the second-second coil 1442 may move in the other direction of the second directions (y-axis direction) perpendicular to the optical axis direction through electromagnetic interaction with the second driving magnet 1420. At this time, the second-second coil 1442 may move the image sensor 1330 in the other direction of the second directions perpendicular to the optical axis direction.

FIG. 48 is a diagram for explaining the driving of an image sensor of a camera device according to a second embodiment of the present invention being rolled about the z-axis.

When current in a first direction is applied to the second-first coil 1441 and the second-second coil 1442 of the camera device 1010 according to a second embodiment of the present invention, the second-first coil 1441 and the second-second coil 1442 may rotate in one direction about the optical axis through electromagnetic interaction with the second driving magnet 1420 (refer to c in FIG. 48). At this time, the second-first coil 1441 and the second-second coil 1442 may rotate the image sensor 1330 in one direction about the optical axis. At this time, one direction may be counterclockwise. Conversely, when a current is applied to the second-first coil 1441 and the second-second coil 1442 in a second direction opposite to the first direction, the second-first coil 1441 and the second-second coil 1442 may rotate in other directions about the optical axis through electromagnetic interaction with the second driving magnet 1420. At this time, the second-first coil 1441 and the second-second coil 1442 may rotate the image sensor 1330 in other directions about the optical axis. At this time, the other direction may be clockwise.

Hereinafter, an optical apparatus according to a second embodiment of the present invention will be described with reference to the drawings.

Figure 49:
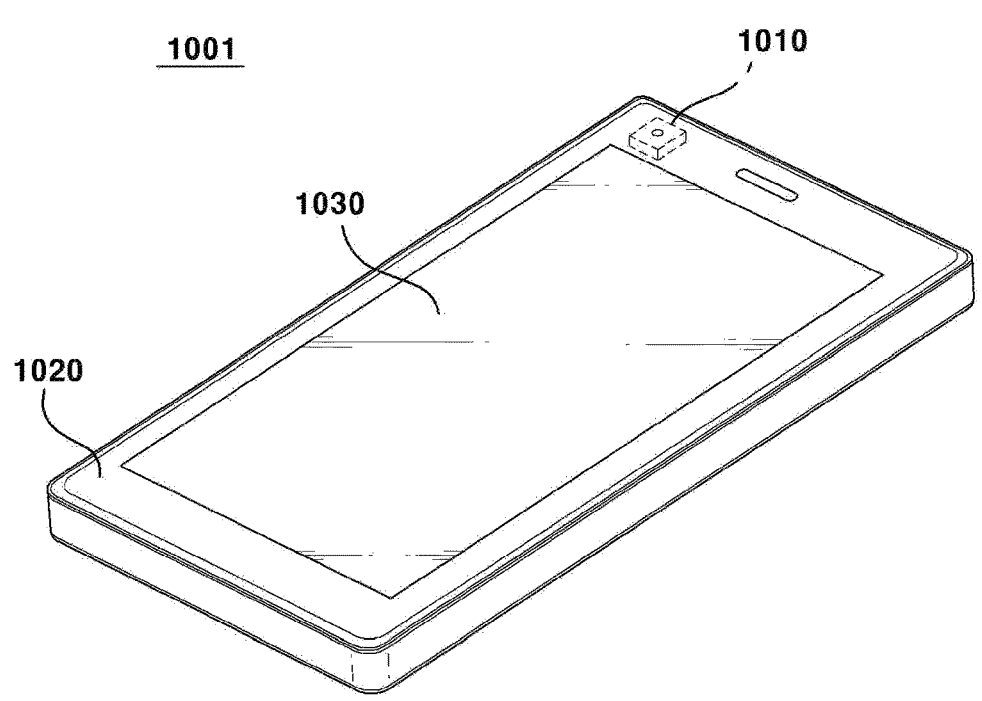
FIG. 49 is a perspective view of an optical apparatus according to a second embodiment of the present invention.
Figure 50:
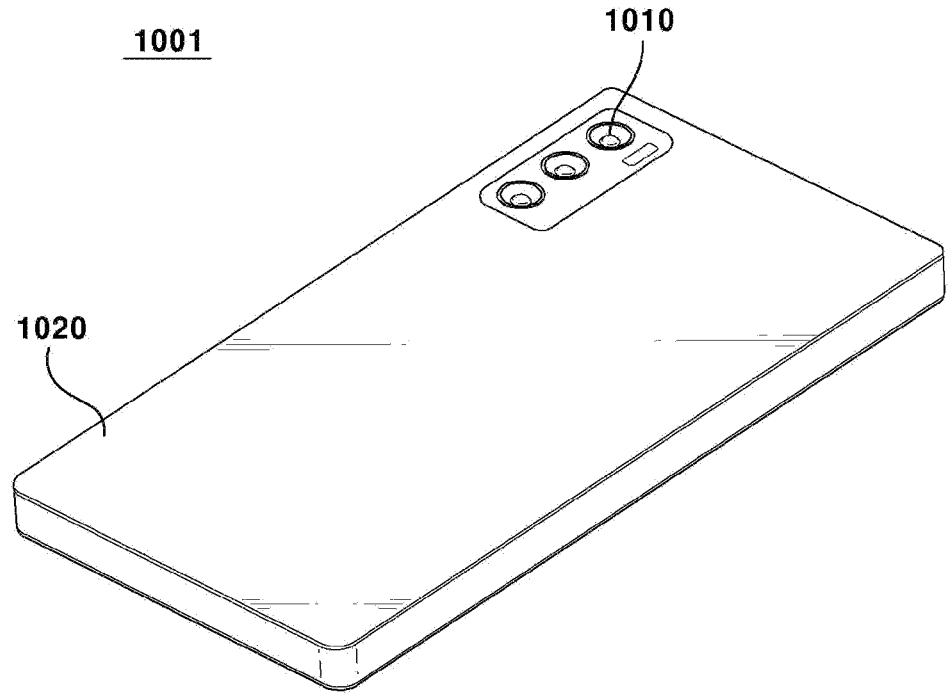
FIG. 50 is a perspective view of an optical apparatus according to a second embodiment of the present invention, as viewed from a different direction from that of FIG. 49.

FIG. 49 is a perspective view of an optical apparatus according to a second embodiment of the present invention.

The optical apparatus 1010 may comprise any one or more of a mobile phone, a mobile phone, a mobile terminal, a mobile terminal, a smart phone, a smart pad, a portable smart device, a digital camera, a laptop computer, a digital broadcasting terminal, a personal digital assistant (PDA), a portable multimedia player (PMP), and navigation. The optical apparatus 1010 may comprise any device for photographing images or photos.

The optical apparatus 1001 may comprise a main body 1020. The optical apparatus 1001 may comprise a camera device 1010. The camera device 1010 may be disposed in the main body 1020. The camera device 1010 may photograph a subject. The optical apparatus 1001 may comprise a display 1030. The display 1030 may be disposed in the main body 1020. The display 1030 may output any one or more of an image and an image photographed by the camera device 1010. The display 1030 may be disposed on the first surface of the main body 1020. The camera device 1010 may be disposed in one or more of a first surface of the main body 1020 and a second surface opposite to the first surface.

Hereinafter, a camera device according to a third embodiment of the present invention will be described with reference to the drawings.

Figure 51:
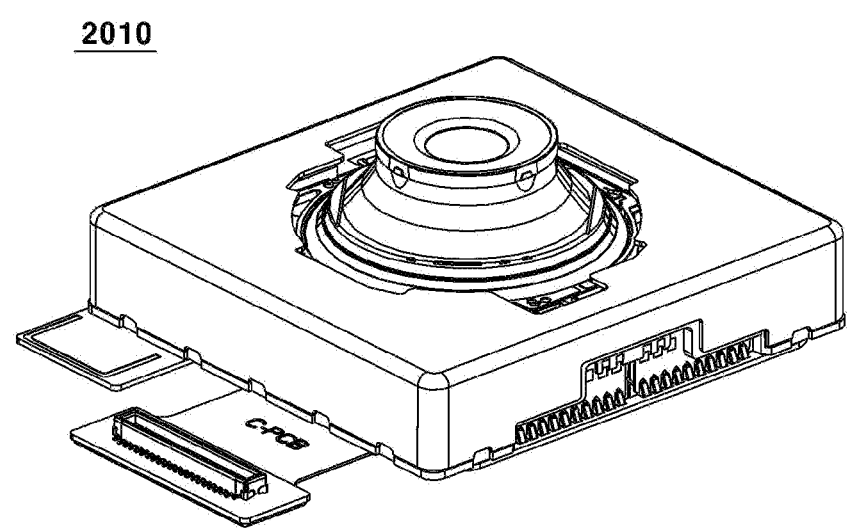
FIG. 51 is a perspective view of a camera device according to a third embodiment of the present invention.
Figure 52:
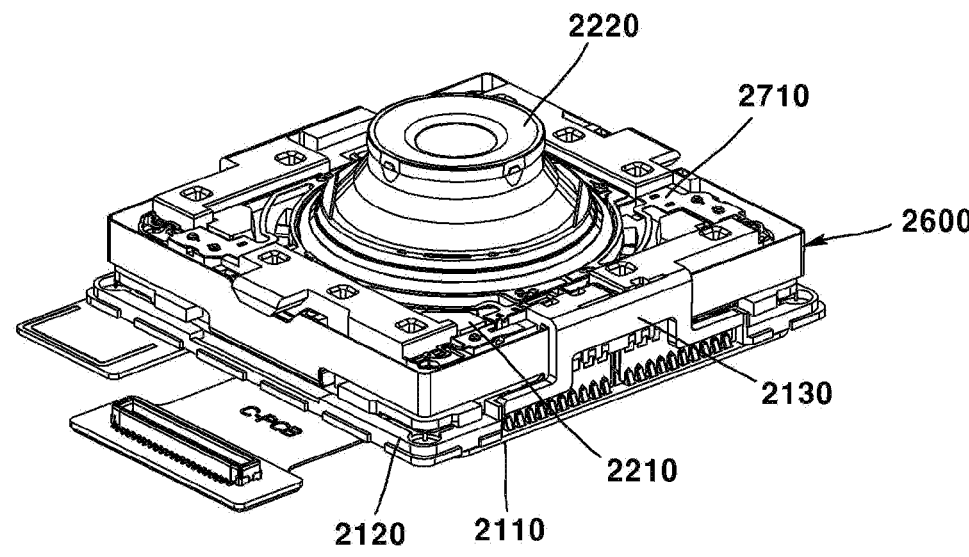
FIG. 52 is a perspective view illustrating a state in which a cover member is omitted from a camera device according to a third embodiment of the present invention.
Figure 53:
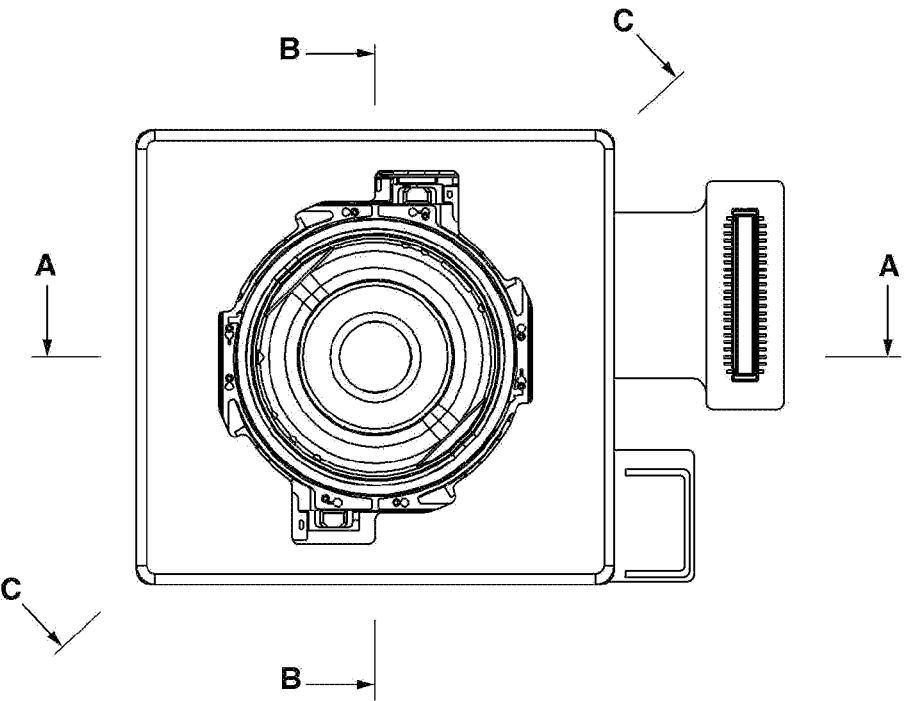
FIG. 53 is a plan view of a camera device according to a third embodiment of the present invention.
Figure 54:
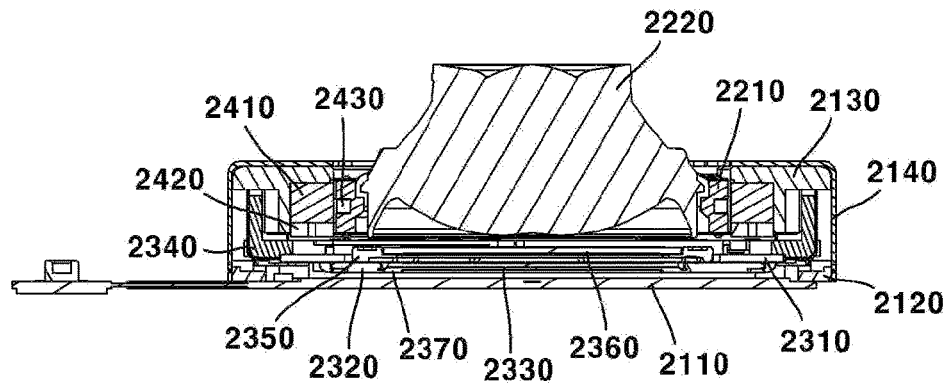
FIG. 54 is a cross-sectional view taken along line A-A of FIG. 53.
Figure 55:
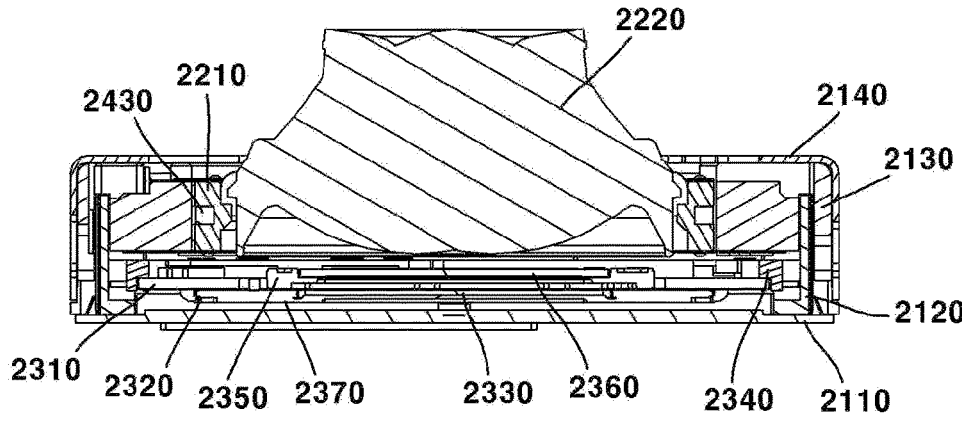
FIG. 55 is a cross-sectional view taken along line B-B of FIG. 53.
Figure 56:
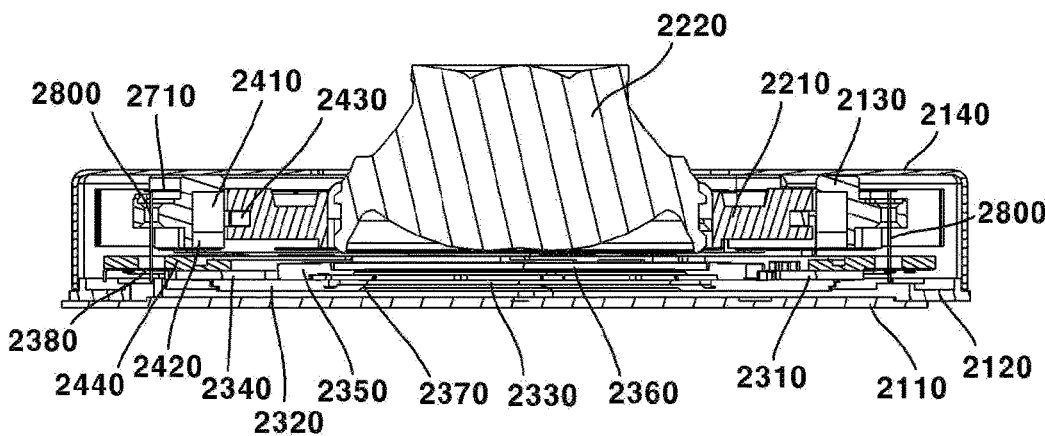
FIG. 56 is a cross-sectional view taken along line C-C of FIG. 53.
Figure 57:
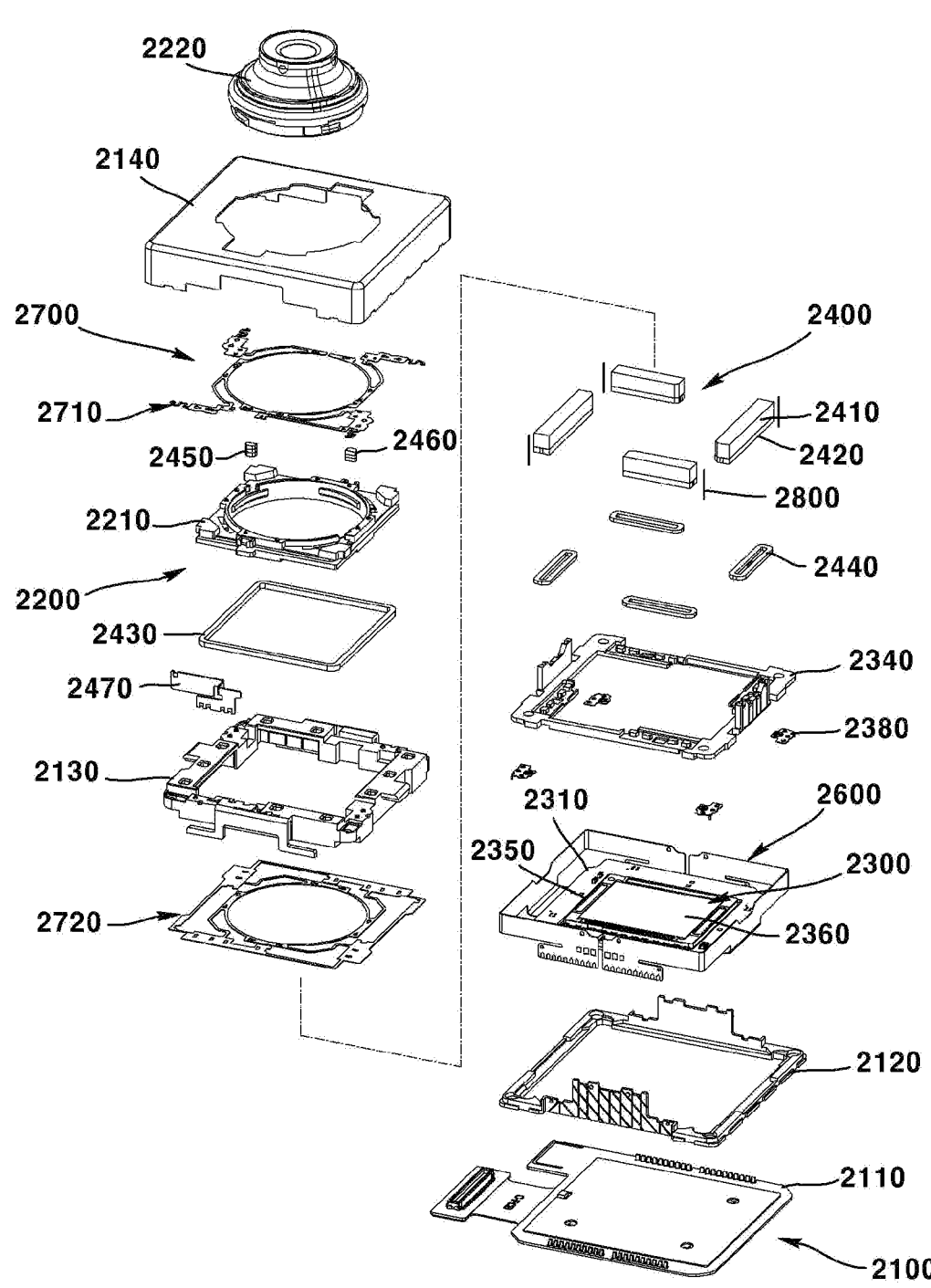
FIG. 57 is an exploded perspective view of a camera device according to a third embodiment of the present invention.
Figure 58:
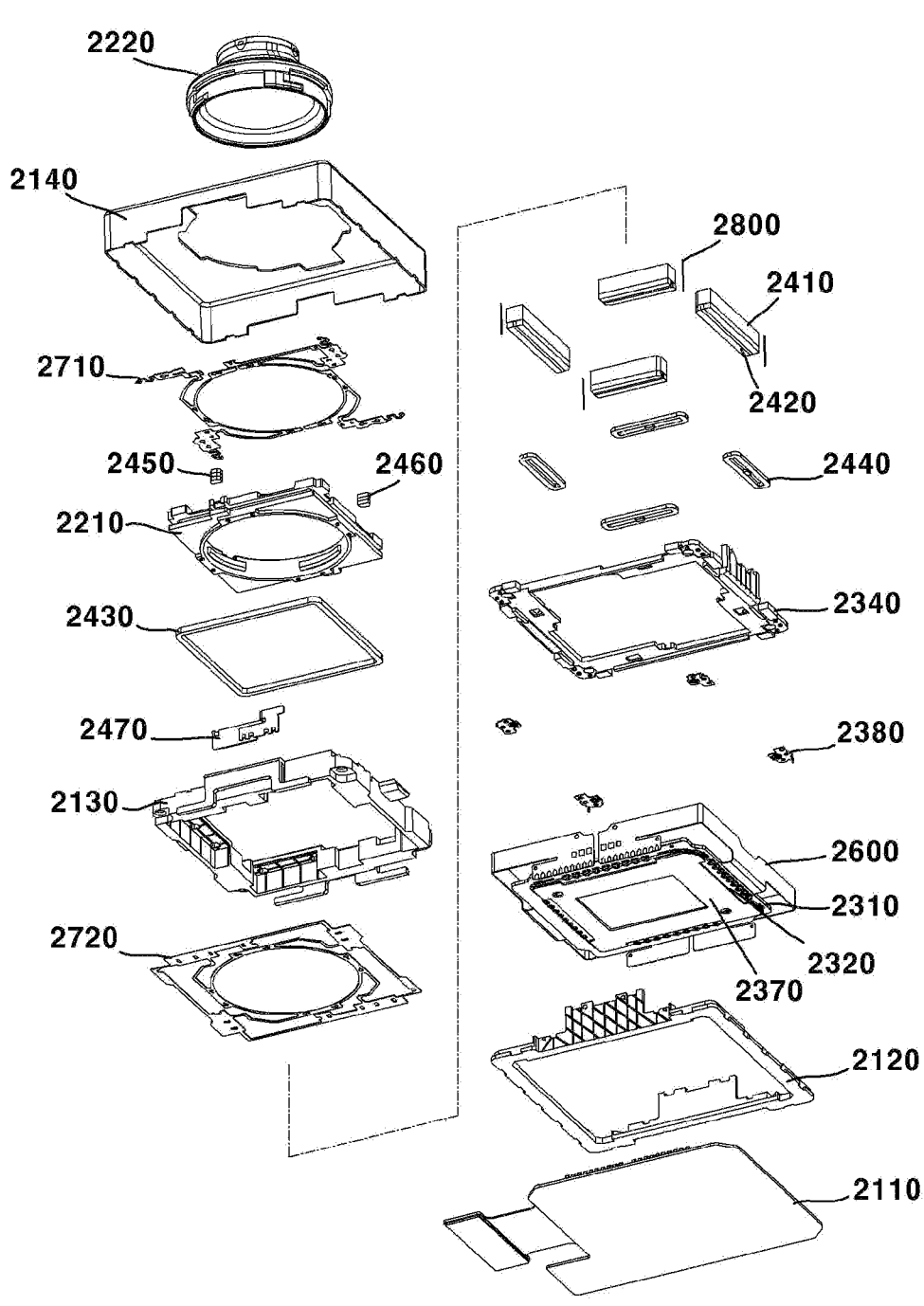
FIG. 58 is an exploded perspective view of a camera device according to a third embodiment of the present invention as viewed from a different direction from that of FIG.
Figure 59:
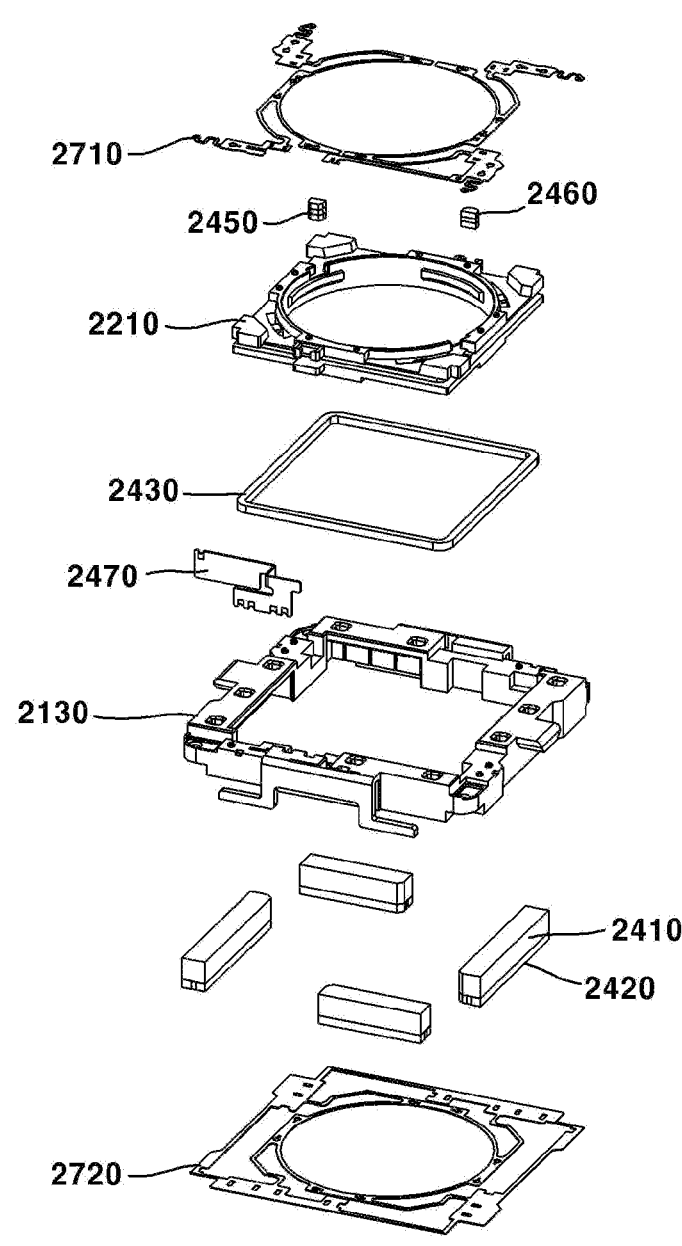
FIG. 59 is an exploded perspective view of a first moving part and related components of a camera device according to a third embodiment of the present invention.
Figure 60:
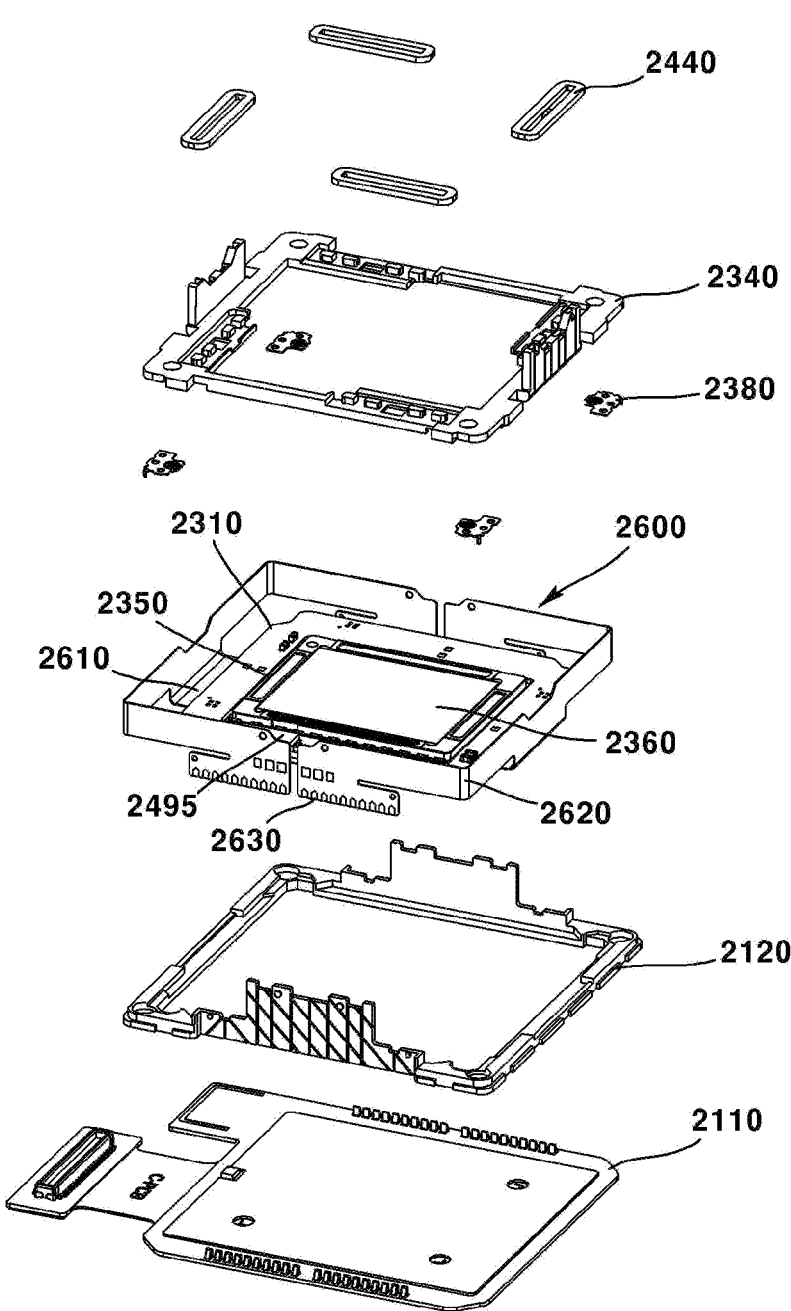
FIG. 60 is an exploded perspective view of a second moving part and related components of a camera device according to a third embodiment of the present invention.
Figure 61:
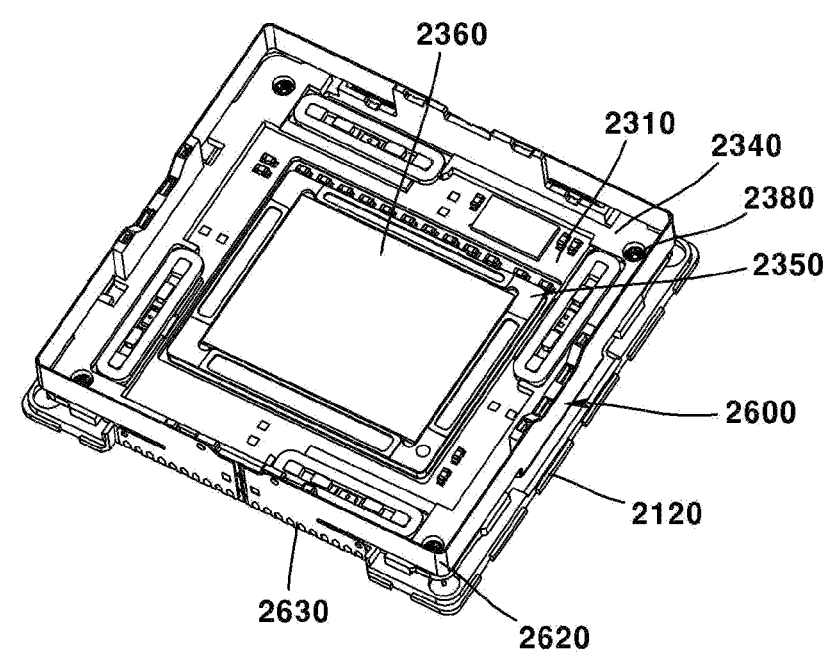
FIG. 61 is a perspective view of a second moving part, a fixed part, and a connection substrate of a camera device according to a third embodiment of the present invention.
Figure 62:
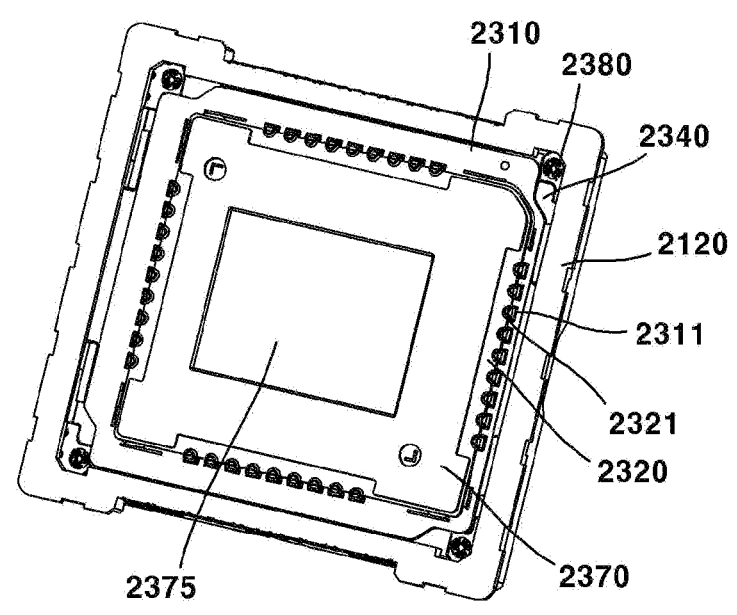
FIG. 62 is a bottom perspective view of a second moving part and a fixed part of a camera device according to a third embodiment of the present invention.
Figure 63:
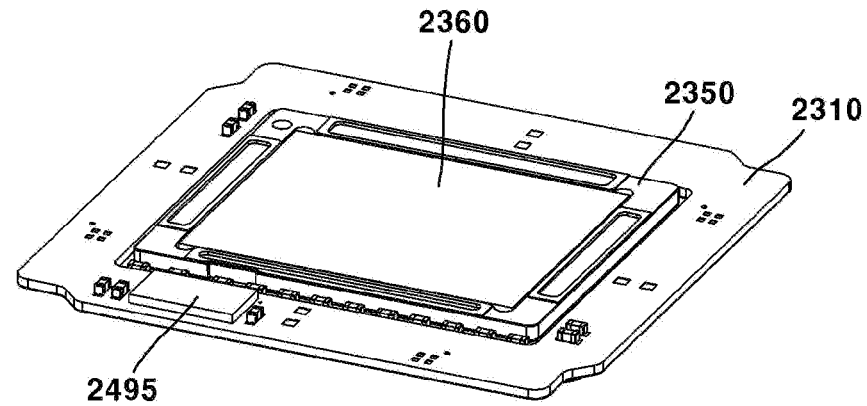
FIG. 63 is a perspective view of a partial configuration of a second moving part of a camera device according to a third embodiment of the present invention.
Figure 64:
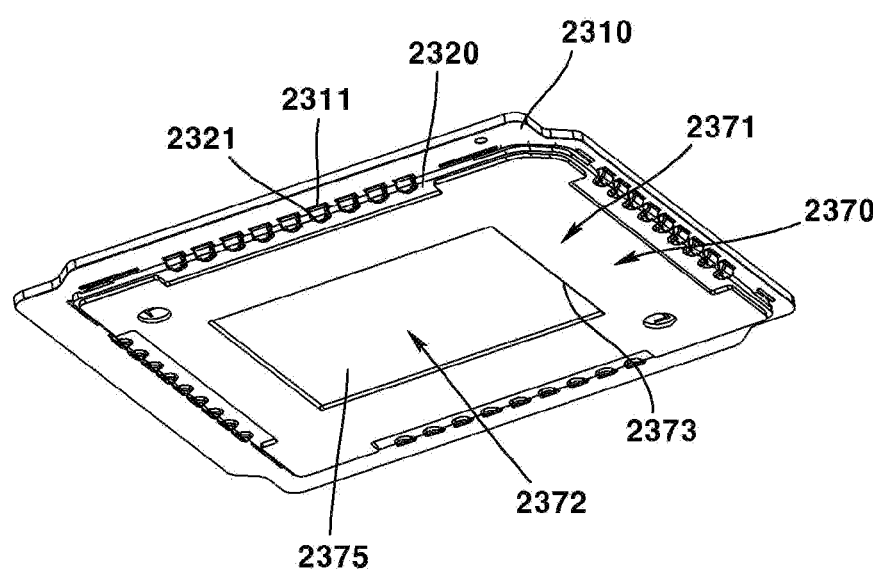
FIG. 64 is a bottom perspective view of a partial configuration of a second moving part of a camera device according to a third embodiment of the present invention.
Figure 65:
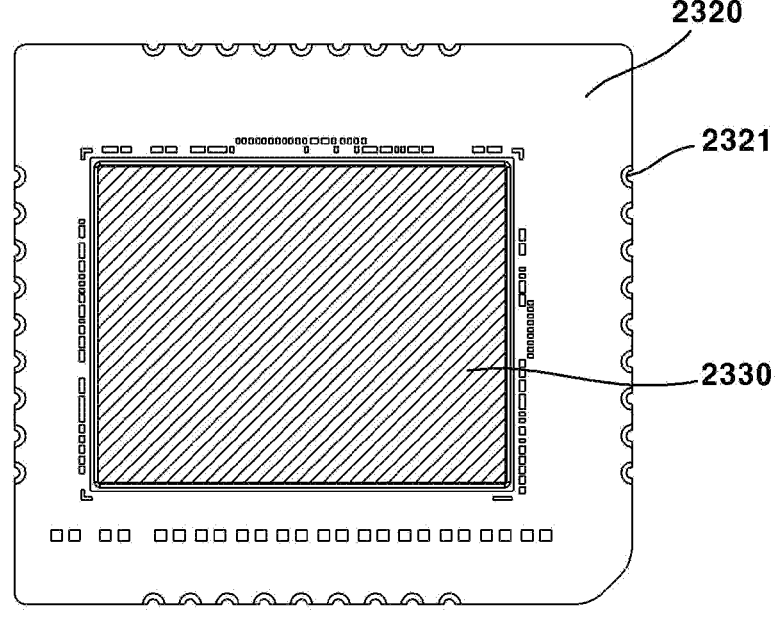
FIG. 65 is a plan view illustrating an image sensor and related configuration of a camera device according to a third embodiment of the present invention.
Figure 66:
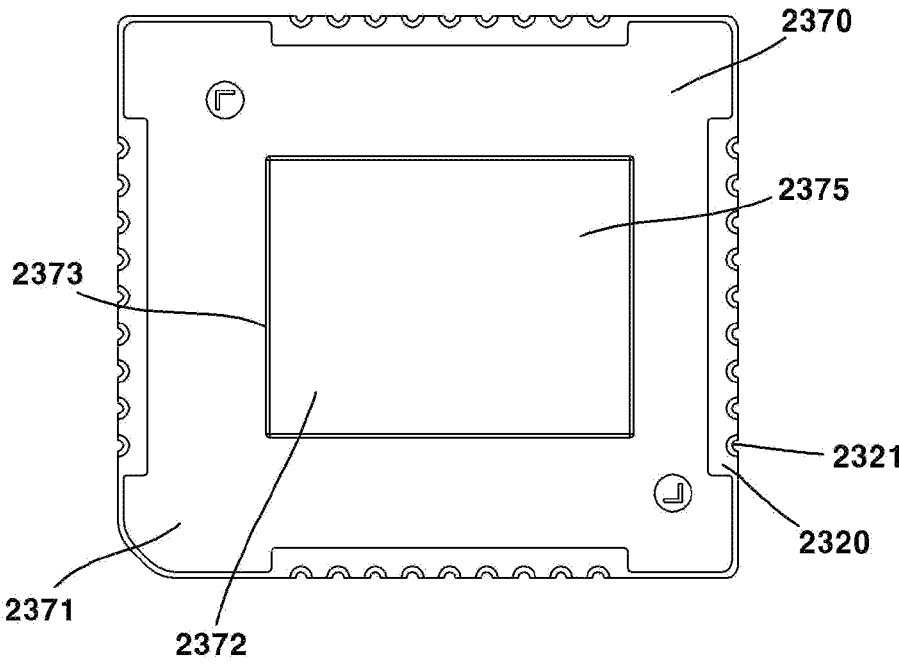
FIG. 66 is a bottom view illustrating a plate member and related configuration of a camera device according to a third embodiment of the present invention.
Figure 67A:
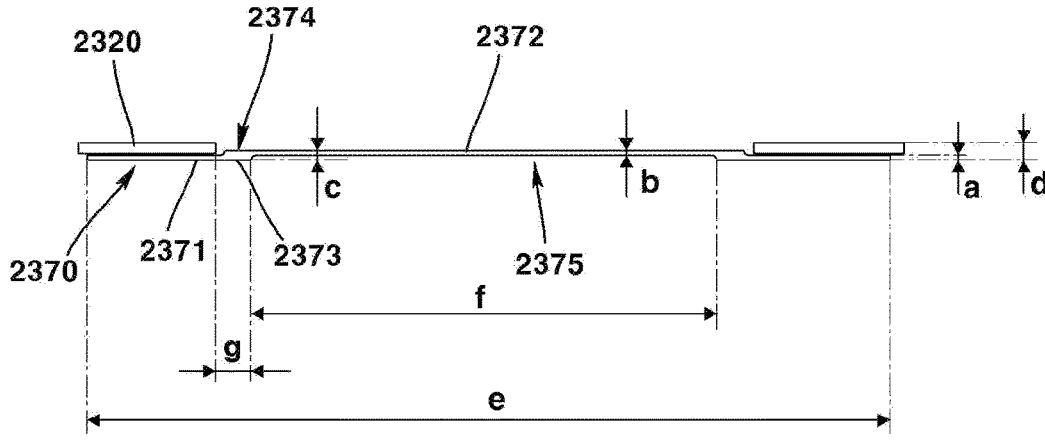
FIG. 67*a* is a cross-sectional view illustrating an image sensor, a plate member, and a sensor substrate of a camera device according to a third embodiment of the present invention.
Figure 67B:
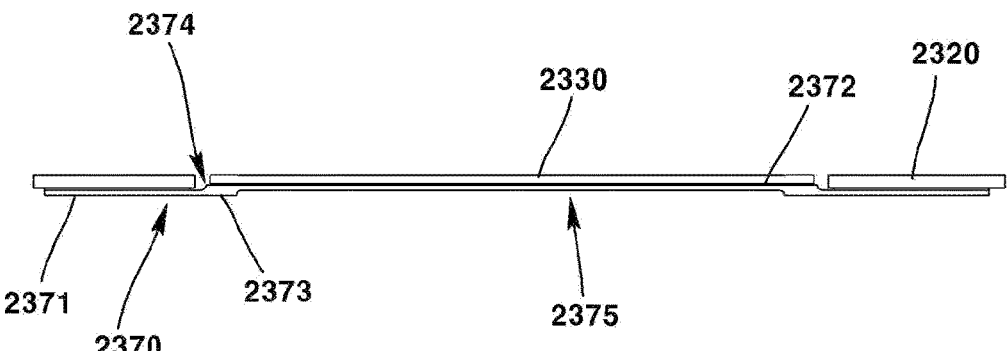
FIG. 67*b* is a cross-sectional view further illustrating an image sensor in FIG. 67*a*.
Figure 68:
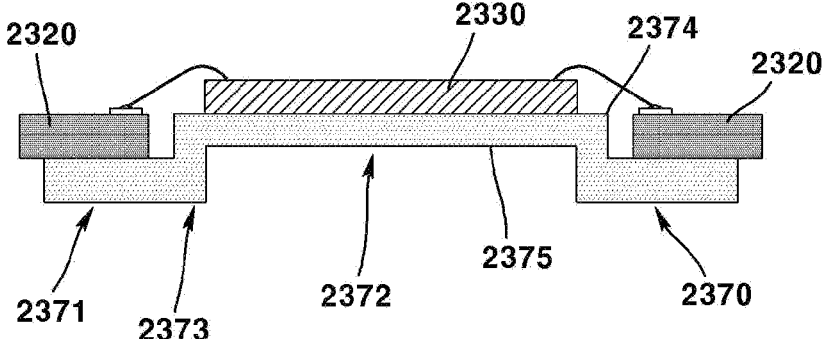
FIG. 68 is a conceptual diagram illustrating an image sensor, a plate member, and a sensor substrate of a camera device according to a third embodiment of the present invention. Since
Figure 69:
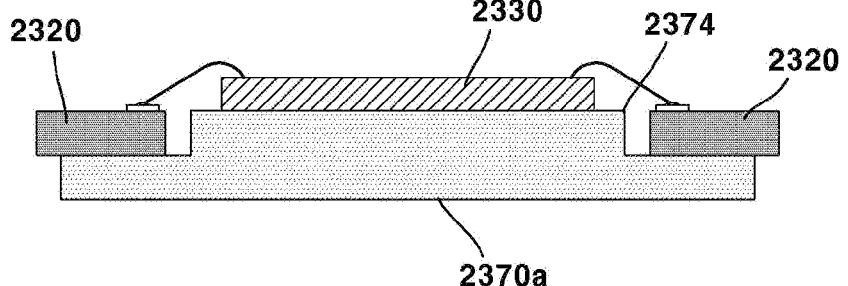
FIG. 69 is a conceptual diagram illustrating an image sensor, a plate member, and a sensor substrate of a camera device according to a modified embodiment.
Figure 70:
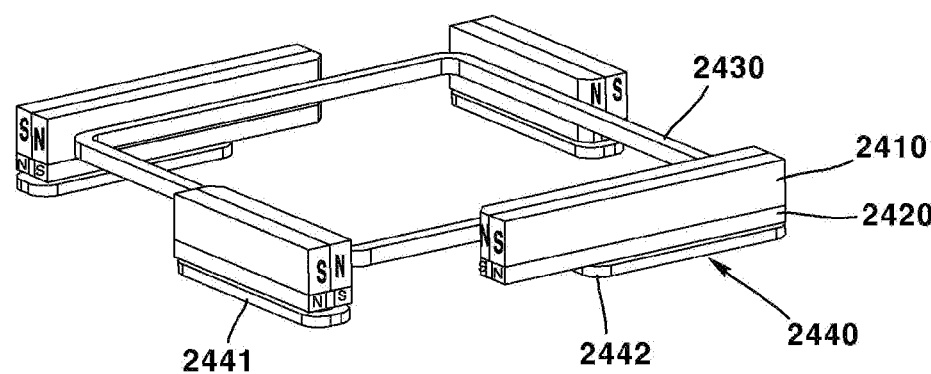
FIG. 70 is a perspective view illustrating a magnet and a coil of a camera device according to a third embodiment of the present invention.

FIG. 51 is a perspective view of a camera device according to a third embodiment of the present invention; FIG. 52 is a perspective view illustrating a state in which a cover member is omitted from a camera device according to a third embodiment of the present invention; FIG. 53 is a plan view of a camera device according to a third embodiment of the present invention; FIG. 54 is a cross-sectional view taken along line A-A of FIG. 53; FIG. 55 is a cross-sectional view taken along line B-B of FIG. 53; FIG. 56 is a cross-sectional view taken along line C-C of FIG. 53; FIG. 57 is an exploded perspective view of a camera device according to a third embodiment of the present invention; FIG. 58 is an exploded perspective view of a camera device according to a third embodiment of the present invention as viewed from a different direction from that of FIG. 57; FIG. 59 is an exploded perspective view of a first moving part and related components of a camera device according to a third embodiment of the present invention; FIG. 60 is an exploded perspective view of a second moving part and related components of a camera device according to a third embodiment of the present invention; FIG. 61 is a perspective view of a second moving part, a fixed part, and a connection substrate of a camera device according to a third embodiment of the present invention; FIG. 62 is a bottom perspective view of a second moving part and a fixed part of a camera device according to a third embodiment of the present invention; FIG. 63 is a perspective view of a partial configuration of a second moving part of a camera device according to a third embodiment of the present invention; FIG. 64 is a bottom perspective view of a partial configuration of a second moving part of a camera device according to a third embodiment of the present invention; FIG. 65 is a plan view illustrating an image sensor and related configuration of a camera device according to a third embodiment of the present invention; FIG. 66 is a bottom view illustrating a plate member and related configuration of a camera device according to a third embodiment of the present invention; FIG. 67a is a cross-sectional view illustrating an image sensor, a plate member, and a sensor substrate of a camera device according to a third embodiment of the present invention; FIG. 67b is a cross-sectional view further illustrating an image sensor in FIG. 67a; FIG. 68 is a conceptual diagram illustrating an image sensor, a plate member, and a sensor substrate of a camera device according to a third embodiment of the present invention; FIG. 69 is a conceptual diagram illustrating an image sensor, a plate member, and a sensor substrate of a camera device according to a modified embodiment; and FIG. 70 is a perspective view illustrating a magnet and a coil of a camera device according to a third embodiment of the present invention.

The camera device 2010 may photograph any one or more of a video and an image. The camera device 2010 may be a camera. The camera device 2010 may be a camera module. The camera device 2010 may be a camera assembly. The camera device 2010 may be a camera unit. The camera device 2010 may comprise a lens driving device. The camera device 2010 may comprise a sensor driving device. The camera device 2010 may comprise a voice coil motor (VCM). The camera device 2010 may comprise an auto focus assembly. The camera device 2010 may comprise a handshake correction assembly. The camera device 2010 may comprise an auto focus device. The camera device 2010 may comprise a handshake correction device. The camera device 2010 may comprise an actuator. The camera device 2010 may comprise a lens driving actuator. The camera device 2010 may comprise a sensor driving actuator. The camera device 2010 may comprise an auto focus actuator. The camera device 2010 may comprise a handshake correction actuator.

The camera device 2010 may comprise a fixed part 2100. The fixed part 2100 may be a portion being relatively fixed when the moving parts 2200 and 2300 move. The fixed part 2100 may be a portion being relatively fixed when at least one of the first moving part 2200 and the second moving part 2300 moves. The fixed part 2100 may accommodate the first moving part 2200 and the second moving part 2300. The fixed part 2100 may be disposed at an outer side of the first moving part 2200 and the second moving part 2300.

Although the first substrate 2110 has been described as one configuration of the fixed part 2100 throughout the specification, the first substrate 2110 may be understood as a separate configuration from the fixed part 2100. The fixed part 2100 may be disposed in the first substrate 2110. The fixed part 2100 may be disposed on the first substrate 2110. The fixed part 2100 may be disposed above the first substrate 2110.

The camera device 2010 may comprise a first substrate 2110. The fixed part 2100 may comprise a first substrate 2110. The first substrate 2110 may be a main substrate. The first substrate 2110 may be a substrate. The first substrate 2110 may be a printed circuit board (PCB). The first substrate 2110 may be connected to a power source of the optical apparatus 2001. The first substrate 2110 may comprise a connector connected to the power source of the optical apparatus 2001.

The camera device 2010 may comprise a base 2120. The fixed part 2100 may comprise a base 2120. The base 2120 may be disposed in the first substrate 2110. The base 2120 may be disposed on the first substrate 2110. The base 2120 may be disposed above the first substrate 2110. The base 2120 may be fixed to the first substrate 2110. The base 2120 may be coupled to the first substrate 2110. The base 2120 may be attached to the first substrate 2110 by an adhesive. The base 2120 may be disposed between the first substrate 2110 and the housing 2130.

The camera device 2010 may comprise a housing 2130. The fixed part 2100 may comprise a housing 2130. The housing 2130 may be disposed in the base 2120. The housing 2130 may be disposed on the base 2120. The housing 2130 may be disposed above the base 2120. The housing 2130 may be fixed to the base 2120. The housing 2130 may be coupled to the base 2120. The housing 2130 may be attached to the base 2120 by an adhesive. The housing 2130 may be disposed on the first substrate 2110. The housing 2130 may be disposed above the first substrate 2110. The housing 2130 may be formed of a member separate from the base 2120.

The camera device 2010 may comprise a cover member 2140. The fixed part 2100 may comprise a cover member 2140. The cover member 2140 may be coupled to the base 2120. The cover member 2140 may be coupled to the housing 2130. The cover member 2140 may be coupled to the first substrate 2110. The cover member 2140 may be fixed to the base 2120. The cover member 2140 may be fixed to the housing 2130. The cover member 1140 may be fixed to the first substrate 2110. The cover member 2140 may cover at least a portion of the base 2120. The cover member 2140 may cover at least a portion of the housing 2130.

The cover member 2140 may be a 'cover can' or a 'shield can'. The cover member 2140 may be formed of a metal material. The cover member 2140 may block electromagnetic interference (EMI). The cover member 2140 may be electrically connected to the first substrate 2110. The cover member 2140 may be grounded to the first substrate 2110.

The cover member 2140 may comprise an upper plate. The cover member 2140 may comprise a hole formed in the upper plate. The hole may be formed at a position corresponding to the lens 2220. The cover member 2140 may comprise a side plate. The side plate may comprise a plurality of side plates. The side plate may comprise 4 side plates. The side plate may comprise first to fourth side plates. The side plate may comprise first and second side plates being disposed opposite to each other, and third and fourth side plates being disposed opposite to each other. The cover member 2140 may comprise a plurality of corners between the plurality of side plates.

Although the cover member 2140 has been described as one configuration of the fixed part 2100 throughout the specification, the cover member 2140 may be understood as a configuration separate from the fixed part 2100. The cover member 2140 may be coupled to the fixed part 2100. The cover member 2140 may cover the first moving part 2200.

The camera device 2010 may comprise a first moving part 2200. The first moving part 2200 may move against the fixed part 2100. The first moving part 2200 may move in an optical axis direction with respect to the fixed part 2100. The first moving part 2200 may be disposed inside the fixed part 2100. The first moving part 2200 may be movably disposed inside the fixed part 2100. The first moving part 2200 may be movably disposed inside the fixed part 2100 in an optical axis direction. An auto focus (AF) function may be performed by moving the first moving part 2200 in an optical axis direction against the fixed part 2100. The first moving part 2200 may be disposed on the second moving part 2300.

The camera device 2010 may comprise a bobbin 2210. The first moving part 2200 may comprise a bobbin 2210. The bobbin 2210 may be disposed on the first substrate 2110. The bobbin 2210 may be disposed above the first substrate 2110. The bobbin 2210 may be disposed to be spaced apart from the first substrate 2110. The bobbin 2210 may be disposed inside the housing 2130. The bobbin 2210 may be disposed at an inner side of the housing 2130. At least a portion of the bobbin 2210 may be accommodated in the housing 2130. The bobbin 2210 may be movably disposed in the housing 2130. The bobbin 2210 may be movably disposed in the housing 2130 in an optical axis direction. The bobbin 2210 may be coupled to the lens 2220. The bobbin 2210 may comprise a hollow or a hole. The lens 2220 may be disposed in a hollow or hole of the bobbin 2210. An outer circumferential surface of the lens 2220 may be coupled to an inner circumferential surface of the bobbin 1210.

The camera device 2010 may comprise a lens 2220. The first moving part 2200 may comprise a lens 2220. The lens 2220 may be coupled to the bobbin 2210. The lens 2220 may be fixed to the bobbin 2210. The lens 2220 may move integrally with the bobbin 2210. The lens 2220 may be screw-coupled to the bobbin 2210. The lens 2220 may be attached to the bobbin 2210 by an adhesive. The lens 2220 may be disposed at a position corresponding to the image sensor 2330. The optical axis of the lens 2220 may coincide with the optical axis of the image sensor 2330. The optical axis may be the z-axis. The lens 2220 may comprise a plurality of lenses. The lens 2220 may comprise a 5-element or 6-element lens.

The camera device 2010 may comprise a lens module. The lens module may be coupled to the bobbin 2210. The lens module may comprise a barrel and one or more lenses 2220 disposed inside the barrel.

The camera device 2010 may comprise a second moving part 2300. The second moving part 2300 may move against the fixed part 2100. The second moving part 2300 may move in a direction perpendicular to the optical axis direction with respect to the fixed part 2100. The second moving part 2300 may be disposed inside the fixed part 2100. The second moving part 2300 may be movably disposed inside the fixed part 2100. The second moving part 2300 may be movably disposed in the fixed part 2100 in a direction perpendicular to the optical axis direction. A handshake correction (OIS) function may be performed by moving the second moving part 2300 in a direction perpendicular to the optical axis direction with respect to the fixed part 2100. The second moving part 2300 may be disposed between the first moving part 2200 and the first substrate 2110.

The camera device 2010 may comprise a second substrate 2310. The second moving part 2300 may comprise a second substrate 2310. The second substrate 2310 may be a substrate. The second substrate 2310 may be a printed circuit board (PCB). The second substrate 2310 may be disposed between the first moving part 2200 and the first substrate 2110. The second substrate 2310 may be disposed between the bobbin 2210 and the first substrate 2110. The second substrate 2310 may be disposed between the lens 2220 and the first substrate 2110. The second substrate 2310 may be spaced apart from the fixed part 2100. The second substrate 2310 may be spaced apart from the fixed part 2100 in an optical axis direction and a direction perpendicular to the optical axis direction. The second substrate 2310 may move in a direction perpendicular to the optical axis direction. The second substrate 2310 may be electrically connected to the image sensor 2330. The second substrate 2310 may move integrally with the image sensor 2330. The second substrate 2310 may comprise a hole. An image sensor 2330 may be disposed in a hole of the second substrate 2310. The second substrate 2310 may be coupled to an upper surface of the sensor substrate 2320. The second substrate 2310 may be disposed on an upper surface of the sensor substrate 2320. The second substrate 2310 may be fixed to an upper surface of the sensor substrate 2320.

The second substrate 2310 may comprise a terminal 2311. The terminal 2311 may be disposed on a lower surface of the second substrate 2310. The terminal 2311 may be coupled to the terminal 2321 of the sensor substrate 2320. The second substrate 2310 may be formed separately from the sensor substrate 2320. The second substrate 2310 may be formed separately from the sensor substrate 2320 to be coupled thereto. The terminal 2321 of the sensor substrate 2320 may be soldered to the terminal 2311 of the second substrate 2310.

The camera device 2010 may comprise a sensor substrate 2320. The second moving part 2300 may comprise a sensor substrate 2320. The sensor substrate 2320 may be a substrate. The sensor substrate 2320 may be a printed circuit board (PCB). The sensor substrate 2320 may be coupled to the image sensor 2330. The sensor substrate 2320 may be coupled to the second substrate 2310.

The sensor substrate 2320 may comprise a hole. The hole may be hollow. An image sensor 2330 may be disposed in a hole of the sensor substrate 2320. A portion of the plate member 2370 may be disposed in the hole of the sensor substrate 2320. The protruded part 2374 of the plate member 2370 may be disposed in the hole of the sensor substrate 2320. The hole of the sensor substrate 2320 may be formed in a size and shape corresponding to the protruded part 2374 of the plate member 2370. The size of the hole may be larger than the size of the groove 2375 of the plate member 2370. The size of the hole may be larger than the size of the groove 2375 of the plate member 2370 on a cross section perpendicular to the optical axis direction. The area of the upper surface of the protruded part 2374 may be larger than the area of the bottom surface of the groove 2375.

The sensor substrate 2320 may comprise a terminal 2321. The terminal 2321 of the sensor substrate 2320 may be coupled to the terminal 2311 of the second substrate 2310. The sensor substrate 2320 may be coupled to a lower surface of the second substrate 2310. The sensor substrate 2320 may be disposed below the second substrate 2310. The sensor substrate 2320 may be coupled below the second substrate 2310 in a state being coupled with the image sensor 2330.

The camera device 2010 may comprise an image sensor 2330. The second moving part 2300 may comprise an image sensor 2330. The image sensor 2330 may be disposed in the sensor substrate 2320. The image sensor 2330 may be disposed between the sensor substrate 2320 and the sensor holder 2350. The image sensor 2330 may be electrically connected to the second substrate 2310. The image sensor 2330 may move integrally with the second substrate 2310. The image sensor 2330 may be disposed below the lens 2220. The image sensor 2330 may be disposed in the plate member 2370 and may be electrically connected to the sensor substrate 2320 through wire bonding.

An image may be formed when light passing through the lens 2220 and the filter 2360 is incident on the image sensor 2330. The image sensor 2330 may be electrically connected to the sensor substrate 2320, the second substrate 2310, and the first substrate 2110. The image sensor 2330 may comprise an effective image area. The image sensor 2330 may convert light irradiated to the effective image area into an electrical signal. The image sensor 2330 may comprise any one or more of a charge coupled device (CCD), a metal oxide semi-conductor (MOS), a CPD, and a CID.

The camera device 2010 may comprise a holder 2340. The second moving part 2300 may comprise a holder 2340. The holder 2340 may be formed of an insulating material. The holder 2340 may be disposed in the second substrate 2310. The holder 2340 may be disposed on the second substrate 2310. The holder 2340 may be disposed above the second substrate 2310. The holder 2340 may be fixed to the second substrate 2310. The holder 2340 may be coupled to the second substrate 2310. The holder 2340 may comprise a hollow or a hole in which the image sensor 2330 is disposed. A second coil 2440 may be disposed in the holder 2340. The holder 2340 may comprise a protrusion on which the second coil 2440 is wound. The holder 2340 may comprise a hole in which the Hall sensor 2445 is disposed.

The camera device 2010 may comprise a sensor base 2350. The second moving part 2300 may comprise a sensor base 2350. The sensor base 2350 may be disposed in the sensor substrate 2320. The sensor base 2350 may comprise a hole formed at a position corresponding to the image sensor 2330. The sensor base 2350 may comprise a groove in which the filter 2360 is disposed.

The camera device 2010 may comprise a filter 2360. The second moving part 2300 may comprise a filter 2360. The filter 2360 may be disposed between the lens 2220 and the image sensor 2330. The filter 1360 may be disposed in the sensor base 2350. The filter 2360 may block light having a specific frequency band from being incident on the image sensor 2330 from the light passing through the lens 2220. The filter 2360 may comprise an infrared cut filter. The filter 2360 may block infrared rays from being incident on the image sensor 2330.

The camera device 2010 may comprise a plate member 2370. The second moving part 2300 may comprise a plate member 2370. The plate member 2370 may be a SUS. The plate member 2370 may be formed of a SUS. The plate member 2370 may be formed of a copper alloy. The plate member 2370 may comprise copper. The plate member 2370 may be a reinforcing plate. The plate member 2370 may be a stiffener. The plate member 2370 may be coupled to a lower surface of the sensor substrate 2320. The plate member 2370 may be disposed on a lower surface of the sensor substrate 2320. The plate member 2370 may be in contact with the lower surface of the sensor substrate 2320. The plate member 2370 may be fixed to a lower surface of the sensor substrate 2320. The plate member 2370 may be attached to a lower surface of the sensor substrate 2320 by an adhesive.

In a third embodiment of the present invention, the image sensor 2330 may be directly disposed in the plate member 2370. Meanwhile, the plate member 2370 may be easier to manage flatness than the sensor substrate 2320. Through this, it is possible to easily manage the flatness of the mounting surface of the image sensor 2330. The image sensor 2330 may be electrically connected to the sensor substrate 2320 through wire bonding. The image sensor 2330 may be electrically connected to the sensor substrate 2320.

The plate member 2370 may comprise a protruded part 2374. The protruded part 2374 may be protruded from an upper surface of the plate member 2370. At least a portion of the protruded part 2374 may be disposed in a hole of the sensor substrate 2320. The protruded part 2374 of the plate member 2370 may be overlapped with the sensor substrate 2320 in a direction perpendicular to the optical axis direction. The image sensor 2330 may be disposed in the protruded part 2374 of the plate member 2370. The image sensor 2330 may be disposed on the protruded part 2374 of the plate member 2370. The image sensor 2330 may be in contact with the protruded part 2374 of the plate member 2370. The image sensor 2330 may be fixed to the protruded part 2374 of the plate member 2370. The image sensor 2330 may be attached to the protruded part 2374 of the plate member 2370 by an adhesive. As a modified embodiment, the protruded part 2374 in the plate member 2370 is omitted and only the groove 2375 may be formed.

The plate member 2370 may comprise a groove 2375. The groove 2375 may be formed at a position corresponding to the protruded part 2374. The groove 2375 may be concavely formed in a lower surface of the plate member 2370. The groove 2375 may be formed through etching. In a third embodiment of the present invention, as the groove 2375 is formed in the plate member 2370, the weight of the plate member 2370 can be reduced. As an example, the weight of the plate member 2370 may be reduced by 15% to 25% by the groove 2375. The weight of the plate member 2370 may be reduced by 10% to 30% by the groove 2375.

The plate member 2370 may comprise a support region. The support region may be coupled to the sensor substrate 2320. The support region may be a support part. The support region may be disposed at an outer side of the protruded part 2374. The support region may form an edge. The protruded part 2374 may be protruded from the support region. The thickness of the protruded part 2374 may be smaller than the thickness of the sensor substrate 2320. At this time, the thickness of the protruded part 2374 may be a thickness from the upper surface of the support region to the upper surface of the protruded part 2374. That is, the thickness from the upper surface of the support region to the upper surface of the protruded part 1374 may be smaller than the thickness of the sensor substrate 2320.

The plate member 2370 may comprise a first portion 2371 that is an outer side of the protruded part 2374. The plate member 2370 may comprise a second portion 2372 in which a groove 2375 is formed. The plate member 2370 may comprise a third portion 2373 connecting the first portion 2371 and the second portion 2372.

In the optical axis direction, the thickness of the third portion 2373 (refer to c in FIG. 67a) may be thicker than the thickness of the first portion 2371 (refer to a in FIG. 67a). In the optical axis direction, the thickness c of the third portion 2373 may be thicker than the thickness of the second portion 2372 (refer to b in FIG. 67a). In the optical axis direction, the thickness a of the first portion 2371 may be the same as the thickness b of the second portion 2372. In a modified embodiment, in the optical axis direction, the thickness of the first portion 2371 may be different from the thickness of the second portion 2372.

In the optical axis direction, the thickness of the third portion 2373 may be 1.8 times to 2.2 times the thickness of the first portion 2371. In the optical axis direction, the thickness of the third portion 2373 may be 1.5 to 2.5 times the thickness of the first portion 2371. In the optical axis direction, the thickness of the third portion 2373 may be 1.8 times to 2.2 times the thickness of the second portion 2372. In the optical axis direction, the thickness of the third portion 2373 may be 1.5 to 2.5 times the thickness of the second portion 2372.

The upper end of the second portion 2372 may be disposed lower than the center of the sensor substrate 2320 in the optical axis direction. As a modified embodiment, the upper end of the second portion 2372 may be disposed at a height corresponding to the center of the sensor substrate 2320 in the optical axis direction. In another modified embodiment, the upper end of the second portion 2372 may be disposed higher than the center of the sensor substrate 2320 in the optical axis direction.

In the optical axis direction, the thickness of the plate member 2370 may be thinner than the thickness of the sensor substrate 2320. However, as a modified embodiment, the thickness of the plate member 2370 in one portion is the same as the thickness of the sensor substrate 2320 or may be thicker than the sensor substrate 2320.

In a third embodiment of the present invention, the thickness a of the first portion 2371 of the plate member 2370 in the optical axis direction may be 0.09 mm to 0.11 mm. The thickness a of the first portion 2371 of the plate member 2370 in the optical axis direction may be 0.08 mm to 0.12 mm. The thickness a of the first portion 2371 of the plate member 2370 in the optical axis direction may be 0.05 mm to 0.15 mm. The thickness b of the second portion 2372 of the plate member 2370 in the optical axis direction may be 0.09 mm to 0.11 mm. The thickness b of the second portion 2372 of the plate member 2370 in the optical axis direction may be 0.08 mm to 0.12 mm. The thickness b of the second portion 2372 of the plate member 2370 in the optical axis direction may be 0.05 mm to 0.15 mm.

The thickness a of the third portion 2373 of the plate member 2370 in the optical axis direction may be 0.19 mm to 0.21 mm. The thickness a of the third portion 2373 of the plate member 2370 in the optical axis direction may be 0.18 mm to 0.22 mm. The thickness a of the third portion 2373 of the plate member 2370 in the optical axis direction may be 0.15 mm to 0.25 mm. The sum of the thicknesses of the first portion 2371 of the plate member 2370 and the sensor substrate 2320 in the optical axis direction (refer to d in FIG. 67a) may be 0.36 mm to 0.38 mm. The sum of the thicknesses of the first portion 2371 of the plate member 2370 and the sensor substrate 2320 in the optical axis direction (refer to d in FIG. 67a) may be 0.35 mm to 0.39 mm. The sum of the thicknesses of the first portion 2371 of the plate member 2370 and the sensor substrate 2320 in the optical axis direction (refer to d in FIG. 67a) may be 0.32 mm to 0.42 mm.

The width of the groove 2375 of the plate member 2370 (refer to f in FIG. 67a) may be 40 to 70% of the entire width of the plate member 2370 (refer to e in FIG. 67a). The width f of the groove 2375 of the plate member 2370 may be 50 to 60% of the total width e of the plate member 2370. The width of the third portion 2373 of the plate member 2370 (refer to g in FIG. 67a) may be 1 to 3 times greater than the thickness c of the third portion 2373 of the plate member 2370. The width g of the third portion 2373 of the plate member 2370 may be 1.5 to 2.5 times greater than the thickness c of the third portion 2373 of the plate member 2370. At this time, the thickness may be the length in the optical axis direction, and the width may be the length in a direction perpendicular to the optical axis direction.

In the case of a third embodiment of the present invention, the plate member 2370 may comprise a first portion 2371 and a third portion 2373 having a thickness greater than that of the second portion 2372. Through this, the strength of the plate member 2370 may be increased. Accordingly, the occurrence of warpage in the plate member 2370 may be minimized. In other words, when compared with the comparative example, which is a plate in the shape of a planar plate, having the same thickness as the first portion 2371, the occurrence of warpage in the plate member 2370 of a third embodiment of the present invention can be minimized. If a plate in the shape of a planar plate is used to achieve the same rigidity as in the third embodiment of the present invention, a thicker plate must be used, and in this case, the weight may be increased.

The upper surface of the image sensor 2330 being disposed in the plate member 2370 may be disposed at the same height as the upper surface of the sensor substrate 2320. The thickness of the image sensor 2330 may be thinner than the thickness of the sensor substrate 2320. The height of the seating surface of the image sensor 2330 of the plate member 2370 may be lower than the height of the upper surface of the sensor substrate 2320.

As shown in FIG. 69, in a modified embodiment of the present invention, the groove 2375 of the plate member 2370 may be omitted. When the groove 2375 of the plate member 2370 is omitted, the weight may increase compared to a third embodiment of the present invention. However, as compared with a third embodiment of the present invention, the strength is high, so that the occurrence of warpage can be minimized.

The camera device 2010 may comprise a terminal 2380. The second moving part 2300 may comprise a terminal 2380. The terminal 2380 may be disposed in the holder 2340. The terminal 2380 may be coupled to a wire 2800. The terminal 2380 may be connected to the wire 2800 through solder. The terminal 2380 may be formed of a metal. The terminal 2380 may comprise a hole through which the wire 2800 passes. The terminal 2380 may comprise a buffer for shock mitigation. The terminal 2380 may have a shape bent a plurality of times. The terminal 2380 may comprise a plurality of terminals. The terminal 2380 may comprise four terminals being disposed in four corner regions of the holder 2340.

The camera device 2010 may comprise a driving unit. The driving unit may move the moving parts 2200 and 2300 against the fixed part 2100. The driving unit may perform an auto focus (AF) function. The driving unit may perform a handshake correction (OIS) function. The driving unit may move the lens 2220. The driving unit may move the image sensor 2330. The driving unit may comprise a magnet and a coil. The driving unit may comprise a shape memory alloy (SMA).

The camera device 2010 may comprise a first driving unit. The first driving unit may be an AF driving unit. The first driving unit may move the first moving part 2200 in the optical axis direction. The first driving unit may move the bobbin 2210 in the optical axis direction. The lens 2220 may be moved in the optical axis direction. The first driving unit may perform an auto focus (AF) function. The first driving unit may move the first moving part 2200 in an upward direction of the optical axis direction. The first driving unit may move the first moving part 2200 in a downward direction of the optical axis direction.

The camera device 2010 may comprise a second driving unit. The second driving unit may be an OIS driving unit. The second driving unit may move the second moving part 2300 in a direction perpendicular to the optical axis direction. The second driving unit may move the second substrate 2310 in a direction perpendicular to the optical axis direction. The second driving unit may move the sensor substrate 2320 in a direction perpendicular to the optical axis direction. The second driving unit may move the image sensor 2330 in a direction perpendicular to the optical axis direction. The second driving unit may move the holder 2340 in a direction perpendicular to the optical axis direction. The second driving unit may move the sensor holder 2350 in a direction perpendicular to the optical axis direction. The second driving unit may move the filter 2360 in a direction perpendicular to the optical axis direction. The second driving unit may perform a handshake correction (OIS) function.

The second driving unit may move the second moving part 2300 in a first direction perpendicular to the optical axis direction. The second driving unit may move the second moving part 2300 in a second direction perpendicular to the optical axis direction and the first direction. The second driving unit may rotate the second moving part 2300 about the optical axis.

In a third embodiment of the present invention, the first driving unit may comprise a first coil 2430. The second driving unit may comprise a second coil 2440. The first driving unit may comprise a first driving magnet 2410. The second driving unit may comprise a second driving magnet 2420. As a modified embodiment, the first driving unit and the second driving unit may comprise a driving magnet commonly used for interaction between the first coil 2430 and the second coil 2440. That is, the first driving unit and the second driving unit may comprise individually controlled coils and a common magnet.

The camera device 2010 may comprise a first driving magnet 2410. The driving unit may comprise a first driving magnet 2410. The first driving magnet 2410 may be a magnet. The first driving magnet 2410 may be a permanent magnet. The first driving magnet 2410 may be a common magnet. The first driving magnet 2410 may be used for auto focus (AF).

The first driving magnet 2410 may be disposed in the fixed part 2100. The first driving magnet 2410 may be fixed to the fixed part 2100. The first driving magnet 2410 may be coupled to the fixed part 2100. The first driving magnet 2410 may be attached to the fixed part 2100 by an adhesive. The first driving magnet 2410 may be disposed in the housing 2130. The first driving magnet 2410 may be fixed to the housing 2130. The first driving magnet 2410 may be coupled to the housing 2130. The first driving magnet 2410 may be attached to the housing 2130 by an adhesive. The first driving magnet 2410 may be disposed at a corner of the housing 2130. The first driving magnet 2410 may be disposed to be biased at a corner of the housing 2130.

The first driving magnet 2410 may be a two-pole magnetized magnet comprising one N-pole region and one S-pole region. As a modified embodiment, the first driving magnet 2410 may be a 4-pole magnetized magnet comprising two N-pole regions and two S-pole regions.

The first driving magnet 2410 may comprise a plurality of magnets. The first driving magnet 2410 may comprise four magnets. The first driving magnet 2410 may comprise first to fourth magnets. The first to fourth magnets may be disposed symmetrically to the optical axis. The first to fourth magnets may be formed to have the same size and shape as each other.

The camera device 2010 may comprise a second driving magnet 2420. The driving unit may comprise a second driving magnet 2420. The second driving magnet 2420 may be a magnet. The second driving magnet 2420 may be a permanent magnet. The second driving magnet 2420 may be a common magnet. The second driving magnet 2420 may be used for handshake correction (OIS).

The second driving magnet 2420 may be disposed in the fixed part 2100. The second driving magnet 2420 may be fixed to the fixed part 2100. The second driving magnet 2420 may be coupled to the fixed part 2100. The second driving magnet 2420 may be attached to the fixed part 2100 by an adhesive. The second driving magnet 2420 may be disposed in the housing 2130. The second driving magnet 2420 may be fixed to the housing 2130. The second driving magnet 2420 may be coupled to the housing 2130. The second driving magnet 2420 may be attached to the housing 2130 by an adhesive. The second driving magnet 2420 may be disposed at a corner of the housing 2130. The second driving magnet 2420 may be disposed to be biased at a corner of the housing 2130.

The second driving magnet 2420 may be a two-pole magnetized magnet comprising one N-pole region and one S-pole region. As a modified embodiment, the second driving magnet 2420 may be a 4-pole magnetized magnet comprising two N-pole regions and two S-pole regions.

The second driving magnet 2420 may comprise a plurality of magnets. The second driving magnet 2420 may comprise four magnets. The second driving magnet 2420 may comprise first to fourth magnets. The first to fourth magnets may be disposed symmetrically to the optical axis. The first to fourth magnets may be formed to have the same size and shape as each other.

The second driving magnet 2420 may be disposed below the first driving magnet 2410. The second driving magnet 2420 may be disposed on a lower surface of the first driving magnet 2410. The second driving magnet 2420 may be in contact with a lower surface of the first driving magnet 2410. The second driving magnet 2420 may be fixed to a lower surface of the first driving magnet 2410. The second driving magnet 2420 may be coupled to the lower surface of the first driving magnet 2410 by an adhesive. In the optical axis direction, the length of the second driving magnet 2420 may be shorter than the length of the first driving magnet 2410. The size of the second driving magnet 2420 may be smaller than the length of the first driving magnet 2410.

The camera device 2010 may comprise a first coil 2430. The driving unit may comprise a first coil 2430. The first coil 2430 may be disposed in the first moving part 2200. The first coil 2430 may be fixed to the first moving part 2200. The first coil 2430 may be coupled to the first moving part 2200. The first coil 2430 may be attached to the first moving part 2200 by an adhesive. The first coil 2430 may be disposed in the bobbin 2210. The first coil 2430 may be fixed to the bobbin 2210. The first coil 2430 may be coupled to the bobbin 2210. The first coil 2430 may be attached to the bobbin 2210 by an adhesive. The first coil 2430 may be electrically connected to the driver IC 2480. The first coil 2430 may be electrically connected to the lower elastic member 2720, the sensing substrate 2470, and the driver IC 2480. The first coil 2430 may be supplied with a current from the driver IC 2480.

The first coil 2430 may be disposed at a position corresponding to the first driving magnet 2410. The first coil 2430 may be disposed in the bobbin 2210 at a position corresponding to the first driving magnet 2410. The first coil 2430 may face the first driving magnet 2410. The first coil 2430 may comprise a surface facing the first driving magnet 2410. The first coil 2430 may be disposed adjacent to the first driving magnet 2410. The first coil 2430 may interact with the first driving magnet 2410. The first coil 2430 may electromagnetically interact with the first driving magnet 2410.

The first coil 2430 may move the first moving part 2200 in an optical axis direction. The first coil 2430 may move the bobbin 2210 in an optical axis direction. The first coil 2430 may move the lens 2220 in an optical axis direction. The first coil 2430 may move the first moving part 2200 in an upward direction of the optical axis direction. The first coil 2430 may move the bobbin 2210 in an upward direction of the optical axis direction. The first coil 2430 may move the lens 2220 in an upward direction of the optical axis direction. The first coil 2430 may move the first moving part 2200 in a downward direction of the optical axis direction. The first coil 2430 may move the bobbin 2210 in a downward direction of the optical axis direction. The first coil 2430 may move the lens 2220 in a downward direction of the optical axis direction.

The camera device 2010 may comprise a second coil 2440. The driving unit may comprise a second coil 2440. The second coil 2440 may be disposed in the second moving part 2300. The second coil 2440 may be fixed to the second moving part 2300. The second coil 2440 may be coupled to the second moving part 2300. The second coil 2440 may be attached to the second moving part 2300 by an adhesive. The second coil 2440 may be disposed in the holder 2340. The second coil 2440 may be fixed to the holder 2340. The second coil 2440 may be coupled to the holder 2340. The second coil 2440 may be attached to the holder 2340 by an adhesive. The second coil 2440 may be wound around the protrusion of the holder 2340 and disposed. The second coil 2440 may be disposed on the holder 2340. The second coil 2440 may be electrically connected to the second substrate 2310. Both ends of the second coil 2440 may be soldered to the second substrate 2310. The second coil 2440 may be coupled to the second substrate 2310 by soldering. The second coil 2440 may be electrically connected to the driver IC 2495. The second coil 2440 may be electrically connected to the second substrate 2310 and the driver IC 2495. The second coil 2440 may receive a current from the driver IC 2495.

The second coil 2440 may be disposed at a position corresponding to the second driving magnet 2420. The second coil 2440 may be disposed in the holder 2340 at a position corresponding to the second driving magnet 2420. The second coil 2440 may face the second driving magnet 2420. The second coil 2440 may comprise a surface facing the second driving magnet 2420. The second coil 2440 may be disposed adjacent to the second driving magnet 2420. The second coil 2440 may interact with the second driving magnet 2420. The second coil 2440 may electromagnetically interact with the second driving magnet 2420.

The second coil 2440 may move the second moving part 2300 in a direction perpendicular to the optical axis direction. The second coil 2440 may move the second substrate 2310 in a direction perpendicular to the optical axis direction. The second coil 2440 may move the sensor substrate 2320 in a direction perpendicular to the optical axis direction. The second coil 2440 may move the image sensor 2330 in a direction perpendicular to the optical axis direction. The second coil 2440 may move the holder 2340 in a direction perpendicular to the optical axis direction. The second coil 2440 may rotate the second moving part 2300 about an optical axis. The second coil 2440 may rotate the second substrate 2310 about an optical axis. The second coil 2440 may rotate the sensor substrate 2320 about an optical axis. The second coil 2440 may rotate the image sensor 2330 about an optical axis. The second coil 2440 may rotate the holder 2340 about an optical axis.

The second coil 2440 may comprise a plurality of coils. The second coil 2440 may comprise four coils. The second coil 2440 may comprise a coil for x-axis shift. The second coil 2440 may comprise a coil for y-axis shift.

The second coil 2440 may comprise a second-first coil 2441. The second-first coil 2441 may be a first sub-coil. The second-first coil 2441 may be a coil for x-axis shift. The second-first coil 2441 may move the second moving part 2300 in the x-axis direction. The second-first coil 2441 may be disposed long in length along the y-axis. The second-first coil 2441 may comprise a plurality of coils. The second-first coil 2441 may comprise two coils. The two coils of the second-first coil 2441 may be electrically connected to each other. The second-first coil 2441 may comprise a connection coil connecting the two coils. In this case, the two coils of the second-first coil 2441 may receive current together. Or, the two coils of the second-first coil 2441 may be electrically separated from each other to receive current individually.

The second coil 2440 may comprise a second-second coil 2442. The second-second coil 2442 may be a second sub-coil. The second-second coil 2442 may be a coil for y-axis shift. The second-second coil 2442 may move the second moving part 2300 in the y-axis direction. The second-second coil 2442 may be disposed in length along the x-axis. The second-first coil 2441 may comprise a plurality of coils. The second-second coil 2442 may comprise two coils. The two coils of the second-second coil 2442 may be electrically connected to each other. The second-second coil 2442 may comprise a connection coil connecting the two coils. In this case, the two coils of the second-second coil 2442 may receive current together. Or, the two coils of the second-second coil 2442 may be electrically separated from each other to receive current individually.

The camera device 2010 may comprise a Hall sensor 2445. The Hall sensor 2445 may be disposed in the second substrate 2310. The Hall sensor 2445 may be disposed in a hole of the holder 2340. The Hall sensor 2445 may comprise a Hall IC. The Hall sensor 2445 may detect the second driving magnet 2420. The Hall sensor 2445 may detect the magnetic force of the second driving magnet 2420. The Hall sensor 2445 may face the second driving magnet 2420. The Hall sensor 2445 may be disposed at a position corresponding to the second driving magnet 2420. The Hall sensor 2445 may be disposed adjacent to the second driving magnet 2420. The Hall sensor 2445 may detect the position of the second moving part 2300. The Hall sensor 2445 may detect the movement of the second moving part 2300. The Hall sensor 1445 may be disposed in a hollow of the second coil 2440. The detected value detected by the Hall sensor 2445 may be used to feedback the handshake correction operation. The Hall sensor 2445 may be electrically connected to the driver IC 2495.

The Hall sensor 2445 may comprise a plurality of Hall sensors. The Hall sensor 2445 may comprise three Hall sensors. The Hall sensor 2445 may comprise first to third Hall sensors. The first Hall sensor may detect the displacement of the second moving part 2300 in the x-axis direction. The second Hall sensor may detect the displacement of the second moving part 2300 in the y-axis direction. The third Hall sensor may detect the rotation of the second moving part 2300 about the z-axis alone or together with any one or more of the first Hall sensor and the second Hall sensor.

The camera device 2010 may comprise a sensing magnet 2450. The sensing magnet 2450 may be disposed in the first moving part 2200. The sensing magnet 2450 may be fixed to the first moving part 2200. The sensing magnet 2450 may be coupled to the first moving part 2200. The sensing magnet 2450 may be attached to the first moving part 2200 by an adhesive. The sensing magnet 2450 may be disposed in the bobbin 2210. The sensing magnet 2450 may be fixed to the bobbin 2210. The sensing magnet 2450 may be coupled to the bobbin 2210. The sensing magnet 2450 may be attached to the bobbin 2210 by an adhesive. The sensing magnet 2450 may be formed to have a smaller size than the first driving magnet 2410. The sensing magnet 2450 may be formed to have a smaller size than the second driving magnet 2420. Through this, the influence of the sensing magnet 2450 on driving may be minimized.

The sensing magnet 2450 may be disposed at an opposite side of the correction magnet 2460. The sensing magnet 2450 and the correction magnet 2460 may be disposed opposite to each other in the first moving part 2200. The sensing magnet 2450 and the correction magnet 2460 may be disposed opposite to each other in the bobbin 2210.

The camera device 2010 may comprise a correction magnet 2460. The correction magnet 2460 may be a compensating magnet. The correction magnet 2460 may be disposed in the first moving part 2200. The correction magnet 2460 may be fixed to the first moving part 2200. The correction magnet 2460 may be coupled to the first moving part 2200. The correction magnet 2460 may be attached to the first moving part 2200 by an adhesive. The correction magnet 2460 may be disposed in the bobbin 2210. The correction magnet 2460 may be fixed to the bobbin 2210. The correction magnet 2460 may be coupled to the bobbin 2210. The correction magnet 2460 may be attached to the bobbin 2210 by an adhesive. The correction magnet 2460 may be formed to have a smaller size than the first driving magnet 2410. The correction magnet 2460 may be formed to have a smaller size than the second driving magnet 2420. Through this, the influence of the correction magnet 2460 on driving may be minimized. In addition, the correction magnet 2460 may be disposed at an opposite side of the sensing magnet 2450 to form a magnetic force balance with the sensing magnet 2450. Through this, a tilt that may be generated by the sensing magnet 2450 may be inhibited.

The camera device 2010 may comprise a sensing substrate 2470. The sensing substrate 2470 may be a substrate. The sensing substrate 2470 may be a printed circuit board (PCB). The sensing substrate 2470 may be a flexible substrate. The sensing substrate 2470 may be an FPCB. The sensing substrate 2470 may be coupled with the first substrate 2110. The sensing substrate 2470 may be connected to the first substrate 2110. The sensing substrate 2470 may be electrically connected to the first substrate 2110. The sensing substrate 2470 may be soldered to the first substrate 2110. The sensing substrate 2470 may be disposed in the housing 2130. The sensing substrate 2470 may be fixed to the housing 2130. The sensing substrate 2470 may be coupled to the housing 2130. The housing 2130 may comprise a groove or hole having a shape corresponding to that of the sensing substrate 2470. The sensing substrate 2470 may be disposed in a groove or hole of the housing 2130.

The camera device 2010 may comprise a driver IC 2480. The driver IC 2480 may be an AF driver IC. The driver IC 2480 may be electrically connected to the first coil 2430. The driver IC 2480 may apply a current to the first coil 2430 to perform AF driving. The driver IC 2480 may apply power to the first coil 2430. The driver IC 2480 may apply a current to the first coil 2430. The driver IC 2480 may apply a voltage to the first coil 2430. The driver IC 2480 may be disposed in the sensing substrate 2470. The driver IC 2480 may be disposed at a position corresponding to the sensing magnet 2450. The driver IC 2480 may be disposed to face the sensing magnet 2450. The driver IC 2480 may be disposed adjacent to the sensing magnet 2450.

The driver IC 2480 may comprise a sensor. The sensor may comprise a Hall IC. The sensor may be disposed at a position corresponding to the sensing magnet 2450. The sensor may be disposed to face the sensing magnet 2450. The sensor may be disposed adjacent to the sensing magnet 2450. The sensor may detect the sensing magnet 2450. The sensor may detect the magnetic force of the sensing magnet 2450. The sensor may detect the position of the first moving part 2200. The sensor may detect the movement of the first moving part 2200. The detected value detected by the sensor may be used for feedback of auto focus driving.

The camera device 2010 may comprise a gyro sensor 2490. The gyro sensor 2490 may be disposed on the first substrate 2110. The gyro sensor 2490 may detect the shaking of the camera device 2010. The gyro sensor 2490 may detect an angular velocity or a linear velocity caused by shaking of the camera device 2010. The gyro sensor 2490 may be electrically connected to the driver IC 2495. The shaking of the camera device 2010 detected by the gyro sensor 2490 may be used to drive the handshake correction (OIS).

The camera device 2100 may comprise a driver IC 2495. The driver IC 2495 may be an OIS driver IC. The driver IC 2495 may be electrically connected to the second coil 2440. The driver IC 2495 may apply a current to the second coil 2440 to perform OIS driving. The driver IC 2495 may apply power to the second coil 2440. The driver IC 2495 may apply a current to the second coil 2440. The driver IC 2495 may apply a voltage to the second coil 2440. The driver IC 2495 may be disposed in the second substrate 2310.

The camera device 2010 may comprise a connection member. The connection member may be an interposer. The connection member may support the movement of the second moving part 2300. The connection member may movably support the second moving part 2300. The connection member may connect the second moving part 2300 and the fixed part 2100. The connection member can connect the first substrate 2110 and the second substrate 2310. The connection member may electrically connect the first substrate 2110 and the second substrate 2310. The connection member may connect the first substrate 2110 and the second moving part 2300. The connection member may guide the movement of the second moving part 2300. The connection member may guide the second moving part 2300 to move in a direction perpendicular to the optical axis direction. The connection member may guide the second moving part 2300 to rotate about the optical axis. The connection member may limit movement of the second moving part 2300 in the optical axis direction.

The connection member may comprise a connection substrate 2600. The connection member may comprise an elastic member for connecting the fixed part 2100 and the second moving part 2300. The connection member may comprise a leaf spring. The connection member may comprise a wire 2800. The connection member may comprise a ball disposed between the fixed part 2100 and the second moving part 2300.

The camera device 2010 may comprise a connection substrate 2600. The connection substrate 2600 may be a connection part. The connection substrate 2600 may be a connection member. The connection substrate 2600 may be a flexible substrate. The connection substrate 2600 may be a soft substrate. The connection substrate 2600 may be a flexible printed circuit board. The connection substrate 2600 may be a flexible printed circuit board (FPCB). At least a portion of the connection substrate 2600 may have flexibility therein. The second substrate 2310 and the connection substrate 2600 may be integrally formed.

The connection 2600 may support the second moving part 2300. The connection substrate 2600 may support the movement of the second moving part 2300. The connection substrate 2600 may movably support the second moving part 2300. The connection substrate 2600 may connect the second moving part 2300 and the fixed part 2100. The connection substrate 2600 can connect the first substrate 2110 and the second substrate 2310. The connection substrate 2600 may electrically connect the first substrate 2110 and the second substrate 2310. The connection substrate 2600 may guide the movement of the second moving part 2300. The connection substrate 2600 may guide the second moving part 2300 to move in a direction perpendicular to the optical axis direction. The connection substrate 2600 may guide the second moving part 2300 to rotate about the optical axis. The connection substrate 2600 may limit the movement of the second moving part 2300 in an optical axis direction. A portion of the connection substrate 2600 may be coupled to the base 2120.

The connection substrate 2600 may comprise two connection substrates 2600 being spaced apart from each other and formed symmetrically. Two connection substrates 2600 may be disposed on both sides of the second substrate 2310. The connection substrate 2600 may be formed by being bent a total of 6 times so as to connect the first substrate 2110 and the second substrate 2310.

The connection substrate 2600 may comprise a first region connected to the second substrate 2310 and bent in the optical axis direction. The first region is connected to the second substrate 2310 and may be bent in the optical axis direction. The first region is connected to the second substrate 2310 and may be extended in the optical axis direction. The first region is connected to the second substrate 2310 and may be bent and extended in the optical axis direction. The connection substrate 2600 may comprise a second region being extended from the first region. The connection substrate 2600 may comprise a third region being bent in a direction perpendicular to the optical axis direction in the second region. The third region may be bent in a direction perpendicular to the optical axis direction in the second region. The third region may be extended in a direction perpendicular to the optical axis direction in the second region. The third region may be bent and extended in a direction perpendicular to the optical axis direction in the second region.

The connection substrate 2600 may comprise a connection part 2610 comprising a first region. The connection substrate 2600 may comprise an extension part 2620 comprising a second region and a third region. The connection substrate 2600 may comprise a connection part 2610 being connected to the second substrate 2310. The connection substrate 2600 may comprise an extension part 2620 being extended from the connection part 2610. The connection substrate 2600 may comprise a terminal unit 2630 being connected to the extension part 2620 and comprising a terminal.

The connection substrate 2600 may comprise a connection part 2610. The connection part 2610 may be connected to the second moving part 2300. The connection part 2610 may be coupled to the second moving part 2300. The connection part 2610 may be fixed to the second moving part 2300. The connection part 2610 may be connected to the second substrate 2310. The connection part 2610 may be coupled to the second substrate 2310. The connection part 2610 may be fixed to the second substrate 2310. The connection part 2610 may comprise a first bending region that is bent in the optical axis direction. The connection part 2610 may comprise a first region being bent in the optical axis direction against the second substrate 2310 and a second region being extended from the first region and being bent in a direction perpendicular to the optical axis direction.

The connection substrate 2600 may comprise an extension part 2620. The extension part 2620 may connect the connection part 2610 and the terminal unit 2630. The extension part 2620 may be extended from the connection part 2610. The extension part 2620 may comprise a second bending region being bent in a direction perpendicular to the optical axis direction.

The connection substrate 2600 may comprise a terminal unit 2630. The terminal unit 2630 may be coupled to the fixed part 2100. The terminal unit 2630 may be fixed to the fixed part 2100. The terminal unit 2630 may be coupled to the first substrate 2110. The terminal unit 2630 may be connected to the first substrate 2110. The terminal unit 2630 may be soldered to the first substrate 2110. The terminal unit 2630 may be fixed to the first substrate 2110. The terminal unit 2630 may be coupled to the base 2120. The terminal unit 2630 may be fixed to the base 2120. The terminal unit 2630 may comprise a terminal. The terminal may be coupled to the first substrate 2110.

In a third embodiment of the present invention, the camera device 2010 may comprise a flexible substrate. The flexible substrate may connect the fixed part 2100 and the second moving part 2300. The flexible substrate may comprise a connection part 2610 being connected to the second moving part 2300, an extension part 2620 being extended from the connection part 2610, and a terminal unit 2630 being connected to the extension part 2620 and comprising a terminal.

In a third embodiment of the present invention, the connection substrate 2600 may comprise a first portion coupled to the first substrate 2110, a second portion coupled to the second substrate 2310, and a third portion connecting the first portion and the second portion. The third portion may be disposed parallel to an optical axis at least in part. The third portion may be formed to have the length in an optical axis direction longer than the thickness. The second portion of the connection substrate 2600 may be disposed parallel to the second substrate 2310 at least in part. The third portion of the connection substrate 2600 may be disposed vertically with respect to the second portion at least in part. The third portion of the connection substrate 2600 may be bent roundly in a portion corresponding to the corner of the second substrate 2310. The second substrate 2310 may comprise a first side and a second side disposed opposite to each other, and a third side and a fourth side disposed opposite to each other. The second portion of the connection substrate 2600 may be coupled to the first side and the second side of the second substrate 2310. The first portion of the connection substrate 2600 may be coupled to a portion of the first substrate 2110 corresponding to the third and fourth sides of the second substrate 2310.

The camera device 2010 may comprise a metal plate. The connection member may comprise a metal plate 2650. The connection substrate 1600 may comprise a metal plate 2650. However, the metal plate 2650 may be understood as a configuration separate from the connection substrate 2600. The metal plate 2650 may be a metal member. The metal plate 2650 may be a metal part. The metal plate 2650 may be a metal layer. The metal plate 2650 may be a metal thin film. The metal plate 2650 may be formed of metal. The metal plate 2650 may be formed of an alloy. The metal plate 2650 may be formed of a copper alloy. The metal plate 2650 may be formed of a conductive material. The metal plate 2650 may be distinguished from a conductive layer 2602 of the connection substrate 2600. The metal plate 2650 may be formed of a material different from the conductive layer 2602 of the connection substrate 2600. The metal plate 2650 may be disposed in the connection substrate 2600. The metal plate 2650 may be coupled to the connection substrate 2600.

The metal plate 2650 may be fixed to the connection substrate 2600. The metal plate 2650 may be integrally formed with the connection substrate 2600. The metal plate 2650 may have elasticity.

In an optical axis direction, the length of the metal plate 2650 at least in part may be the same as the length of the extension part 1620. The metal plate 2650 may be extended to the same length as the extension part 1620 in an optical axis direction. The thickness of the metal plate 2650 may be the same as the thickness of the connection substrate 1600. The thickness of the metal plate 2650 may be thicker than the thickness of the connection substrate 2600. The thickness of the conductive layer may be 7 to 50 μm. The thickness of the metal plate 2650 may be 20 to 150 μm. The metal plate 2650 may be used for impedance matching and noise suppression by connecting to the ground (GND).

At least a portion of the metal plate 2650 may be disposed in the extension part 2620 of the connection substrate 2600. The extension part 2620 may comprise a bending region that is bent in a direction perpendicular to the optical axis direction. At this time, the metal plate 2650 may be placed in the bending region. The metal plate 2650 may be disposed on an inner surface of the extension part 2620. The metal plate 2650 may be disposed on an outer surface of the extension part 2620.

The metal plate 2620 may be formed of a conductive material. The metal plate 2620 may be electrically connected to the second substrate 2310. The metal plate 2620 may be electrically connected to the image sensor 2330. The metal plate 2620 may be electrically connected to the driver IC 2495. The metal plate 2620 may be connected to the terminal 2631 of the connection substrate 2600. The metal plate 2620 may be electrically connected to the terminal 2631 of the connection substrate 2600. The metal plate 2620 may be in direct contact with the terminal 2631 of the connection substrate 2600. The metal plate 2620 may be coupled to the terminal 2631 of the connection substrate 2600 by a conductive member. The metal plate 2620 may be used as a ground (GND). The metal plate 2620 may be connected to the ground terminal of the connection substrate 2600. The metal plate 2620 may be electrically connected to the first substrate 2110. In this case, the number of power connection patterns of the connection substrate 2600 may be reduced.

The camera device 2010 may comprise an elastic member 2700. The elastic member 2700 may be a support member. The elastic member 2700 may connect the fixed part 2100 and the first moving part 2200. The elastic member 2700 may elastically connect the fixed part 2100 and the first moving part 2200. The elastic member 2700 may connect the bobbin 2210 and the housing 2130. The elastic member 2700 may elastically connect the bobbin 2210 and the housing 2130. The elastic member 2700 may movably support the first moving part 2200 against the fixed part 2100. The elastic member 2700 may be deformed when the first moving part 2200 is moved. When the movement of the first moving part 2200 is finished, the elastic member 2700 may position the first moving part 2200 to an initial position through a restoring force (elastic force). The elastic member 2700 may comprise a leaf spring. The elastic member 2700 may comprise a spring. The elastic member 2700 may have elasticity at least in part. The elastic member 2700 may provide a restoring force (elastic force) to the first moving part 2200.

The camera device 2010 may comprise an upper elastic member 2710. The elastic member 2700 may comprise an upper elastic member 2710. The upper elastic member 2710 may be disposed above the lower elastic member 2720. The upper elastic member 2710 may comprise an inner side portion coupled to the bobbin 2210. An inner side portion of the upper elastic member 2710 may be coupled to an upper portion of the bobbin 2210. The inner portion of the upper elastic member 2710 may be disposed on an upper surface of the bobbin 2210. The upper elastic member 2710 may comprise an outer side portion being coupled to the housing 2130. The outer side portion of the upper elastic member 2710 may be coupled to a lower portion of the housing 2130. The outer side portion of the upper elastic member 2710 may be disposed on a lower surface of the housing 2130. The upper elastic member 2710 may comprise a connection part connecting the inner side portion and the outer side portion. The connection part may have elasticity.

The camera device 2010 may comprise a lower elastic member 2720. The elastic member 2700 may comprise a lower elastic member 2720. The lower elastic member 2720 may be disposed below the upper elastic member 2710. The lower elastic member 2720 may comprise an inner side portion coupled to the bobbin 2210. The inner side portion of the lower elastic member 2720 may be coupled to a lower portion of the bobbin 2210. The inner side portion of the lower elastic member 2720 may be disposed on a lower surface of the bobbin 2210. The lower elastic member 2720 may comprise an outer side portion being coupled to the housing 2130. The outer side portion of the lower elastic member 2720 may be coupled to an upper portion of the housing 2130. The outer side portion of the lower elastic member 2720 may be disposed on an upper surface of the housing 2130. The lower elastic member 2720 may comprise a connection part connecting an inner side portion and an outer side portion. The connection part may have elasticity.

The lower elastic member 2720 may comprise a plurality of lower elastic units. The lower elastic member 2720 may comprise first and second lower elastic units 2720-1 and 2720-2. The lower elastic member 2720 may comprise two lower elastic units 2720-1 and 2720-2. The two lower elastic units 2720-1 and 2720-2 are spaced apart from each other to electrically connect the sensing substrate 2470 and the first coil 2430.

The camera device 2010 may comprise a wire 2800. The wire 2800 may be a wire spring. The wire 2800 may be an elastic member. The wire 2800 may be a leaf spring in a modified embodiment. The wire 2800 may connect the fixed part 100 and the second moving part 2300. The wire 2800 may elastically connect the fixed part 2100 and the second moving part 2300. The wire 2800 may connect the housing 2130 and the second substrate 2310. The wire 2800 may elastically connect the housing 2130 and the second substrate 2310. The wire 2800 may movably support the second moving part 2300. The wire 2800 may support the second moving part 2300 to move or rotate in a direction perpendicular to the optical axis direction. The wire 2800 may connect the upper elastic member 2710 and the terminal 2380. The wire 2800 may electrically connect the upper elastic member 2710 and the terminal 2380. The wire 2800 may be coupled to the upper elastic member 2710 through solder. The wire 2800 may be coupled to the terminal 2380 through solder.

The assembly of the image sensor 2330 in a third embodiment of the present invention may be performed in the following sequences. A sensor substrate 2320 that is a rigid cavity PCB may be attached on the plate member 2370 that is a metal stiffener. Thereafter, the image sensor 2330 may be mounted on the upper surface of the stiffener. Thereafter, the image sensor 2330 may be wire-bonded to the sensor substrate 2320.

In a third embodiment of the present invention, the plate member 2370 may be etched in the mounting area of the sensor substrate 2320. Furthermore, additional etching may be applied to the lower surface as well. Through this, the weight of the plate member 2370 may be reduced.

Hereinafter, driving of a camera device according to a third embodiment of the present invention will be described with reference to the drawings.

Figure 71:
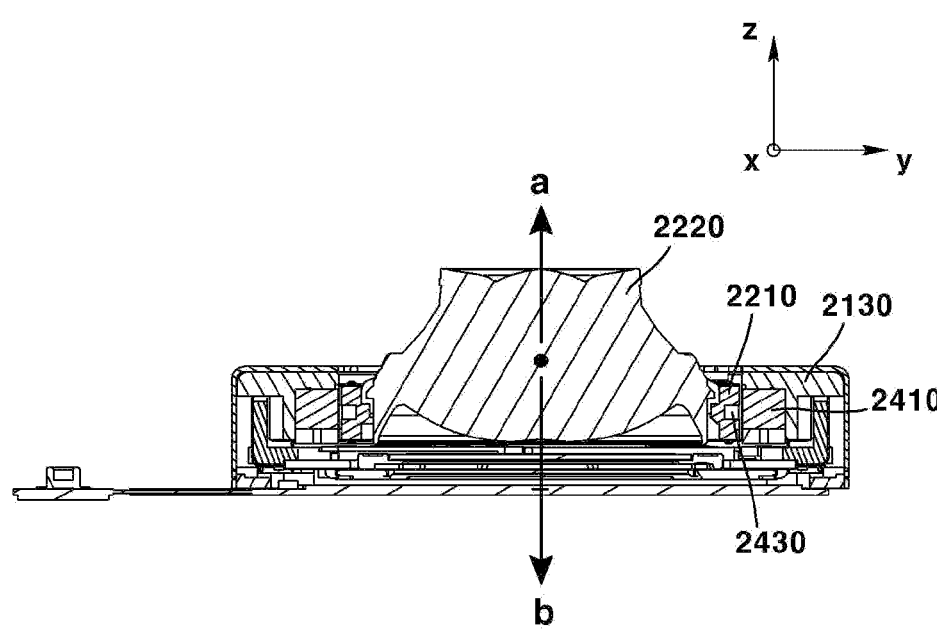
FIG. 71 is a view for explaining the operation of an auto focus function of a camera device according to a third embodiment of the present invention.

FIG. 71 is a view for explaining the operation of an auto focus function of a camera device according to a third embodiment of the present invention.

When power is applied to the first coil 2430 of the camera device 2010 according to a third embodiment of the present invention, an electromagnetic field is formed in the first coil 2430 so that the first coil 2430 can move in the optical axis direction (z-axis direction) through electromagnetic interaction with the first driving magnet 2410. At this time, the first coil 2430 may move in the optical axis direction together with the first moving part 2200 comprising the lens 2220. In this case, since the lens 2220 is being moved away from or comes closer to the image sensor 2330, the focus of the subject can be adjusted. Any one or more of a current and a voltage may be applied to apply power to the first coil 2430.

When a current in the first direction is applied to the first coil 2430 of the camera device 2010 according to a third embodiment of the present invention, the first coil 2430 may move in an upward direction (refer to a in FIG. 71) of the optical axis direction through the electromagnetic interaction with the first driving magnet 2410. At this time, the first coil 2430 may move the lens 2220 in an upward direction of the optical axis direction to move away from the image sensor 2330.

When a current in a second direction opposite to the first direction is applied to the first coil 2430 of the camera device 2010 according to a third embodiment of the present invention, the first coil 2430 may move in a lower direction (refer to b in FIG. 71) of the optical axis direction through electromagnetic interaction with the first driving magnet 2410. At this time, the first coil 2430 may move the lens 2220 in a lower direction of the optical axis so as to be closer to the image sensor 2330.

Figure 72:
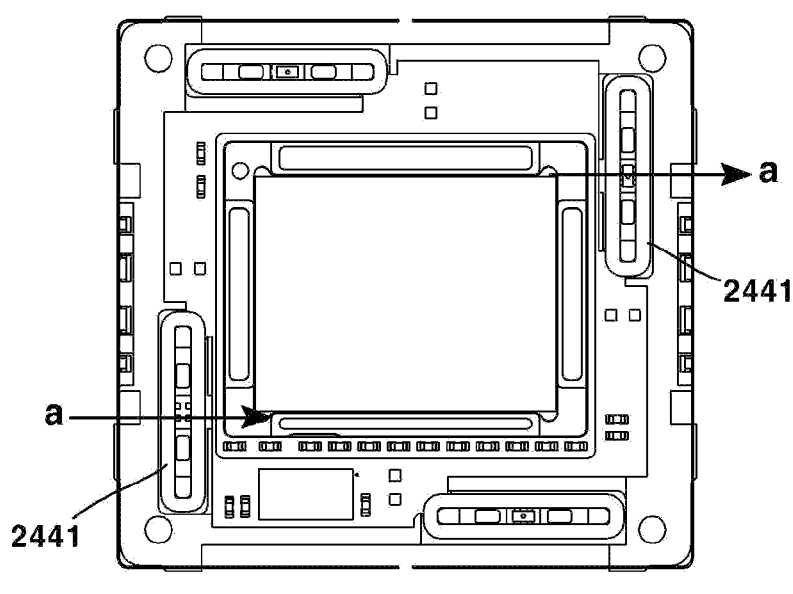
FIGS. 72 to 74 are diagrams for explaining the operation of a handshake correction function of a camera device according to a third embodiment of the present invention. In more detail.
Figure 72:
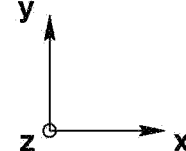
Figure 73:
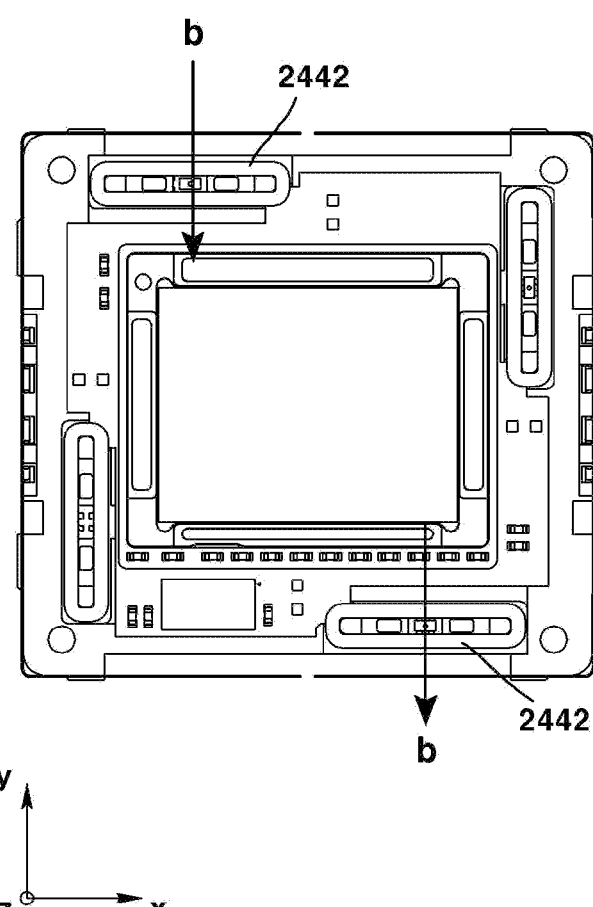
Figure 74:
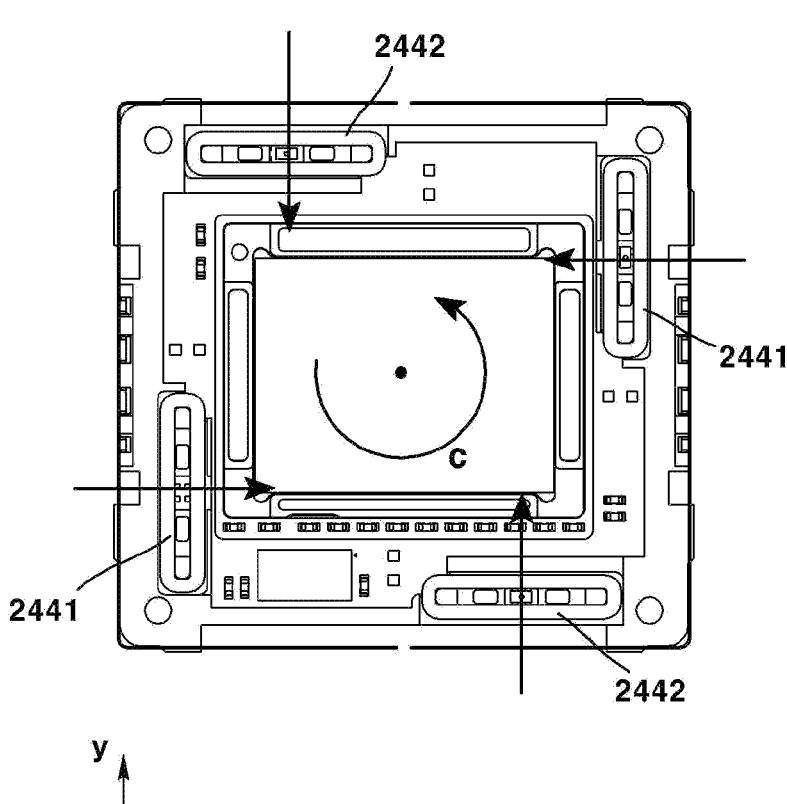

FIGS. 72 to 74 are diagrams for explaining the operation of a handshake correction function of a camera device according to a third embodiment of the present invention.

When power is applied to the second coil 2440 of the camera device 2010 according to a third embodiment of the present invention, an electromagnetic field is formed in the second coil 2440, and the second coil 2440 may move in a direction perpendicular to the direction of the optical axis through electromagnetic interaction with the second driving magnet 2420. In addition, the second coil 2440 may rotate against the optical axis through electromagnetic interaction with the second driving magnet 2420. At this time, the second coil 2440 may move or rotate together with the second moving part 2300 comprising the image sensor 2330. In a second embodiment of the present invention, the second coil 2440 may move the image sensor 2330 to compensate for shaking of the camera device 2010 detected by the gyro sensor 2490.

FIG. 72 is a diagram for explaining driving in which an image sensor of a camera device is shifted along the x-axis according to a third embodiment of the present invention.

When a current in a first direction is applied to the second-first coil 2441 of the camera device 2010 according to a third embodiment of the present invention, the second-first coil 2441 can move in one direction (refer to a in FIG. 72) of the first direction (x-axis direction) perpendicular to the optical axis direction through electromagnetic interaction with second driving magnet 2420. At this time, the second-first coil 2441 may move the image sensor 2330 in one of the first directions perpendicular to the optical axis direction. Conversely, when a current in a second direction opposite to the first direction is applied to the second-first coil 2441, the second-first coil 2441 may move in the other direction of the first direction (x-axis direction) perpendicular to the optical axis direction through electromagnetic interaction with the second driving magnet 2420. At this time, the second-first coil 2441 may move the image sensor 2330 in the other direction of the first directions perpendicular to the optical axis direction.

FIG. 73 is a diagram for explaining driving in which an image sensor of a camera device is shifted along the y-axis according to a third embodiment of the present invention.

When a current in a first direction is applied to the second-second coil 2442 of the camera device 2010 according to a third embodiment of the present invention, the second-second coil 2442 may move in one of the second directions (y-axis direction) perpendicular to the optical axis direction (refer to b of FIG. 73) through electromagnetic interaction with the second driving magnet 2420. At this time, the second-second coil 2442 may move the image sensor 2330 in one of the second directions perpendicular to the optical axis direction. Conversely, when a current in a second direction opposite to the first direction is applied to the second-second coil 2442, the second-second coil 2442 may move in the other direction of the second directions (y-axis direction) perpendicular to the optical axis direction through electromagnetic interaction with the second driving magnet 2420. At this time, the second-second coil 2442 may move the image sensor 2330 in the other direction of the second directions perpendicular to the optical axis direction.

FIG. 74 is a diagram for explaining the driving of an image sensor of a camera device according to a third embodiment of the present invention being rolled about the z-axis.

When current in a first direction is applied to the second-first coil 2441 and the second-second coil 2442 of the camera device 2010 according to a third embodiment of the present invention, the second-first coil 2441 and the second-second coil 2442 may rotate in one direction about the optical axis through electromagnetic interaction with the second driving magnet 2420 (refer to c in FIG. 74). At this time, the second-first coil 2441 and the second-second coil 2442 may rotate the image sensor 2330 in one direction about the optical axis. At this time, one direction may be counterclockwise. Conversely, when a current is applied to the second-first coil 2441 and the second-second coil 2442 in a second direction opposite to the first direction, the second-first coil 2441 and the second-second coil 2442 may rotate in other directions about the optical axis through electromagnetic interaction with the second driving magnet 2420. At this time, the second-first coil 2441 and the second-second coil 2442 may rotate the image sensor 2330 in other directions about the optical axis. At this time, the other direction may be clockwise.

Hereinafter, an optical apparatus according to a third embodiment of the present invention will be described with reference to the drawings.

Figure 75:
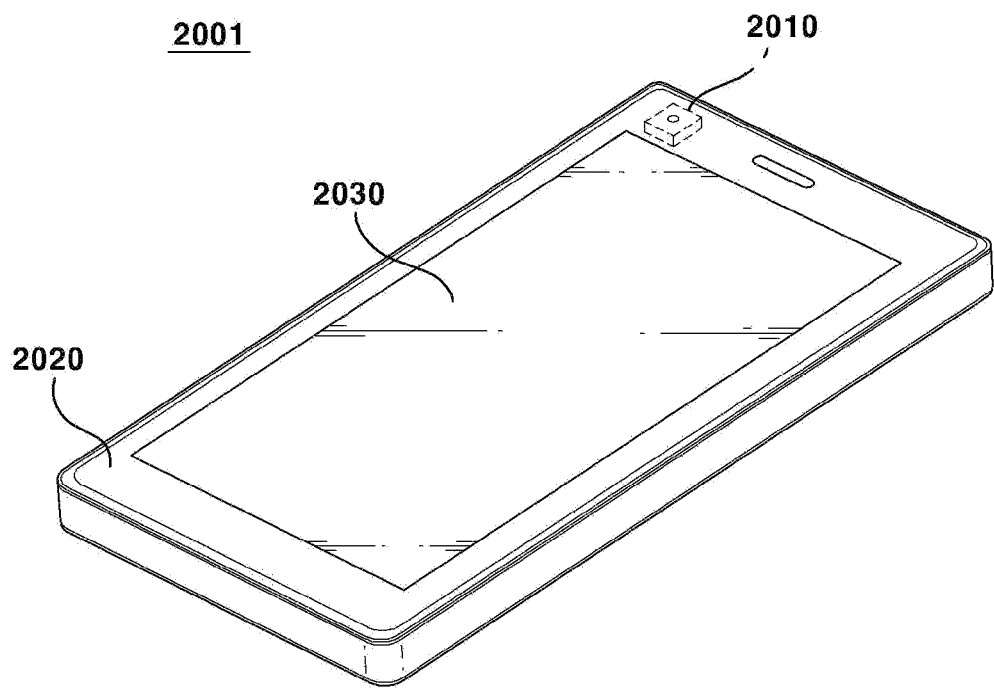
FIG. 75 is a perspective view of an optical apparatus according to a third embodiment of the present invention.
Figure 76:
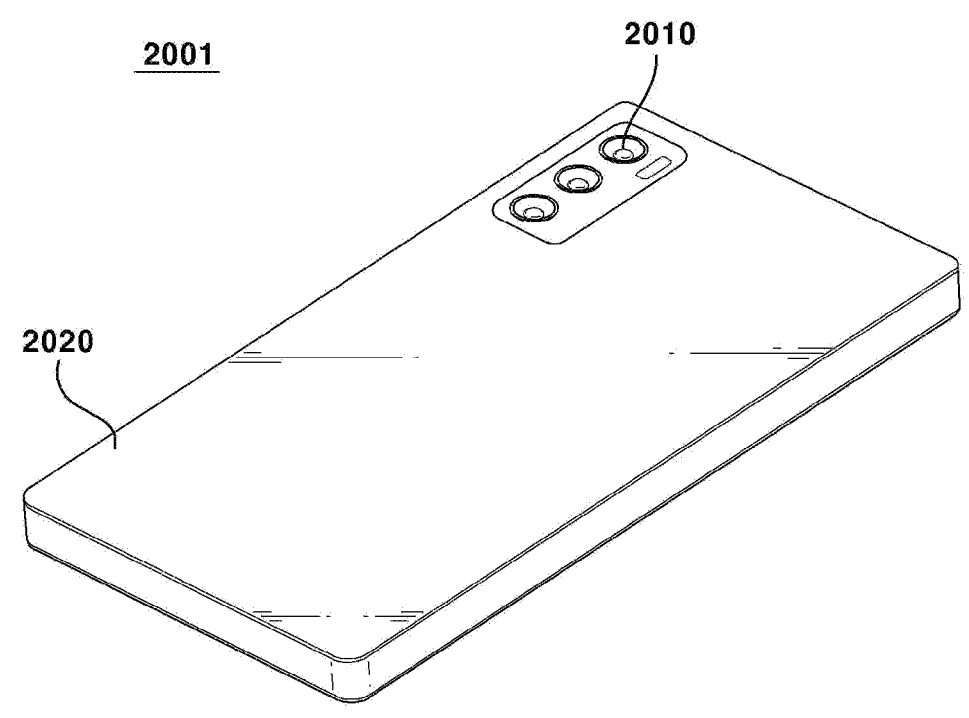
FIG. 76 is a perspective view of an optical apparatus according to a third embodiment of the present invention, as viewed from a different direction from that of FIG. 75.

FIG. 75 is a perspective view of an optical apparatus according to a third embodiment of the present invention; and FIG. 76 is a perspective view of an optical apparatus according to a third embodiment of the present invention, as viewed from a different direction from that of FIG. 75.

The optical apparatus 2001 may comprise any one or more of a mobile phone, a mobile phone, a mobile terminal, a mobile terminal, a smart phone, a smart pad, a portable smart device, a digital camera, a laptop computer, a digital broadcasting terminal, a personal digital assistant (PDA), a portable multimedia player (PMP), and navigation. The optical apparatus 2001 may comprise any device for photographing images or photos.

The optical apparatus 2001 may comprise a main body 2020. The optical apparatus 2001 may comprise a camera device 2010. The camera device 2010 may be disposed in the main body 2020. The camera device 2010 may photograph a subject. The optical apparatus 2001 may comprise a display 2030. The display 2030 may be disposed in the main body 2020. The display 2030 may output any one or more of an image and an image photographed by the camera device 2010. The display 2030 may be disposed on the first surface of the main body 2020. The camera device 2010 may be disposed in one or more of a first surface of the main body 2020 and a second surface opposite to the first surface.

Although the embodiments of the present invention have been described as being divided into first to third embodiments, the partial configuration of the first embodiment may be replaced with a corresponding configuration of the second or third embodiments. In addition, the partial configuration of the second embodiment can be replaced with the corresponding configuration of the first embodiment or the third embodiment. In addition, the partial configuration of the third embodiment can be replaced with the corresponding configuration of the first embodiment or the second embodiment. The fourth embodiment of the present invention may comprise two or more of the partial configuration of the first embodiment, the partial configuration of the second embodiment, and the partial configuration of the third embodiment. Furthermore, the plate member 1370 of the second embodiment can be applied to the first embodiment and the third embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

We claim:

1. A camera device comprising:
a fixed part comprising a magnet; and
a moving part comprising a first substrate comprising a hole, a coil facing the magnet, an image sensor disposed in the hole of the first substrate, a filter disposed on the image sensor, a sensor holder disposed adjacent to the filter, and a sensor substrate disposed under the image sensor,
wherein the image sensor and the sensor holder are disposed on an upper surface of the sensor substrate, and
wherein the upper surface of the sensor substrate is coupled with a lower surface of the first substrate so that the sensor holder is overlapped with the first substrate in a direction perpendicular to an optical axis of the image sensor.

2. The camera device of claim 1,
wherein an upper surface of the filter is disposed higher than an uppermost surface of the first substrate.

3. The camera device of claim 1, wherein the first substrate comprises a first terminal,
wherein the sensor substrate comprises a second terminal connected with the first terminal of the first substrate, and
wherein the second terminal comprises a first portion disposed on a lower surface of the sensor substrate.

4. The camera device of claim 3, wherein the second terminal comprises a second portion connected to the first portion and disposed on a side surface of the sensor substrate.

5. A camera device comprising:
a fixed part comprising a second substrate;
a first substrate spaced apart from the second substrate and comprising a first terminal;
a sensor part coupled to the first substrate;
a magnet; and
a coil, configured with the magnet to move the sensor part,
wherein the sensor part comprises a sensor substrate comprising a second terminal connected to the first terminal of the first substrate, an image sensor disposed on the sensor substrate, a filter disposed on the image sensor, and a sensor holder disposed adjacent to the filter,
wherein the image sensor and the sensor holder are disposed on an upper surface of the sensor substrate, and
wherein the upper surface of the sensor substrate is coupled with a lower surface of the first substrate so that the sensor holder is overlapped with the first substrate in a direction perpendicular to an optical axis of the image sensor.

6. The camera device of claim 5, wherein the first terminal is disposed on the lower surface of the first substrate.

7. The camera device of claim 5, wherein the second terminal comprises a first portion disposed on a lower surface of the sensor substrate.

8. The camera device of claim 7, wherein the second terminal comprises a second portion connected to the first portion and disposed on a side surface of the sensor substrate.

9. The camera device of claim 5, wherein the first substrate comprises a hole, and
wherein the sensor holder is inserted into the hole of the first substrate.

10. A camera device comprising:
a fixed part;
a first substrate spaced apart from the fixed part and comprising a hole;
an image sensor disposed in the hole of the first substrate;
a filter disposed on the image sensor;

a sensor holder disposed adjacent to the filter;
a sensor substrate disposed under the image sensor;
a magnet; and
a coil, configured with the magnet to move the image sensor,
wherein the image sensor and the sensor holder are disposed on an upper surface of the sensor substrate, and
wherein the upper surface of the sensor substrate is coupled with a lower surface of the first substrate so that the sensor holder is overlapped with the first substrate in a direction perpendicular to an optical axis of the image sensor.

11. The camera device of claim 10, wherein the image sensor is spaced apart from the sensor holder.

12. The camera device of claim 11,
wherein an upper surface of the filter is disposed higher than an uppermost surface of the first substrate.

13. The camera device of claim 10, comprising an AF (auto focus) moving part disposed in the fixed part,
a sensing magnet disposed on the AF moving part; and
a correction magnet disposed on the AF moving part,
wherein the correction magnet and the sensing magnet are disposed on different sides of the AF moving part.

14. The camera device of claim 13,
wherein the first substrate is electrically connected with the sensor substrate.

15. The camera device of claim 14, wherein the first substrate comprises a first terminal,
wherein the sensor substrate comprises a second terminal connected with the first terminal, and
wherein the first terminal is disposed on the lower surface of the first substrate.

16. The camera device of claim 14, wherein the second terminal comprises a first portion disposed on a lower surface of the sensor substrate.

17. The camera device of claim 16, wherein the second terminal comprises a second portion connected to the first portion and disposed on a side surface of the sensor substrate.

18. The camera device of claim 14, wherein the first substrate, the sensor holder and the image sensor are directly contacted with the upper surface of the sensor substrate.

19. The camera device of claim 10, wherein the magnet is overlapped with the coil in a direction of the optical axis.

20. The optical apparatus comprising:
a main body;
the camera device of claim 10 disposed on the main body; and
a display disposed on the main body and configured to output a video or an image photographed by the camera device.

* * * * *